US009852387B2

(12) United States Patent
Nair et al.

(10) Patent No.: US 9,852,387 B2
(45) Date of Patent: *Dec. 26, 2017

(54) BUILDING MANAGEMENT SYSTEM SITE CATEGORIES

(71) Applicant: Honeywell International Inc., Morristown, NJ (US)

(72) Inventors: Ajay Nair, Bangalore (IN); Jerry Marti, West Salem, OH (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/802,965

(22) Filed: Jul. 17, 2015

(65) Prior Publication Data

US 2015/0323918 A1 Nov. 12, 2015

Related U.S. Application Data

(63) Continuation of application No. 12/896,842, filed on Oct. 1, 2010, now abandoned, which is a
(Continued)

(51) Int. Cl.
*G06F 17/30* (2006.01)
*G06Q 10/06* (2012.01)
(Continued)

(52) U.S. Cl.
CPC ............ *G06Q 10/06* (2013.01); *G05B 15/02* (2013.01); *G06F 17/30994* (2013.01); *G05B 2219/2642* (2013.01)

(58) Field of Classification Search
CPC combination set(s) only.
See application file for complete search history.

(56) References Cited

U.S. PATENT DOCUMENTS 4,375,637 A 3/1983 Desjardins
4,816,208 A 3/1989 Woods et al.
(Continued)

FOREIGN PATENT DOCUMENTS

WO WO 01/97146 12/2001
WO WO 02/052432 7/2002
(Continued)

OTHER PUBLICATIONS

Adobe Acrobat 6.0 Standard, Version 6.0.2, Screenshots, 2 pages, May 18, 2004.
(Continued)

*Primary Examiner* — Mark A Fleischer
(74) *Attorney, Agent, or Firm* — Seager, Tufte & Wickhem, LLP

(57) ABSTRACT

An approach relating to providing a user an ability to place sites into multiple categories and providing applications an ability to query a configuration for members of the categories. The approach not only may provide a user an ability to easily create, deploy, modify and monitor a multi-site enterprise hundreds and thousands of remote building management system site controllers and allow the user to establish each site within the context of a single enterprise group, but it may also incorporate where the site controllers can be identified, sorted or managed within multiple categorical groupings. For example, categorical groupings may facilitate managing the configurations at the sites, applying an operational setting by selecting a logical category, applying common operating parameters to multiple sites, and so forth.

17 Claims, 61 Drawing Sheets

Related U.S. Application Data continuation-in-part of application No. 12/260,046, filed on Oct. 28, 2008, application No. 14/802,965, which is a continuation-in-part of application No. 12/895,590, filed on Sep. 30, 2010, now Pat. No. 8,719,385, which is a continuation-in-part of application No. 12/895,609, filed on Sep. 30, 2010, now Pat. No. 8,819,562, which is a continuation-in-part of application No. 12/895,640, filed on Sep. 30, 2010, now Pat. No. 8,850,347.

(51) Int. Cl.
*G05B 15/02* (2006.01)
*G06F 19/00* (2011.01)
*G06F 15/173* (2006.01)
*G06F 13/00* (2006.01)

(56) References Cited

U.S. PATENT DOCUMENTS

| | | |
|---|---|---|
| 5,042,265 A | 8/1991 | Baldwin et al. |
| 5,161,387 A | 11/1992 | Metcalfe et al. |
| 5,385,297 A | 1/1995 | Rein et al. |
| 5,390,206 A | 2/1995 | Rein et al. |
| 5,544,036 A | 8/1996 | Brown, Jr. et al. |
| 5,768,119 A | 6/1998 | Havekost et al. |
| 5,929,761 A | 7/1999 | Van der Laan et al. |
| 5,949,303 A | 8/1999 | Watson et al. |
| 5,955,306 A | 9/1999 | Beheshti et al. |
| 6,031,343 A | 2/2000 | Recknagel et al. |
| 6,124,790 A | 9/2000 | Golov et al. |
| 6,141,595 A | 10/2000 | Gloudeman et al. |
| 6,178,362 B1 | 1/2001 | Woolard et al. |
| 6,185,483 B1 | 2/2001 | Drees |
| 6,195,309 B1 | 2/2001 | Ematrudo |
| 6,223,544 B1 | 5/2001 | Seem |
| 6,295,526 B1 | 9/2001 | Kreiner et al. |
| 6,295,527 B1 | 9/2001 | McCormack et al. |
| 6,301,624 B1 | 10/2001 | Lee et al. |
| 6,314,328 B1 | 11/2001 | Powell |
| 6,351,213 B1 | 2/2002 | Hirsch |
| 6,356,282 B2 | 3/2002 | Roytman et al. |
| 6,389,464 B1 | 5/2002 | Krishnamurthy et al. |
| 6,420,968 B1 | 7/2002 | Hirsch |
| 6,430,712 B2 | 8/2002 | Lewis |
| 6,466,654 B1 | 10/2002 | Cooper et al. |
| 6,473,407 B1 | 10/2002 | Ditmer et al. |
| 6,492,901 B1 | 12/2002 | Ridolfo |
| 6,535,122 B1 | 3/2003 | Bristol |
| 6,549,135 B2 | 4/2003 | Singh et al. |
| 6,643,355 B1 | 11/2003 | Tsumpes |
| 6,643,516 B1 | 11/2003 | Stewart |
| 6,675,591 B2 | 1/2004 | Singh et al. |
| 6,681,156 B1 | 1/2004 | Weiss |
| 6,690,980 B2 | 2/2004 | Powell |
| 6,761,470 B2 | 7/2004 | Sid |
| 6,813,587 B2 | 11/2004 | McIntyre et al. |
| 6,816,811 B2 | 11/2004 | Seem |
| 6,832,120 B1 | 12/2004 | Frank et al. |
| 6,836,794 B1 | 12/2004 | Lucovsky et al. |
| 6,859,827 B2 | 2/2005 | Banginwar |
| 6,870,141 B2 | 3/2005 | Damrath et al. |
| 6,879,253 B1 | 4/2005 | Thuillard |
| 6,892,546 B2 | 5/2005 | Singh et al. |
| 6,919,809 B2 | 7/2005 | Blunn et al. |
| 6,947,972 B2 | 9/2005 | Chun |
| 6,955,302 B2 | 10/2005 | Erdman, Jr. |
| 6,957,110 B2 | 10/2005 | Wewalaarachchi et al. |
| 6,966,060 B1 | 11/2005 | Young et al. |
| 6,970,763 B2 | 11/2005 | Kato |
| 6,973,627 B1 | 12/2005 | Appling |
| 6,990,821 B2 | 1/2006 | Singh et al. |
| 7,006,524 B2 | 2/2006 | Freeman et al. |
| 7,009,510 B1 | 3/2006 | Douglass et al. |
| 7,024,283 B2 | 4/2006 | Bicknell |
| 7,026,925 B2 | 4/2006 | Roche et al. |
| 7,031,880 B1 | 4/2006 | Seem et al. |
| 7,062,389 B2 | 6/2006 | Johnson et al. |
| 7,068,931 B2 | 6/2006 | Tokunaga |
| 7,069,181 B2 | 6/2006 | Jerg et al. |
| 7,085,674 B2 | 8/2006 | Iwasawa |
| 7,107,268 B1 | 9/2006 | Zawadzki et al. |
| 7,113,085 B2 | 9/2006 | Havekost |
| 7,133,141 B1 | 11/2006 | Abi-Salch |
| 7,155,462 B1 | 12/2006 | Singh et al. |
| 7,171,287 B2 | 1/2007 | Weiss |
| 7,183,907 B2 | 2/2007 | Simon et al. |
| 7,206,646 B2 | 4/2007 | Nilson et al. |
| 7,243,044 B2 | 7/2007 | McCalla |
| 7,250,856 B2 | 7/2007 | Havekost et al. |
| 7,260,619 B2 | 8/2007 | Yoneda |
| 7,272,452 B2 | 9/2007 | Coogan et al. |
| 7,277,018 B2 | 10/2007 | Reyes et al. |
| 7,302,478 B2 | 11/2007 | Conrad |
| 7,308,539 B2 | 12/2007 | Fuhs et al. |
| 7,320,023 B2 | 1/2008 | Chintalapati et al. |
| 7,345,580 B2 | 3/2008 | Akamatsu et al. |
| 7,379,997 B2 | 5/2008 | Ehlers et al. |
| 7,386,586 B1 | 6/2008 | Headley et al. |
| 7,428,726 B1 | 9/2008 | Cowan et al. |
| 7,457,869 B2 | 11/2008 | Kernan |
| 7,460,020 B2 | 12/2008 | Reyes et al. |
| 7,490,319 B2 | 2/2009 | Blackwell et al. |
| 7,496,911 B2 | 2/2009 | Rowley et al. |
| 7,565,225 B2 | 7/2009 | Dushane et al. |
| 7,596,613 B2 | 9/2009 | Silverthorne et al. |
| 7,502,329 B2 | 10/2009 | Li et al. |
| 7,644,371 B2 | 1/2010 | Robertson et al. |
| 7,653,459 B2 | 1/2010 | Pouchak et al. |
| 7,703,073 B2 | 4/2010 | Illowsky et al. |
| 7,734,572 B2 | 6/2010 | Wiemeyer et al. |
| 7,760,081 B2 | 7/2010 | Eiden et al. |
| 7,774,457 B1 | 8/2010 | Talwar et al. |
| 7,782,302 B2 | 8/2010 | Lee et al. |
| 7,819,334 B2 | 10/2010 | Pouchak et al. |
| 7,826,929 B2 | 11/2010 | Wacker |
| 7,870,090 B2 | 1/2011 | McCoy et al. |
| 7,873,719 B2 * | 1/2011 | Bishop ............... H04L 41/065 709/223 |
| 7,886,031 B1 | 2/2011 | Taylor et al. |
| 7,890,927 B2 | 2/2011 | Eldridge et al. |
| 7,900,228 B2 | 3/2011 | Stark et al. |
| 7,904,186 B2 | 3/2011 | Mairs et al. |
| 7,904,608 B2 | 3/2011 | Price |
| 7,928,239 B2 | 4/2011 | Dumas et al. |
| 7,933,981 B1 | 4/2011 | Cannon, III et al. |
| 7,941,786 B2 | 5/2011 | Scott et al. |
| 7,953,847 B2 | 5/2011 | Grelewicz et al. |
| 8,059,301 B2 | 11/2011 | Eigenbrodt et al. |
| 8,060,602 B2 | 11/2011 | Singh et al. |
| 8,078,481 B2 | 12/2011 | Steinbarth et al. |
| 8,090,477 B1 | 1/2012 | Steinberg |
| 8,112,162 B2 | 2/2012 | Pouchak et al. |
| 8,144,028 B2 | 3/2012 | LaMothe et al. |
| 8,146,060 B2 | 3/2012 | Lekel |
| 8,185,871 B2 | 5/2012 | Nixon et al. |
| 8,190,273 B1 | 5/2012 | Federspiel et al. |
| 8,218,570 B2 * | 7/2012 | Moran ............... H04L 41/022 370/466 |
| 8,224,466 B2 | 7/2012 | Wacker |
| 8,224,763 B2 | 7/2012 | Guralnik et al. |
| 8,224,888 B2 | 7/2012 | Brindle |
| 8,225,292 B2 | 7/2012 | Naslavsky et al. |
| 8,239,500 B2 | 8/2012 | Pouchak |
| 8,255,896 B2 | 8/2012 | Wontorcik et al. |
| 8,301,386 B1 | 10/2012 | Redmond et al. |
| 8,335,593 B2 | 12/2012 | Johnson et al. |
| 8,341,049 B2 | 12/2012 | Gomes et al. |
| 8,341,599 B1 | 12/2012 | Angalet et al. |
| 8,347,291 B2 | 1/2013 | Marwinski |
| 8,352,047 B2 | 1/2013 | Walter |
| 8,417,666 B2 | 4/2013 | Bailor et al. |
| 8,499,060 B2 | 7/2013 | Narayanan et al. |

(56) References Cited

U.S. PATENT DOCUMENTS

| | | |
|---|---|---|
| 8,527,947 B2 | 9/2013 | Clemm |
| 8,572,502 B2 | 10/2013 | Dharwada et al. |
| 8,572,616 B2 | 10/2013 | Cai et al. |
| 8,577,940 B2 | 11/2013 | Tormasov et al. |
| 8,594,850 B1 | 11/2013 | Gourlay et al. |
| 8,600,556 B2 | 12/2013 | Nesler et al. |
| 8,640,098 B2 | 1/2014 | Nair et al. |
| 8,819,562 B2 | 8/2014 | Nair et al. |
| 8,850,347 B2 | 9/2014 | Marti |
| 8,892,954 B1 | 11/2014 | Gray et al. |
| 8,930,030 B2 | 1/2015 | Bester et al. |
| 8,938,557 B2 | 1/2015 | Meyer et al. |
| 8,954,016 B2 | 2/2015 | Seiler et al. |
| 8,965,850 B2 | 2/2015 | Varadarajan |
| 8,984,169 B2 | 3/2015 | Mera et al. |
| 9,026,253 B2 | 5/2015 | Majewski et al. |
| 9,043,463 B1 | 5/2015 | Cohn et al. |
| 9,122,535 B2 | 9/2015 | Soundararajan et al. |
| 9,158,531 B2 | 10/2015 | Lin |
| 9,239,718 B2 | 1/2016 | Grinberg et al. |
| 9,280,337 B2 | 3/2016 | Palaniappan |
| 9,389,850 B2 | 7/2016 | Walter et al. |
| 9,395,711 B2 | 7/2016 | Clark et al. |
| 9,423,789 B2 | 8/2016 | Cornett et al. |
| 9,578,465 B2 | 2/2017 | Da Silva Neto et al. |
| 2002/0002425 A1 | 1/2002 | Dossey et al. |
| 2002/0073076 A1 | 6/2002 | Xu et al. |
| 2002/0122073 A1 | 9/2002 | Abrams et al. |
| 2002/0152298 A1 | 10/2002 | Kikta et al. |
| 2003/0078677 A1 | 4/2003 | Hull et al. |
| 2003/0101009 A1 | 5/2003 | Seem |
| 2003/0171851 A1 | 9/2003 | Brickfield et al. |
| 2003/0217357 A1 | 11/2003 | Parry |
| 2004/0027004 A1 | 2/2004 | Bayoumi et al. |
| 2004/0138981 A1 | 7/2004 | Ehlers et al. |
| 2004/0143510 A1 | 7/2004 | Haeberle et al. |
| 2004/0230328 A1 | 11/2004 | Armstrong et al. |
| 2005/0038571 A1 | 2/2005 | Brickfield et al. |
| 2005/0043862 A1 | 2/2005 | Brickfield et al. |
| 2005/0071457 A1 | 3/2005 | Yang-Huffman et al. |
| 2005/0143863 A1 | 6/2005 | Ruane et al. |
| 2005/0193285 A1 | 9/2005 | Jeon |
| 2005/0201393 A1 | 9/2005 | Hatayama et al. |
| 2005/0203490 A1 | 9/2005 | Simonson |
| 2005/0222889 A1* | 10/2005 | Lai .................. G06Q 10/06 705/7.13 |
| 2006/0020962 A1 | 1/2006 | Stark et al. |
| 2006/0038672 A1 | 2/2006 | Schoettle |
| 2006/0058923 A1 | 3/2006 | Kruk et al. |
| 2006/0064305 A1* | 3/2006 | Alonso .................. G06Q 10/06 705/314 |
| 2006/0069886 A1 | 3/2006 | Sandoval |
| 2006/0077726 A1 | 4/2006 | Simmitsu |
| 2006/0095835 A1 | 5/2006 | Kennedy et al. |
| 2006/0136558 A1 | 6/2006 | Sheehan et al. |
| 2006/0168013 A1 | 7/2006 | Wilson et al. |
| 2006/0253205 A1 | 11/2006 | Gardiner |
| 2006/0265708 A1 | 11/2006 | Blanding et al. |
| 2007/0078913 A1 | 4/2007 | Crescenti et al. |
| 2007/0123249 A1 | 5/2007 | Sun |
| 2007/0198674 A1 | 8/2007 | Li et al. |
| 2008/0005787 A1 | 1/2008 | Aldred |
| 2008/0010049 A1 | 1/2008 | Pouchak et al. |
| 2008/0189162 A1 | 8/2008 | Ganong et al. |
| 2008/0301668 A1 | 12/2008 | Zachmann |
| 2009/0055914 A1 | 2/2009 | Azami |
| 2009/0106684 A1 | 4/2009 | Chakra et al. |
| 2009/0113037 A1 | 4/2009 | Pouchak |
| 2009/0205040 A1 | 8/2009 | Zunke |
| 2009/0287526 A1 | 11/2009 | Ramkumar et al. |
| 2009/0295571 A1 | 12/2009 | Hosey |
| 2009/0319532 A1 | 12/2009 | Akelbein et al. |
| 2010/0031324 A1 | 2/2010 | Strich et al. |
| 2010/0106543 A1 | 4/2010 | Marti |
| 2010/0131653 A1 | 5/2010 | Dharwada et al. |
| 2010/0131877 A1 | 5/2010 | Dharwada et al. |
| 2010/0198651 A1 | 8/2010 | Johnson et al. |
| 2010/0251184 A1 | 9/2010 | Majewski et al. |
| 2010/0286937 A1 | 11/2010 | Hedley et al. |
| 2011/0010654 A1 | 1/2011 | Raymond et al. |
| 2011/0083077 A1 | 4/2011 | Nair et al. |
| 2011/0087731 A1 | 4/2011 | Wong et al. |
| 2011/0093493 A1 | 4/2011 | Nair et al. |
| 2011/0098863 A1 | 4/2011 | Miki |
| 2011/0113360 A1 | 5/2011 | Johnson et al. |
| 2011/0196539 A1 | 8/2011 | Nair et al. |
| 2011/0225580 A1 | 9/2011 | Nair et al. |
| 2011/0298608 A1 | 12/2011 | Ranjan et al. |
| 2011/0316688 A1 | 12/2011 | Ranjan et al. |
| 2012/0005731 A1 | 1/2012 | Lei et al. |
| 2012/0011496 A1 | 1/2012 | Shimamura |
| 2012/0166992 A1 | 6/2012 | Huynh et al. |
| 2013/0218889 A1 | 8/2013 | Marti et al. |
| 2014/0114440 A1 | 4/2014 | Marti et al. |
| 2014/0280878 A1 | 9/2014 | Hardin et al. |
| 2014/0289202 A1 | 9/2014 | Chan et al. |
| 2014/0344798 A1 | 11/2014 | Sasaki |
| 2015/0007157 A1 | 1/2015 | Park et al. |
| 2015/0105878 A1 | 4/2015 | Jones et al. |
| 2015/0112989 A1 | 4/2015 | Marti et al. |
| 2015/0201020 A1 | 7/2015 | Gueta |
| 2015/0295998 A1 | 10/2015 | Morrill et al. |
| 2017/0102680 A1 | 4/2017 | Marti et al. |

FOREIGN PATENT DOCUMENTS

| | | |
|---|---|---|
| WO | WO 03/090038 | 10/2003 |
| WO | WO 2004/053772 | 6/2004 |
| WO | WO 2004/055608 | 7/2004 |
| WO | WO 2004/070999 | 8/2004 |
| WO | WO 2005/020167 | 3/2005 |
| WO | WO 2006/048397 | 5/2006 |
| WO | WO 2007/024622 | 3/2007 |
| WO | WO 2007/024623 | 3/2007 |
| WO | WO 2007/027685 | 3/2007 |
| WO | WO 2007/082204 | 7/2007 |

OTHER PUBLICATIONS

Atere-Roberts et al., "Implementation of a Computerized Maintenance Management System for the City of Atlanta," 13 pages, Proceedings of the Water Environment Federation, Jan. 1, 2002.

Bersoff et al., "Impacts of Life Cycle Models on Software," Communications of the ACM, vol. 34, No. 8, pp. 104-118, Aug. 1991.

Business Objects, Crystal Reports Access, Format, and Integrate Data, 4 pages, Dec. 2003.

U.S. Appl. No. 14/327,451, filed Jul. 9, 2014.

Honeywell Spyder Bacnet User's Guide, 242 pages, Revised Jul. 2009.

Honeywell Spyder User's Guide 202 pages, Released Jul. 2007.

Honeywell, "ComfortPoint Open BMS Release 100," Specification and Technical Data, 13 pages, Jun. 2012.

Honeywell, "Excel Building Supervisor-Integrated R7044 and FS90 Ver. 2.0," Operator Manual, 70 pages, Apr. 1995.

Honeywell, "Excel 15B W7760B Building Manager," User's Guide, 84 pages, Revised Jan. 2005.

http://blogs.msdn.com/b/khen1234/archive/2005/05/11/416392. aspx, "Regular Expressions in T-SQL," 4 pages, May 11, 2005.

http://domin.dom.edu/documents/emaildocs/outlook/, "Outlook Web Access 2003," 19 pages, printed Nov. 7, 2013.

http://en.wikipedia.org/wiki/JAR_(file_format), "JAR (file Format)—Wikipedia, the Free Encyclopedia," 3 pages, printed Dec. 26, 2009.

http://www.de2m.com/DE2R_Technical.html, "Data Enabled Enterprise Repository (DE2R) Technical Overview," 4 pages, printed Mar. 8, 2013.

http://www.google.com/maps, "Google Maps, Pin Location," 1 page, prior to Nov. 21, 2008.

(56) References Cited

OTHER PUBLICATIONS

Johnson Controls, "Fx Workbench, User's Guide," 818 pages, issued May 19, 2008, (this article will be uploaded to USPTO website in 5 parts).
Kalavade et al., "A Hardware-Software Codesign Methodology for DSP Applications," IEEE Design and Test of Computers, pp. 16-28, 1993.
Magnusson et al., "Simics: A Full Simulation Platform," IEEE, pp. 50-58, 2002.
McCown et al., "APSIM: A Novel Software System for Model Development, Model Testing and Simulation in Agricultural Systems Research," Agricultural Systems, vol. 50, pp. 255-271, 1996.
Microsoft Word Screen Shots, 2 pages, prior to Nov. 21, 2008.
Niagara, "Niagara AX-3.x User Guide," Tridium Inc., 436 pages, 2007.
Novar, "Opus Supervisor User Guide," pp. 1-159, Feb. 1, 2012.
Novar, "Demand Response, Program Implementation and Execution," 8 pages, Oct. 28, 2008.
Novar, "Media Backgrounder," 10 pages, prior to Feb. 22, 2012.
Pressman, "Software Engineering Notes—Compiled from Software Engineering a Practitioner's Approach," Fifth Edition, 67 pages, 2009.
Siemens, BACnet for DESIGO 27 Pages, prior to Dec. 30, 2009.
Simunic et al, "Cycle-Accurate Simulation of Energy Consumption in Embedded Systems," ACM, pp. 867-872, 1999.
Trane, "System Programming, Tracer Summit Version 14, BMTW-SVP01D-EN," 623 pages, 2002.
Trane, "Tracer MP580/581 Programmable Controllers," CNT-PRC002-EN, Mar. 2003.
Tridium, "NiagaraAX Product Model Overview," 7 pages, 2005.
Tridium, "Tridium & Niagara Framework Overview," 9 pages, prior to Oct. 28, 2008.
Vykon by Tridium, "Niagara Browser Access Guide," 125 pages, revised Aug. 15, 2002.
Vykon by Tridium, "Niagara Networking & Connectivity Guide," Niagara Release 2.3, 245 pages, 2002.
http://www.loytec.com/products/web/lweb-900, "LWEB-900 Integrated Building Management System," 5 pages, printed Nov. 15, 2014.
Samsung, "Intelligent Building Management System, ControlCity-NX," 20 pages, May 31, 2012.
U.S. Appl. No. 14/862,715, filed Sep. 23, 2015.
U.S. Appl. No. 14/862,858, filed Sep. 23, 2015.

* cited by examiner

Primary Key(s): categoryType_Id — 27

| Field | Type | Nulls? | Comments |
|---|---|---|---|
| categoryType_id | int - Identity | No | Description: Unique identity id |
| categoryType | nvarchar (24) | Yes | Description: Category type descriptor. |

| Index Name | Unique | Clustered | Fields |
|---|---|---|---|
| PK_categoryTypes | Yes | Yes | categoryType_id |

No Check Constraints
No Internal Foreign Keys

| Primary Key as Foreign Key Constraint | Affected Table | Affected Field |
|---|---|---|
| FK_categoryNames_categoryTypes | categoryNames | categoryType_id |
| FK_siteCategory_categoryTypes | siteCategory | categoryType_id |

*Figure 9*

Primary Key(s): categoryName_id

| Field | Type | Nulls? | Comments |
|---|---|---|---|
| categoryName_id | int - Identity | No | Description: Unique identity id |
| categoryType_id | int | No | Description: This is a foreign key reference into the categoryTypes table |
| categoryName | nvarchar (24) | Yes | Description: Category Name descriptor. |

| Index Name | Unique | Clustered | Fields |
|---|---|---|---|
| PK_categoryNames | Yes | Yes | categoryName_id |

No Check Constraints

| Internal Foreign Key Constraint | Affected Field | Source Table |
|---|---|---|
| FK_categoryNames_categoryTypes | categoryType_id | categoryTypes |

| Primary Key as Foreign Key Constraint | Affected Table | Affected Field |
|---|---|---|
| FK_siteCategory_categoryNames | siteCategory | categoryName_id |

*Figure 10*

Primary Key(s): site_id, categoryType_id

| Field | Type | Nulls? | Comments |
|---|---|---|---|
| site_id | int | No | Description: This is a foreign key reference into the site table. |
| categoryType_id | int | No | Description: This is a foreign key reference into the categoryTypes table. |
| categoryName_id | int | No | Description: This is a foreign key reference into the categoryNames table. |

| Index Name | Unique | Clustered | Fields |
|---|---|---|---|
| PK_siteCategory | Yes | Yes | site_id, categoryType_id |

No Check Constraints

| Internal Foreign Key Constraint | Affected Field | Source Table |
|---|---|---|
| FK_siteCategory_categoryNames | categoryName_id | categoryNames |
| FK_siteCategory_categoryTypes | categoryType_id | categoryTypes |
| FK_siteCategory_site | site_id | site |

No External Foreign Keys

*Figure 11*

GROUP TABLE
OPUS ENTERPRISE MODEL DATA (EMD) GROUP DESIGNATIONS

| group_id | enterprise_id | group_number | group_name | group_code |
|---|---|---|---|---|
| 1 | 1 | 50 | CTC | |
| 2 | 1 | 51 | XYZ | |
| 3 | 1 | 52 | Opus | |
| 5 | 1 | 54 | WM | |
| 6 | 1 | 75 | Save | |
| NULL | NULL | NULL | NULL | NULL |

*Figure 12*

SITE TABLE
OPUS ENTERPRISE MODEL DATA SITE INSTANCES

| site_id | group_id | site_number | site_name | country | state | city |
|---|---|---|---|---|---|---|
| 1 | 1 | 420 | 420BurlingtonON | CA | ON | Burlington | ... |
| 2 | 1 | 7135 | 7135TorontoON | CA | ON | Toronto | ... |
| 3 | 1 | 3198 | 3198WinnepegMB | CA | MB | Winnepeg | ... |
| 4 | 2 | 762 | 762MedinaOH | US | OH | Medina | ... |
| 5 | 2 | 5436 | 5436ClevelandOH | US | OH | Cleveland | ... |
| 6 | 2 | 879 | 879DemoStation... | US | OH | DemoStation | ... |
| 7 | 2 | 9012 | 9012EriePA | US | PA | Erie | ... |
| 8 | 3 | 4321 | 4321ClevelandOH | US | OH | Cleveland | ... |
| 9 | 3 | 8109 | 8109AshlandOH | US | OH | Ashland | ... |
| 11 | 5 | 5261 | 5261PinevilleMO | US | MO | Pineville | ... |
| 12 | 6 | 1234 | 1234BentonvilleAR | US | AR | Bentonville | ... |
| *NULL* | *NULL* | *NULL* | *NULL* | *NULL* | *NULL* | *NULL* | |

CATEGORY TYPE TABLE
DISTINCT SITE CATEGORY TYPE DESIGNATIONS

| categoryType_id | categoryType |
|---|---|
| 1 | Region |
| 2 | Utility |
| * | NULL |

CATEGORY NAME TABLE
DISTINCT SITE CATEGORY NAME DESIGNATIONS

| categoryName_id | categoryType_id | categoryName |
|---|---|---|
| 1 | 1 | East |
| 2 | 2 | FirstEnergy |
| 3 | 1 | North |
| 4 | 2 | OldDominion |
| 5 | 1 | South |
| 6 | 1 | Midwest |
| 7 | 2 | AcmePowerLight |
| *NEW* | *NEW* | *NEW* |

*Figure 15*

SITE CATEGORY TABLE

| site_id | categoryType_id | categoryName_id |
|---------|-----------------|-----------------|
| 1 | 1 | 1 |
| 2 | 2 | 2 |
| 2 | 1 | 3 |
| 4 | 2 | 4 |
| 4 | 1 | 6 |
| 5 | 2 | 7 |
| 5 | 1 | 5 |
| 7 | 2 | 7 |
| 7 | 1 | 3 |
| NULL | 2 | 4 |
| NULL | NULL | NULL |

*Figure 16*

SQL RESULT 35

| | categoryType | categoryName |
|---|---|---|
| 1 | Region | East |
| 2 | Region | North |
| 3 | Region | South |
| 4 | Region | Midwest |
| 5 | Utility | FirstEnergy |
| 6 | Utility | OldDominion |
| 7 | Utility | AcmePowerLight |

*Figure 17*

| site_number | city | state |
|---|---|---|
| 1 | 762 | Medina | OH |
| 2 | 5436 | Cleveland | OH |

SQL RESULT

Figure 19

BUILDING MANAGEMENT SYSTEM SITE CATEGORIES

The present application is a Continuation of U.S. patent application Ser. No. 12/896,842, filed Oct. 1, 2010, which in turn is a Continuation-in-Part of U.S. patent application Ser. No. 12/260,046, filed Oct. 28, 2008, and entitled "A Building Management Configuration System".

The present application is a Continuation of U.S. patent application Ser. No. 12/896,842, filed Oct. 1, 2010, which in turn is a Continuation-in-Part of U.S. patent application Ser. No. 12/895,590, filed Sep. 30, 2010, entitled "A Site Controller Discovery and Import System"; U.S. patent application Ser. No. 12/895,609, filed Sep. 30, 2010, and entitled "A Quick Connect and Disconnect, Base Line Configuration, and Style Configurator"; and U.S. patent application Ser. No. 12/895,640, filed Sep. 30, 2010, and entitled "A User Interface List Control System".

U.S. patent application Ser. No. 12/896,842, filed Oct. 1, 2010, is hereby incorporated by reference. U.S. patent application Ser. No. 12/260,046, filed Oct. 28, 2008, is hereby incorporated by reference. U.S. patent application Ser. No. 12/895,590, filed Sep. 30, 2010, is hereby incorporated by reference. U.S. patent application Ser. No. 12/895,609, filed Sep. 30, 2010, is hereby incorporated by reference. U.S. patent application Ser. No. 12/895,640, filed Sep. 30, 2010, is hereby incorporated by reference.

BACKGROUND

The present disclosure pertains to controllers and particularly to site controllers. More particularly, the disclosure pertains to groupings or categories as related to controllers.

SUMMARY

The disclosure relates to an approach pertaining to providing a user an ability to place sites into multiple categories and providing applications an ability to query a configuration for members of the categories. The approach not only may provide a user an ability to easily create, deploy, modify and monitor a multi-site enterprise hundreds and thousands of remote building management system site controllers and allow the user to establish each site within the context of a single enterprise group, but it may also incorporate where the site controllers can be identified, sorted or managed within multiple categorical groupings. For example, categorical groupings may facilitate managing the configurations at the sites, applying an operational setting by selecting a logical category, applying common operating parameters to multiple sites, and so forth.

BRIEF DESCRIPTION OF THE DRAWING

FIGS. 9, 10 and 11 are diagrams revealing a data dictionary for new tables;

FIG. 12 is a diagram of a group table showing model data and group designations;

FIG. 13 is a diagram of a site table showing model data site instances;

FIG. 14 is a diagram of a category type table showing distinct site category type designations;

FIG. 15 is a diagram of a category name table showing distinct site category name designations;

FIG. 16 is a diagram of a site category table;

FIG. 17 is a diagram of a table showing an example structured query language result with category type and category name headings;

FIG. 19 is a diagram of a table showing an example SQL result with site number, city and state headings;

FIG. 54 is a diagram of a screen showing an alarm console view with alarms differentiated by the group, site and XCM names of where each alarm came from;

DESCRIPTION

An Opus™ Supervisor user application may provide a user the ability to easily create, deploy, modify and monitor a multi-site enterprise hundreds and thousands of remote Opus building management systems (BMS) XCM site controllers. The Opus Supervisor allows the user to establish each site within the context of a single enterprise group. Further requirements may include where the Opus XCM site controllers need to be identified, sorted or managed within multiple categorical groupings. The following use case scenarios will serve to communicate the problems this invention will solve.

A user scenario may be noted. The Opus customer needs to participate in an enterprise-wide power demand reduction program where multiple XCM site controllers will be triggered to shed energy use. Within the Opus Supervisor, sites can be categorized into electrical utility provider categories. When the signal to reduce energy is sent to the Opus Supervisor, it can relay the signal to the sites in the appropriate utility category. This categorical grouping may facilitate both managing the configurations at the sites as well as report generation.

Another user scenario may be noted. The Opus customer needs to apply common operating parameters and occupancy schedule updates to multiple sites that are grouped in the same geographical region or by other common site property. The user needs to be able to quickly and easily apply the operational setting by selecting the logical category and upon initiation of the batch operation. The Opus Supervisor may send the change to all the sites in the select category.

An example would be if the user needs to apply a holiday occupancy schedule change to set of sites within a common region. This also may require a convenient method to identify the target sites.

This disclosure may relate specifically to the design and implementation of providing the user the ability to place sites into multiple categories and providing applications the ability to query this configuration for the members of the categories.

The present disclosure may be related to the context of U.S. patent application Ser. No. 12/260,046, filed Oct. 28, 2008, and entitled "A Building Management Configuration System". In order to identify and manage the remote sites in one or more categorical groups, the user is required to attach Opus Site Category property markers to the site level configuration. The user will attach one or more of these markers to specifically assign the site to a category. A table shown in FIG. 3 may serve as an example.

A symbol, as referred to herein relative to the Figures, may be representative of a step, process, action, module, block hardware, software or other representable items.

Figure 1:
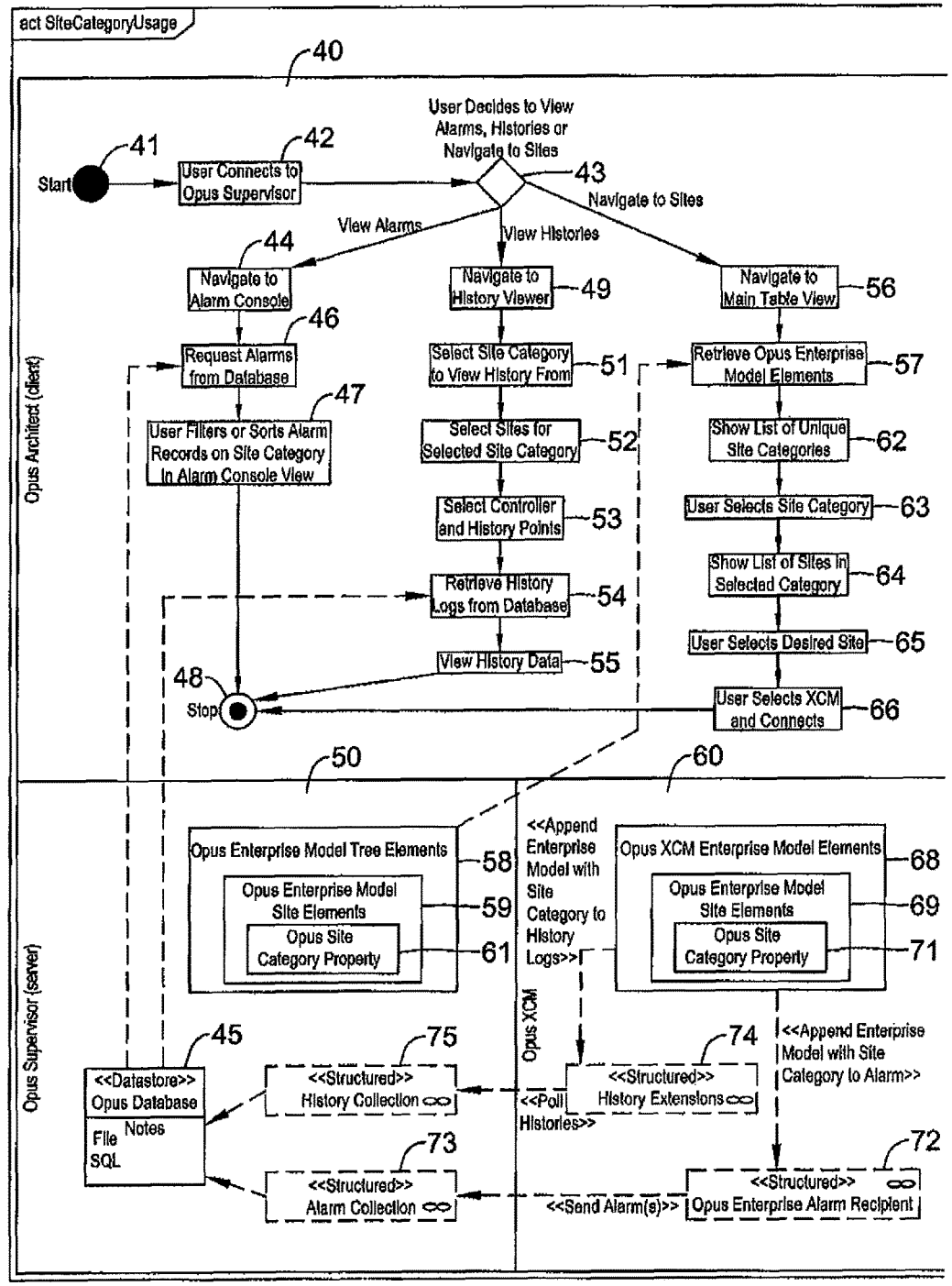
FIG. 1 is a flow diagram of site category usage.

FIG. 1 is a flow diagram of site category usage. In block 40, representing an Opus architect (client), from a start 41, a user may connect to an Opus supervisor at symbol 42. At symbol 43, the user may view alarms, view histories or navigate to sites. The user may first view alarms by navigating to an alarm console at symbol 44. At symbol 46, alarms may be requested from an Opus database (data store) 45, in the Opus supervisor server at symbol 50. The user may filter or sort alarm records on a site category in the alarm console view at symbol 47. This approach may come to a stop 48.

The user may also from symbol 43 view histories by first navigating to a history viewer at symbol 49. At symbol 51, a site category may be selected from which a history may be viewed. Sites may be selected for the selected site category at symbol 52. At symbol 53, a controller and history points may be selected. History logs may be retrieved from the Opus database 45 at symbol 54. At symbol 55, history data may be viewed. The user may stop at symbol 48.

The user may also from symbol 43 navigate to a site. To start, the user may navigate to a main table view at symbol 56. At symbol 57, Opus enterprise model elements may be retrieved at the Opus supervisor server at symbol 50 from a symbol 58 representing Opus enterprise model tree elements. Within symbol 58 may be a symbol 59 representing Opus enterprise model site elements. Within a symbol 59 may be a symbol 61 representing an Opus site category property. Upon retrieving Opus enterprise model elements at symbol 57, a list of unique site categories may be shown at symbol 62. At symbol 63, the user may select a site category. A list of sites in the selected category may be shown at symbol 64. A desired site may be selected from the list by the user at symbol 65. Then the user may select an XCM and connect to it at symbol 66. The approach may stop at symbol 48.

An opus XCM at symbol 60 may, like the Opus supervisor server at symbol 50, also have Opus enterprise model tree elements represented at symbol 68, and within that symbol have a symbol 69 representing Opus enterprise model site elements. Within symbol 69 may be a symbol 71 representing an Opus site category property. From symbol 68 to symbol 72, one may append an enterprise model with a site category to alarms. An Opus enterprise alarm recipient at symbol 72 may send an alarm or alarms to an alarm collection at symbol 73 which can be provided to the Opus database at symbol 45. From symbol 68 to symbol 74, one may append an enterprise model with a site category to history logs. Enterprise model appending may indicate Opus enterprise information (e.g., group, site, XCM, and so forth) as well as new site category information that is being added to the alarm/history. This may be generalized to "enterprise information". History extensions at symbol 74 may poll histories provided to a history collection at symbol 75, which can be provided to the Opus database at symbol 45.

Figure 2:
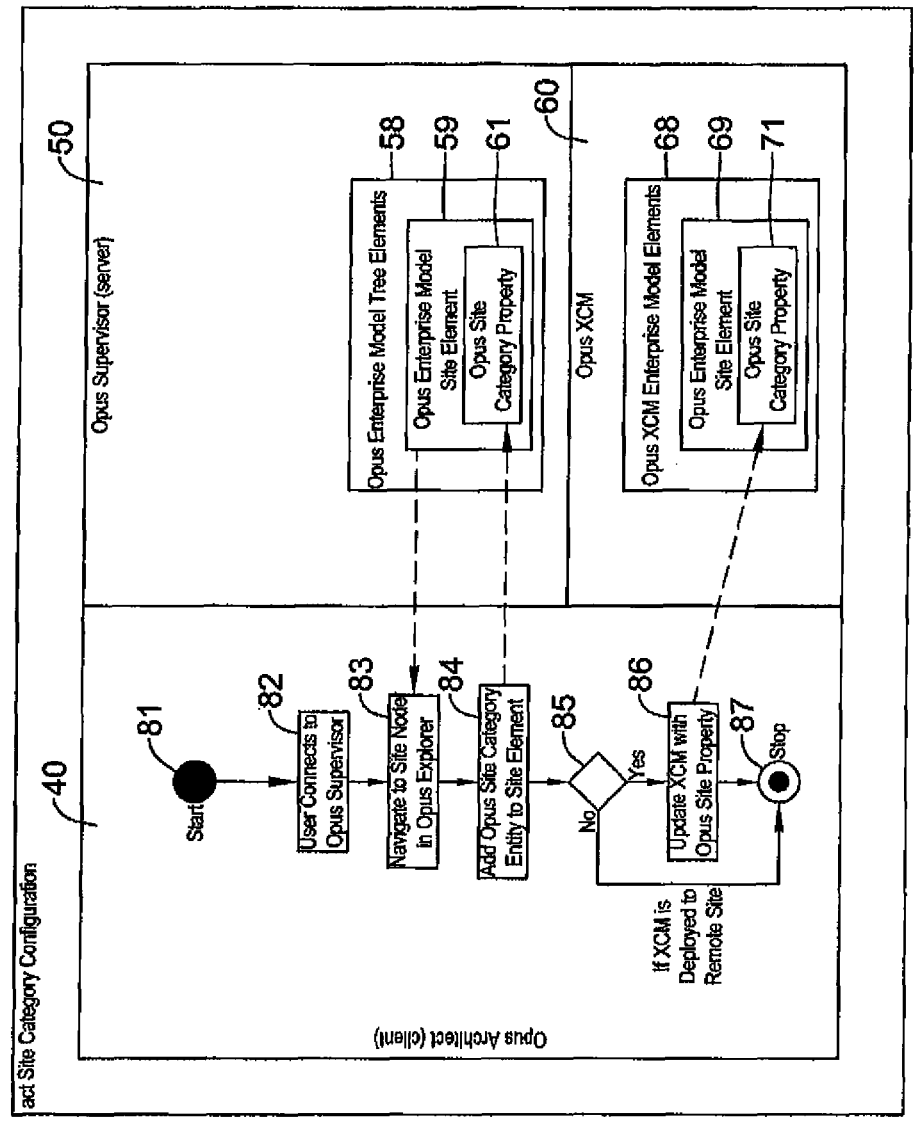
FIG. 2 is a diagram relating to site category configuration.

FIG. 2 is a diagram relating to site category configuration. In block 40, representing the Opus architect (client), from a start 81, a user may connect to an Opus supervisor at symbol 82. At symbol 83, the user may navigate to a site node in an Opus explorer. At symbol 83, an Opus enterprise site element 59 may be obtained from the Opus enterprise model tree elements at symbol 58 in the Opus supervisor server of block 50. An Opus site category entity at symbol 84 may be added to a site element at the Opus list category property at symbol 61 of the Opus supervisor server in block 50. At symbol 85, an XCM may or may not be deployed to a remote site. If not, then the approach may stop at symbol 87. If the XCM is deployed to the remote site, then the XCM may be updated with an Opus site category property at symbol 86. Then the approach may stop at symbol 87.

Figure 3:
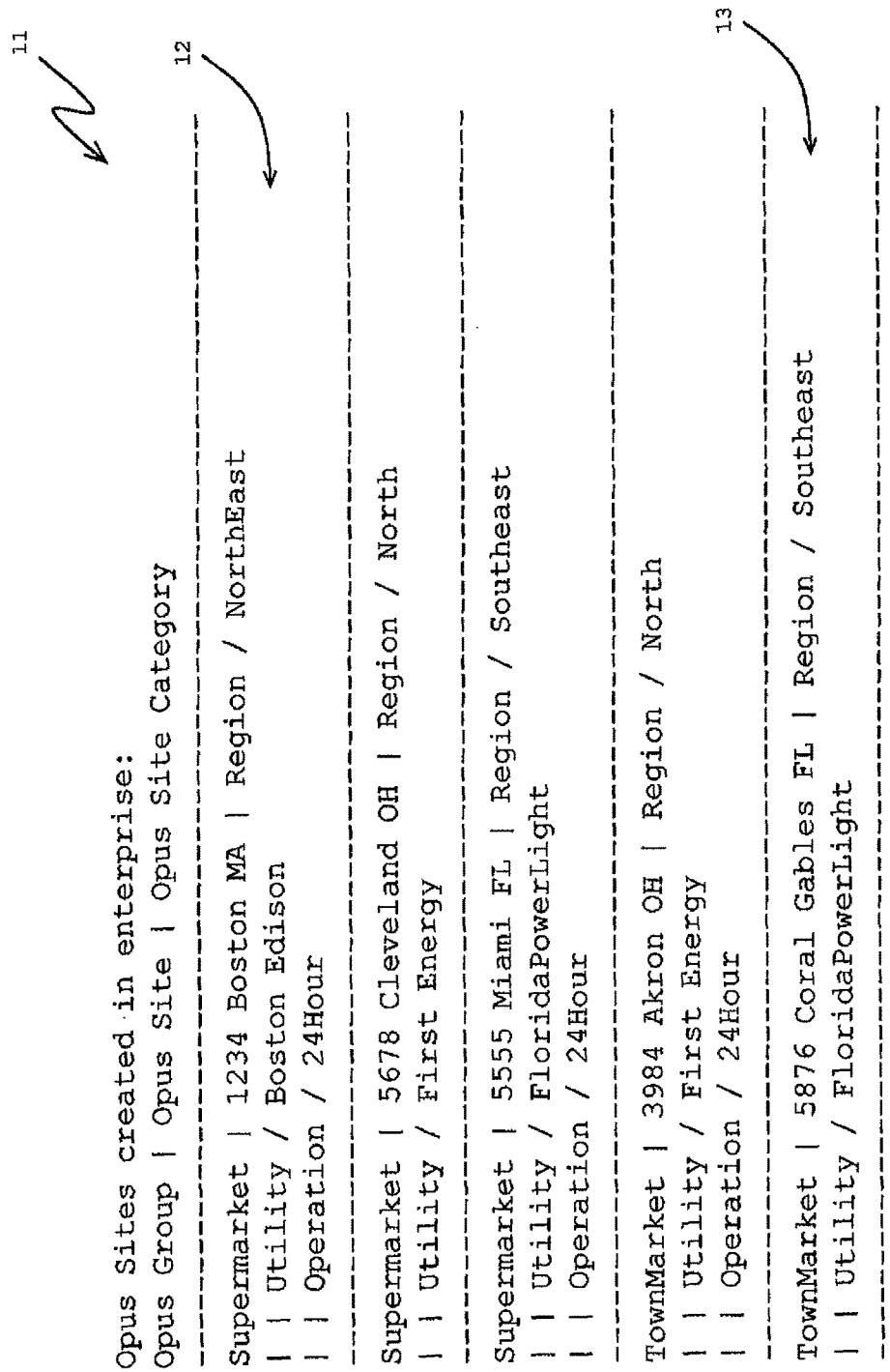
FIG. 3 shows a table of sites showing a group, site and site category.

FIG. 3 shows a table 11 of Opus sites created in Enterprise, with the Opus group, Opus site and Opus site category, and in some cases with the utility and duration of operation for each site. For instance, a first site 12 indicates it to be in an Opus group of a supermarket, an Opus site of 1234 Boston, Mass., and an Opus category of Region/NorthEast. The utility associated with this site is indicated as Boston Edison. It has a site category operation of 24 hour duration. In another instance, a fifth site 13 indicates it to be in an Opus group of a townmarket, an Opus site of 5876 Coral Gables, Fla. and an Opus category of Region/SouthEast. The utility associated with this site is indicated as Florida Power Light. No operation site category duration is indicated.

The site category properties attached to each site may be persisted into the Opus Supervisor database in a schema that will allow for the Opus Supervisor and other external applications to easily query the database for a list of all the sites in a specified category. For example, if the application queried the database for all the sites in the table of FIG. 3 that are in the Southeast region, the results would include the two sites 5555 Miami and 5876 Coral Gables. Once the desired sites have been determined, the application can perform its operation on those sites.

A characteristic of the present approach is the ability to quickly and easily mark, identify and query sites within multiple categories for multiple application purposes. The approach for accomplishing this in the Opus Supervisor enforces consistency by allowing the user to configure using drop down lists of previously defined categories.

The Opus Supervisor previously only allowed for sites to be established into a single enterprise model group. Also, the Opus Supervisor foundation Niagara™ AX Framework, provided no consistent neither a site level model reference nor an approach for categorizing into multiple groupings.

The present approach may consist of two parts. The first part is the configuration of the site categories and the second part is the MS-SQL (structured query language) database schema and query design for utilizing the site categories.

The configuration is accomplished within the Opus Supervisor by attaching a new OpusSiteCategory identifier property to the Opus Site component of the Opus Enterprise Model. The OpusSiteCategory property allows the user to create new or reuse existing site category type/name sets. A type/name set is a one to many dimensions for multiple instances of the same category. A sample would be a single site category type of 'Region' and would have multiple site category names such as 'North', 'South', 'East' and 'West'. As OpusSiteCategory sets are created, the Opus Supervisor will save the entries into an internal OpusListControl framework that will allow the user to reuse previously established OpusSiteCategory sets. This is ensuring consistency in the configuration across all the sites in the enterprise. The Opus Supervisor allows for multiple OpusSiteCategory sets to be attached to each site instance. The configuration is built into the Opus Supervisor configuration (XML bog) file and will be used directly by the Opus Supervisor views. There are samples of the Opus Supervisor rendering Navigation Table views by using the Niagara AX BQL (Baja query language) query to obtain the OpusSiteCategory sets across the enterprise.

Figure 4:
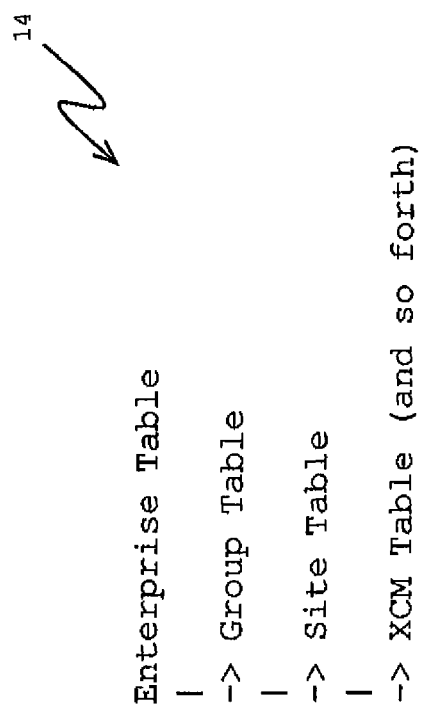
FIG. 4 is a diagram of a table hierarchy.
Figure 8:
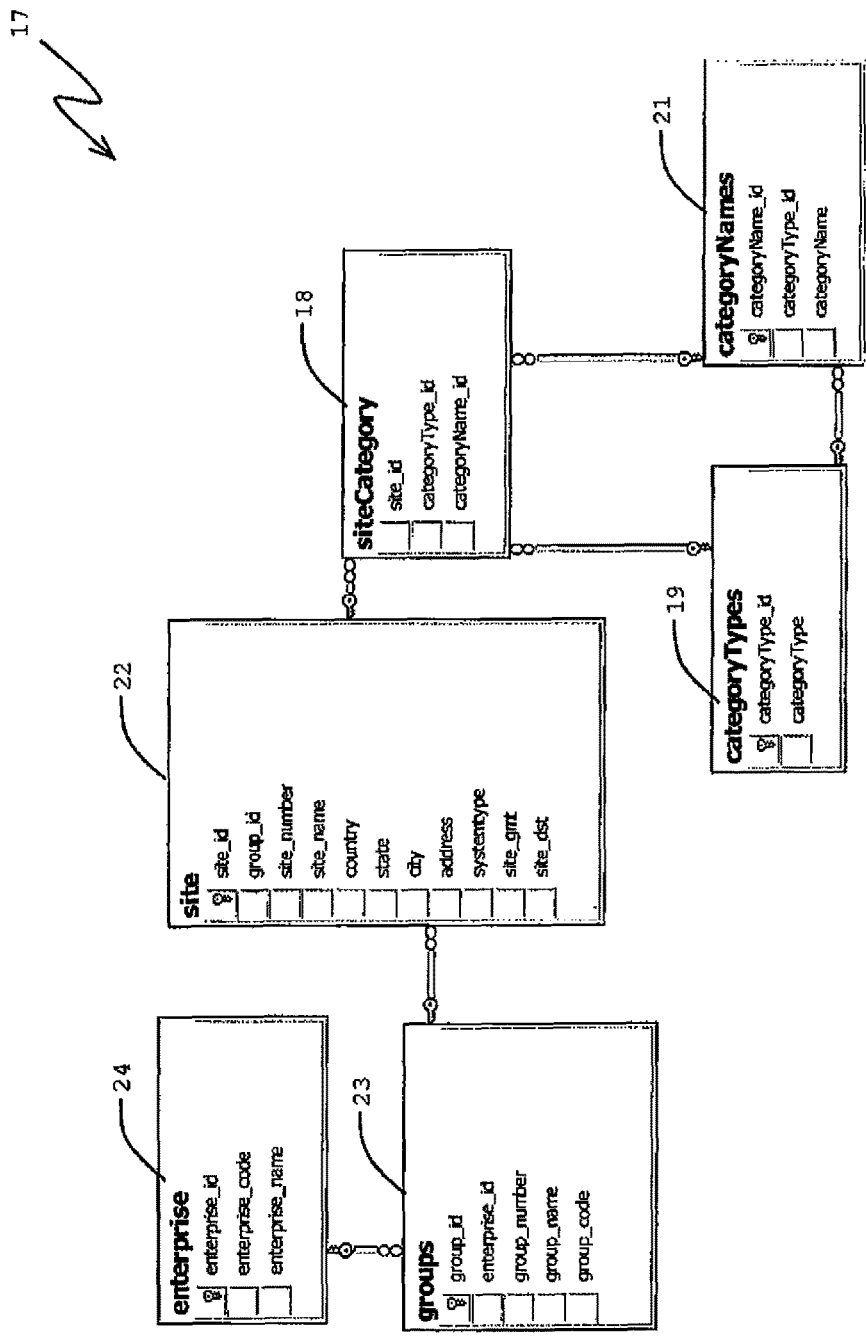
FIG. 8 is a diagram showing a schema that captures an example of site category, category type and category name tables.

The configuration of the OpusSiteCategory sets can also be persisted to the MS-SQL database. FIG. 8 shows the related table schema to support this feature. The Opus SQL schema had previously been established with the table hierarchy shown in FIG. 4. A table hierarchy 14 shows the Enterprise table showing a group table, a site table and an XCM table (and so forth) following from it.

Figure 5:
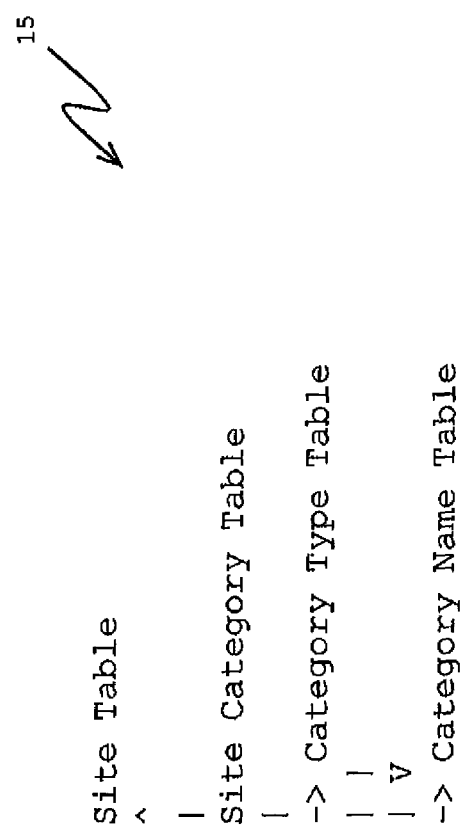
FIG. 5 is a diagram showing a list of tables such as a site table, site category table, a category type table and a category name table.

The implementation of the present approach was to create additional tables to the existing Opus SQL schema. These tables are listed in FIG. 5. The tables listed in diagram 15 are the site table, the site category table, a category type table and a category name table.

The Category Type and Category Name tables will contain the distinct OpusSiteCategory sets created across the enterprise by the Opus Supervisor. In the previously used example, there would be on table entry 'Region' in the Category Type table and it would relate to four entries, 'North', 'South', 'East' and 'West' in the Category Name table. The Site Category Table contains all the specific site to site category set relationships established in the configuration. For example, if site 5678 Cleveland Ohio is in the OpusSiteCategory of Region/North, the entry in the table would be a reference set of an ID to the 5678 Cleveland Ohio site in the site table and ID's to the category set Region/North in the Category Type and Category Name tables.

Also, provided are the MS-SQL queries required to retrieve the distinct OpusSiteCategory sets and also a query to retrieve all the sites in a specified OpusSiteCategory set.

The new Opus Supervisor component used to configure Opus sites into more than on site categories is the OpusSiteCategoryEntity found in the OpusEnterprise module palette. The user will select the component and drag and drop into the Opus Site component property sheet. The user then can enter a new Opus Site Category type/name set or can use the drop down list selectors to re-use a previous type/name set.

Figure 6:
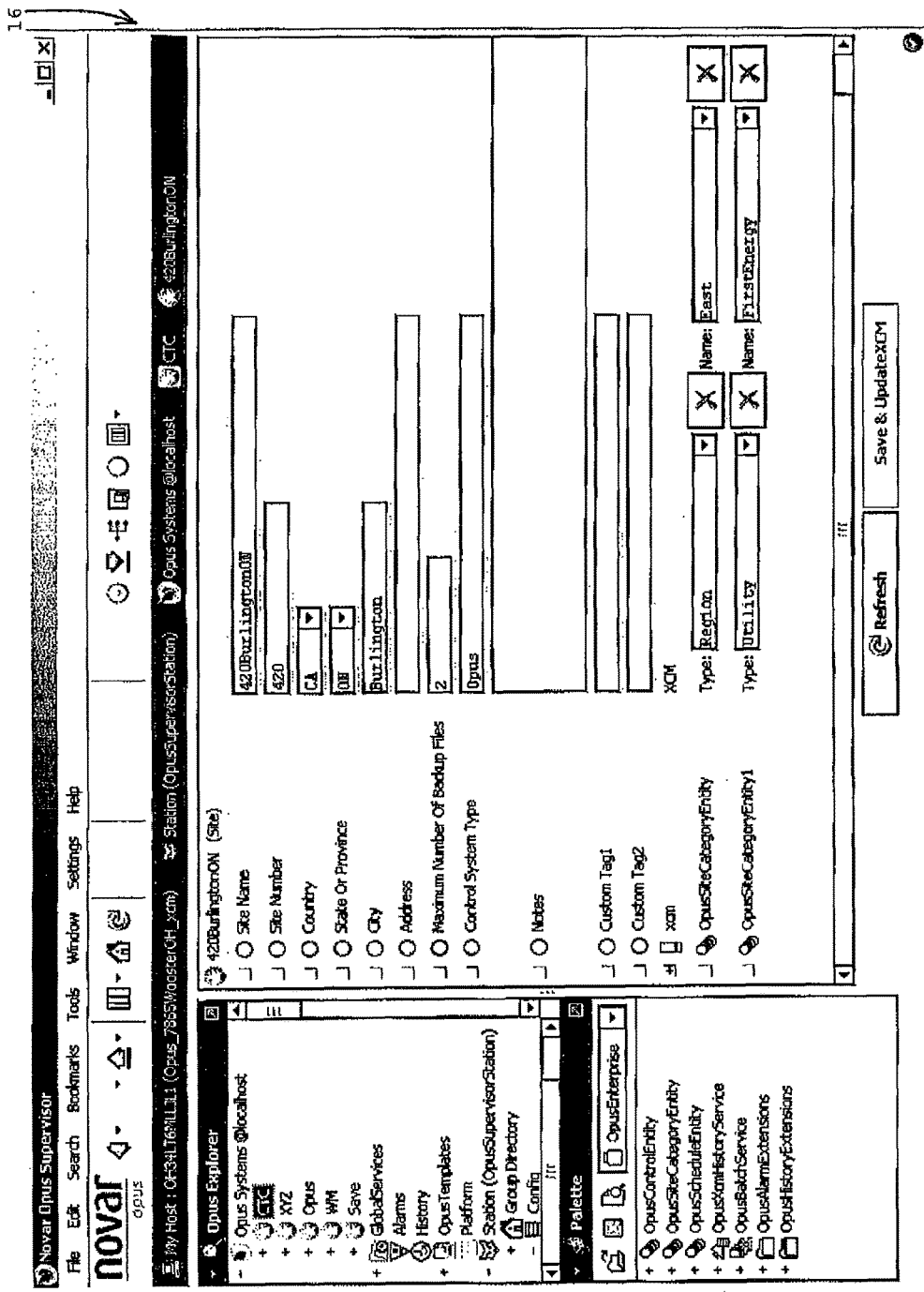
FIGS. 6 and 7 are diagrams of two screen captures showing a site with some site category type/name sets configured.
Figure 7:
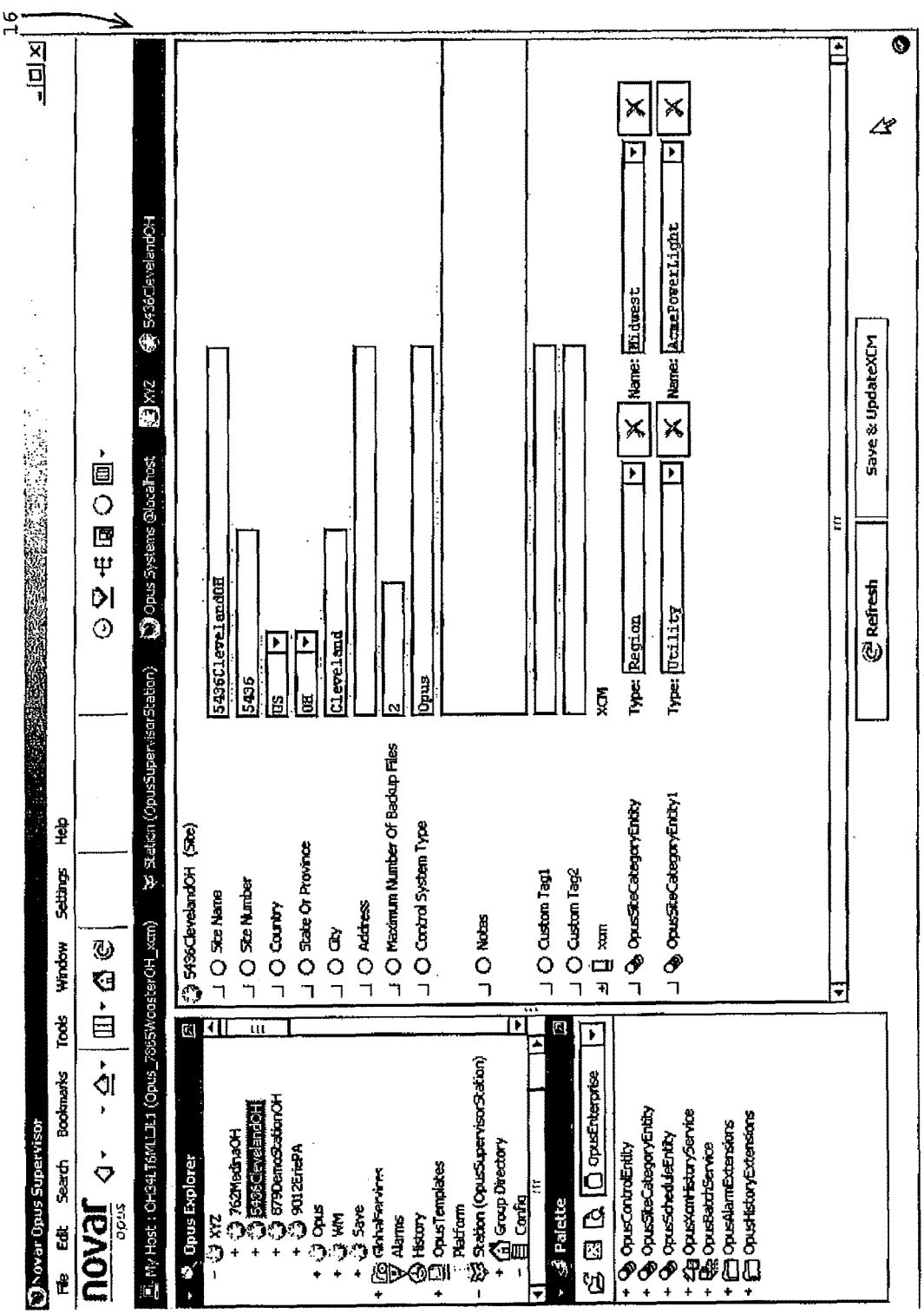

In FIGS. 6 and 7, two screen 16 captures show a Site with two OpusSiteCategory type/name sets configured. In FIG. 6, a screen print 16, the site 420BurlingtonON has been assigned to be in the Opus Site Categories Region/East and Utility/FirstEnergy. These categories are revealed in table 11 of FIG. 3, although for examples of other sites.

In FIG. 7, screen 16 shows a site 5436ClevelandOH that has been assigned to be in the Opus Site Categories Region/Midwest and Utility/AcmePowerLight. These categories are also revealed in table 11. These configurations are persisted in the Opus Supervisor and will be pushed to the SQL database tables either by the user or when alarms and histories are collected into the database.

A diagram 17 in FIG. 8 is a portion of the Opus MS-SQL Schema that captures the addition of the siteCategory 18, categoryTypes 19 and categoryNames 21 tables added to support the present system. The system may incorporate site 22, groups 23 and enterprise 24 tables.

The diagrams of FIGS. 9, 10 and 11 reveal a data dictionary for new tables.

One may note "dbo.categoryTypes" in a table 27 of FIG. 9. Table 27 may contain category type descriptors that allow site categories names to be grouped into category types. An example category type of Region which would relate to category names of North, South, East and West stored in the categoryNames table One may note "dbo.categoryNames" in a table 28 of FIG. 10. This table may contain category name descriptors that allow site categories names to be grouped into category types. Example category names of North, South, East and West would relate to a category type of Region in the categoryType table.

One may note "dbo.siteCategory" in a table 29 of FIG. 11. This table may contain the relationship of the site to the categories contained within the categoryTypes table 27 and categoryNames table 28. A site can exist in multiple category types. A site cannot have the same category type descriptor applied twice.

Sample data are shown in new Opus MS-SQL tables of FIGS. 12-16. FIG. 12 shows a Group Table 30. The entries of this table are the Opus Enterprise Model Data (EMD) group designations. Virtually all sites must exist within one of these groups. Headings of table 30 may incorporate a group ID, enterprise ID, group number, group name and group code.

FIG. 13 shows a site table 31. The entries of this table are the Opus Enterprise Model Data site instances. These sites are all referenced to the Opus EMD group which the site entry belongs to. Headings of table 31 may incorporate site ID, group ID, site number, site name, country, state and city.

FIG. 14 shows a Category Type Table 32. The entries of this table are all the distinct site category type designations applied to the site configurations for all sites in the enterprise. Headings of table 32 may incorporate a category type ID and category type.

FIG. 15 shows a Category Name Table 33. The entries of this table are all the distinct site category name designations applied to the site configurations for all sites in the enterprise. Each of entries may reference which site category type the entry belongs to. Headings of table 33 may incorporate a category name ID, category type ID and category name.

FIG. 16 shows a Site Category Table 34. The entries of this table are a result of establishing the specific relationships of which sites belong in which site category type/name sets as defined by the user in the configuration of each site. Headings of table 34 may incorporate site ID, category type ID and category name ID.

The application developer that creates features to leverage the Opus Site Categories established within the MS-SQL database will be provided the following queries. These may also be supplied as part of the Opus MS-SQL schema in the form of stored procedures and views.

In order for an application to provide the user a list of distinct category sets (type/name) specified across all the sites in the enterprise, the following SQL select will return.
A SQL Query:
select categoryTypes.categoryType, categoryNames.categoryName from categoryTypes inner join categoryNames on categoryTypes.categoryType_id=categoryNames.categoryType_id order by categoryType asc
The SQL Result is shown in a table 35 of FIG. 17. Headings of table 35 may incorporate category type and category name.

Figure 18:
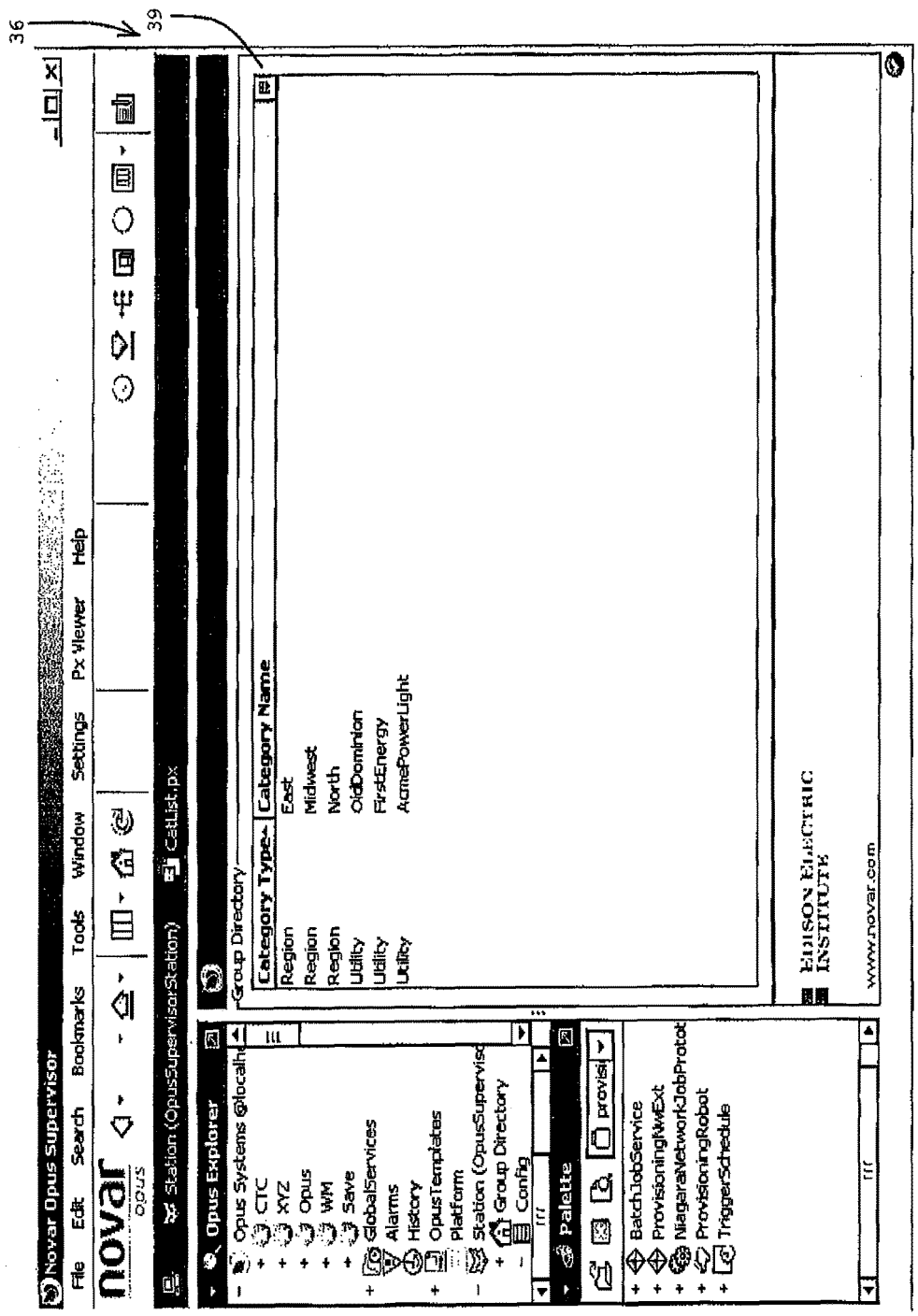
FIG. 18 is a diagram of a screen print showing example results of a BQL query executed against an internal supervisor configuration file having headings of category type and category name.

Also, if the Opus Supervisor is providing the list the following would be the BQL Query executed against the internal supervisor configuration file.
station:|slot:/|bql:select distinct selectedType as "Category Type",selectedText as "Category Name" from OpusEnterprise:OpusSiteCategoryEntity
The resultant view would be as seen in a screen print 36 as shown in FIG. 18. Headings of a group directory 39 may incorporate category type and category name.

The application developer may also provide the user a feature that operates against all the sites that belong to a specified Opus Site Category type/name set. Given the use selects the category type "Utility" and the category name "AcmePowerLight" the following SQL query will give the correct results of only those sites in that category set.
A SQL Query:
select site_number,city,state from site inner join siteCategory on site.site_id=siteCategory.site_id inner join categoryTypes on categoryTypes.categoryType_id=siteCategory.categoryType_id inner join categoryNames on categoryNames.categoryName_id=siteCategory.categoryName_id where
categoryTypes.categoryType='Utility' and
categoryNames.categoryName='AcmePowerLight'
The SQL Result is shown by a table 37 in FIG. 19. Headings of table 37 may incorporate site number, city and state.

Figure 20:
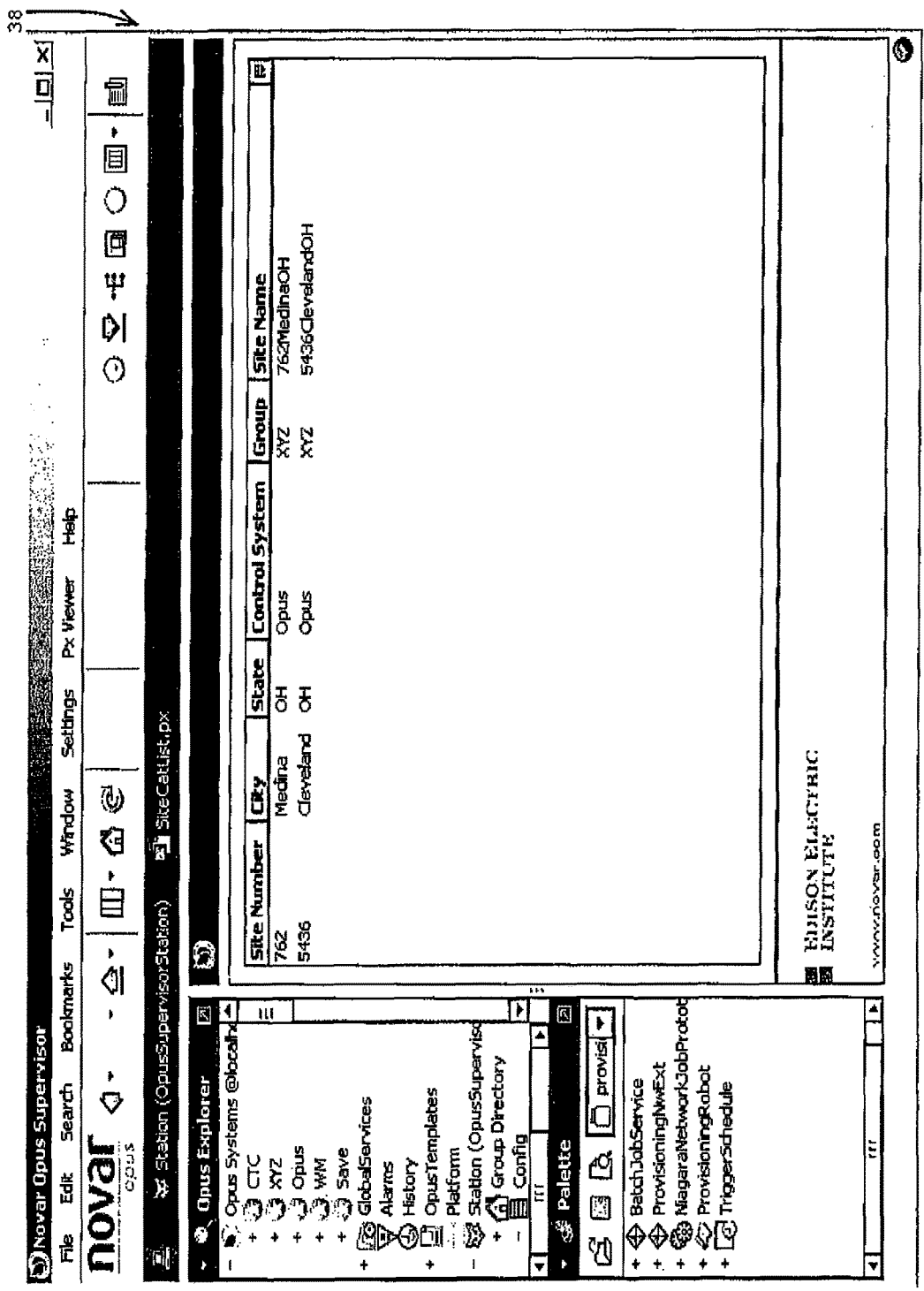
FIG. 20 is a diagram of a screen print showing example results of a BQL query executed against an internal supervisor configuration file having headings of site number, city, state, control system, group and site name.

Also, if the Opus Supervisor is providing the list of sites for the selected OpusSiteCategory type/name set the following would be the BQL Query executed against the internal supervisor configuration file.
station:|slot:/|bql:select navParent.SiteNumber as 'Site Number', navParent.City, navParent.StateOrProvince as 'State', navParent.ControlSystemType as 'Control System', navParent.navParent.GroupName as 'Group', navParent.displayName as 'Site Name' from OpusEnterprise:OpusSiteCategoryEntity where selectedType='Utility' and selectedText='AcmePowerLight' The resultant view would be as seen in a screen print 38 of a display shown in FIG. 20. Headings shown in the right portion of screen print 38 may incorporate site number, city, state, control system, group and site name.

Figure 21:
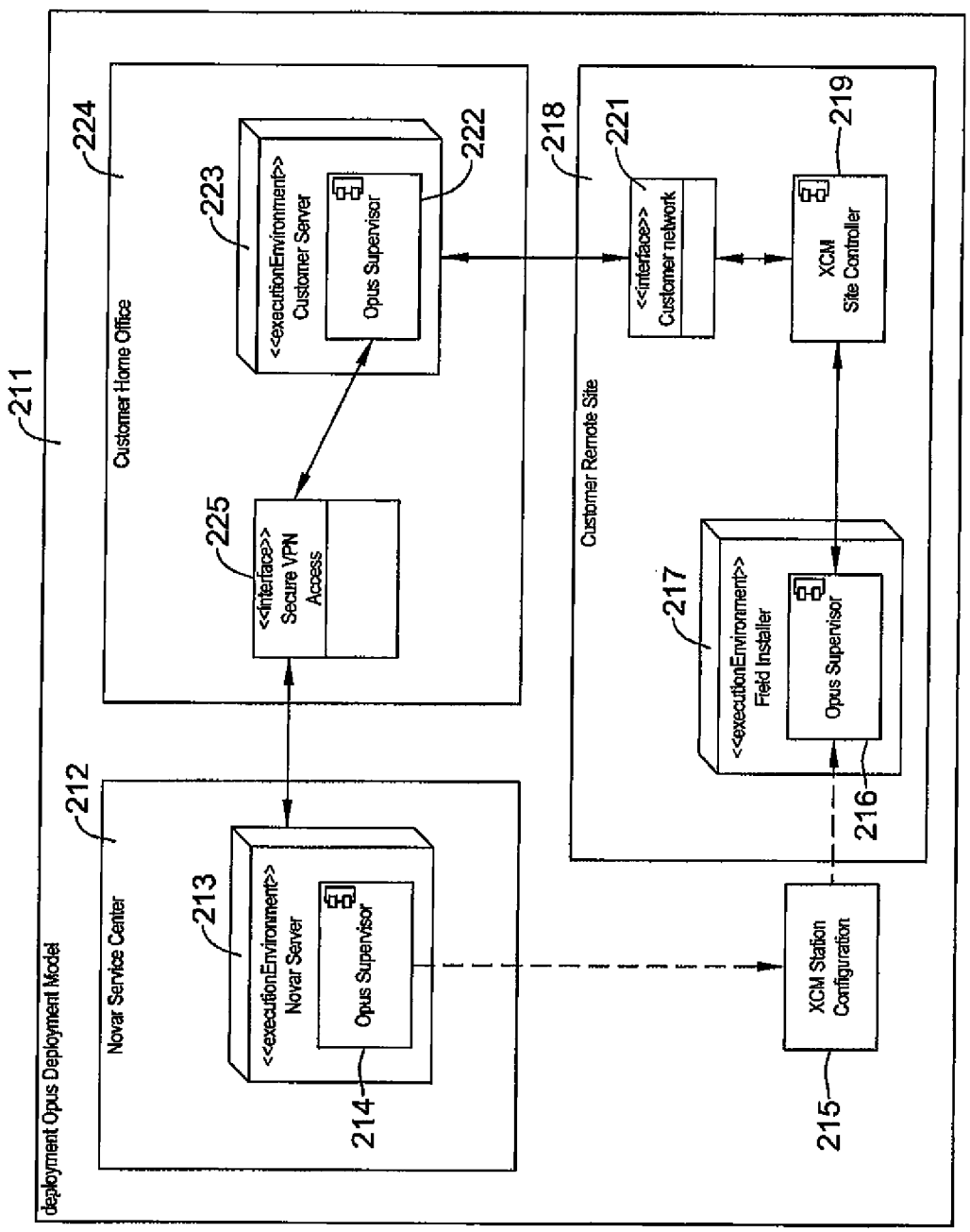
FIG. 21 is a diagram of a model of deployment architecture.

FIG. 21 is a diagram 211 of a model of an Opus deployment architecture. In summary, an original XCM site controller configuration may be created in the Novar Opus Supervisor, and then it may be emailed to a field installation technician where the configuration is directly loaded into the XCM site controller. Once the network connection is established, the Customer Opus Supervisor may utilize the import aspects indicated in the present disclosure to import and integrate the remote XCM into the supervisor.

A Novar service center 212 may incorporate a Novar server 213 for an execution environment. Within the server 213 may be an Opus Supervisor 214 with an output of an XCM station configuration 215 which goes to an Opus Supervisor 216 of a field installer 217 at a customer remote site 218. Opus Supervisor 216 may have a two-way connection with an XCM site controller 219, which in turn may have a similar connection with a customer network 221 interface at the customer remote site 218. The customer network 221 may have a two-way connection with an Opus Supervisor 222 of a customer's server 223 at a customer's home office 224. A similar connection may be between Supervisor 222 a secure VPN (virtual private network) access interface 225, which in turn provides a similar connection with the Novar server 213 of the Novar service center 212.

There are Opus customers who may purchase services from Novar to install, configure and commission the Opus systems into their remote sites. On new construction sites, many times it may be necessary to install and configure the XCM site controllers prior to a customer having network connectivity to the remote site. In this situation, Novar may create the XCM Site configuration and email the configuration to a field installer. The field installer may place the XCM site configuration on a personal laptop and install it directly into the XCM site controller. The XCM site configuration may now be in the XCM and can be used to control the site equipment during the startup of that facility. An issue may be that, once a network connection is established, the Opus Supervisor running at the customer's home office will need to integrate the deployed XCM site controller. Depending on the number of sites being commissioned, there could be multiple sites that need to be integrated with the customer's Opus Supervisor. This integration may be required to provide customer associates an ability to locate and navigate to the remote site controllers in order to monitor status and control conditions. Also, the integration may be necessary to support a collection of alarms and histories into the customer's Opus Supervisor. A limitation with the current system may be when the XCM station configuration is directly copied to the XCM site controller, the user will need to manually reconstruct the integration with the customer's home office Opus Supervisor. During this manual process, there may be a risk of the user entering incorrect data that does not match what is actually in the XCM site controller. Additionally, the time required to do this manual integration may be burdensome especially if there are multiple sites controllers that need to be integrated.

The Opus Supervisor may support a set of XCM import and integration aspects that will automate certain aspects of the integration of a deployed XCM site configuration into the Opus Supervisor.

A goal of the present disclosure is to provide a more efficient manner to import an XCM controller's configuration and enterprise hierarchy to the Opus Supervisor with and without user intervention. If user intervention is required, it should be minimal.

When an XCM site controller is imported and integrated into the Opus Supervisor, the XCMs Opus Enterprise Model Data may be retrieved from the XCM and added to the existing multi-group, multi-site hierarchal structure with the supervisor. Virtually all of the connection properties may be configured, and the deployed site/XCM file structure may be created to support the backup and re-download aspects. The import operation may also automatically perform a configuration backup to complete the integration process. In the Opus Systems, the configuration in the deployed XCM site controllers may be considered the master configuration. Therefore, by importing the configuration data directly from the master source, one may ensure that the data are accurate.

Advantages of the approach may include ease of use—menu based operation or background service, time saved—an auto integration of one or more XCM controllers' configuration and enterprise hierarchy to Opus Supervisor as opposed to manual integration, assurance of data consistency and integrity by synchronizing to the master source of the configuration data, and a support of an importing of deployed XCM controllers that were created and deployed with a standard Niagara™ workbench and do not contain the Opus Supervisor Enterprise model data.

The Opus supervisor and/or the Niagara workbench, for which the Opus supervisor is based upon, does not necessarily support auto import of deployed XCM controllers to the Opus supervisor. There may be an aspect that allows for discovery of other remote XCMs on the same Niagara network providing an easy method for adding to the supervisor's network. However, this does not necessarily integrate with the Opus Supervisor Enterprise structure or other automatic feature integration.

The Opus Supervisor may provide the user the ability to quickly and easily import and integrate the XCM controller's configuration and enterprise hierarchy by providing the following options. First, the user may invoke a menu option to import a single deployed XCM site configuration. Second, the user may invoke a menu option to discover multiple deployed XCM site configurations and select one or more detected and automatically import. Third, a user may configure a background service in the Opus Supervisor to detect a new Niagara Station that auto appears on the supervisor's Niagara Network and when detected, automatically imports without user interaction.

An import XCM Station selection on a screen may prompt the user for the specific host machine/IP address of the deployed XCM site controller from where the configuration is to be imported. After entering the credentials and port that particular site will be imported to, and the Opus Supervisor Enterprise Model hierarchy to be available in the supervisor navigation tree is noted, the following internal operations may be performed. A check may be made to determine if the enterprise hierarchy already exists in the remote site. If so, import it into the Supervisor navigation tree, or otherwise request the user to specifically enter the group/site/XCM name and other properties, and then complete import. A configured Niagara network setup may be added for the remote XCM. The file structure may be created to support the site XCM controller backup and re-download aspects. The station configuration may be copied to the Opus Supervisor, and a backup of the configuration be performed.

Figure 22:
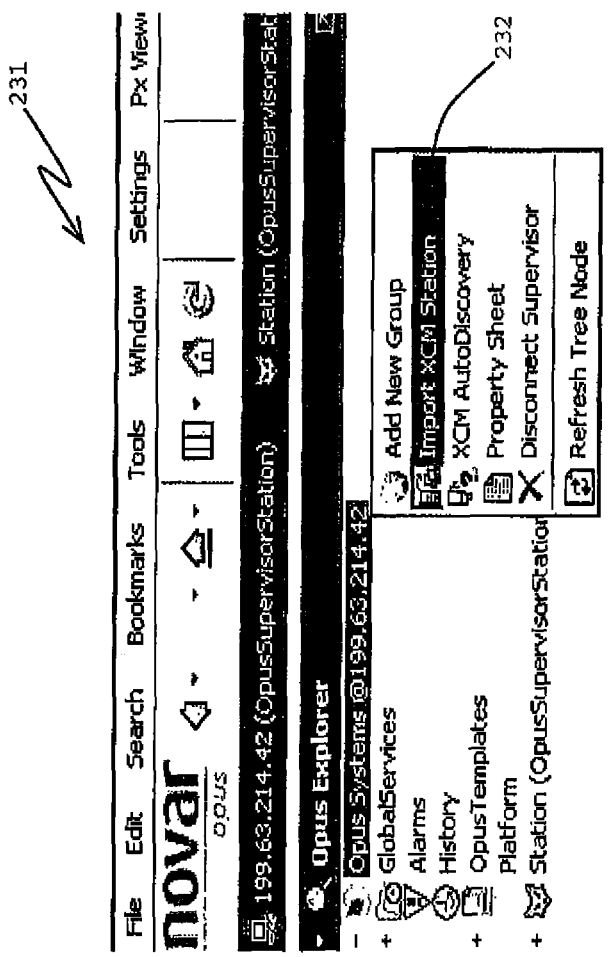
FIGS. 22, 23 and 24 are diagrams of an import site controller station approach.
Figure 23:
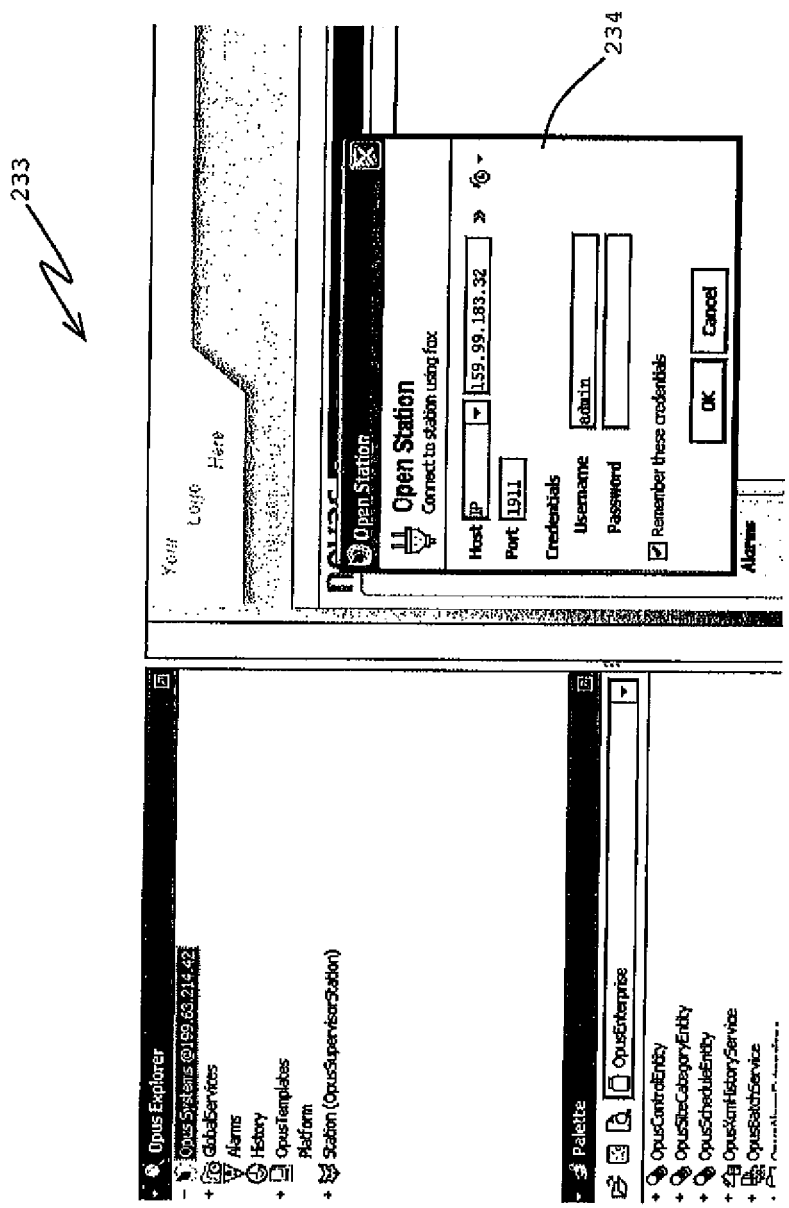
Figure 24:
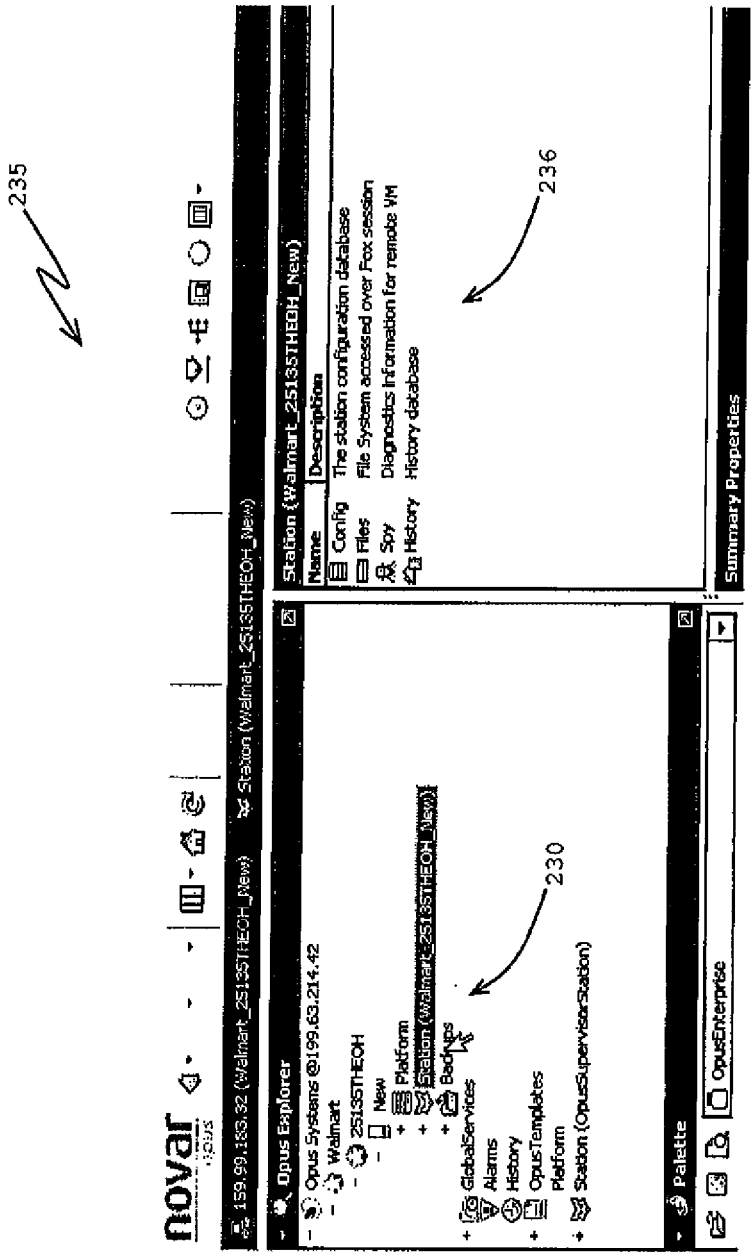

FIGS. 22, 23 and 24 are diagrams of the import XCM Station approach. FIG. 22 is a diagram showing a Novar screen 231 of a selected Opus Supervisor station at "199.63.214.42". The screen shows a menu 232 with an import XCM station selection being available. FIG. 23 shows the screen 233 with an open station box 234 for opening a station upon entry of certain information such as host, port and credentials. FIG. 24 shows a screen 235 with a customer XCM station opened having information about the station shown in portion 236 of the screen 235. The appearance of the XCM station in the Opus explorer tree hierarchy 230 in the left pane of screen 235 may be the end result of the manually invoked XCM import. This structure had not necessarily existed prior to the import.

An XCM auto discovery service for multi-XCMs may be noted. A user may be provided an XCM Auto Discovery menu option which when invoked results in an occurrence of a following operation. To start, the Opus Supervisor may scan the Niagara discovery to locate all stations within the local area network and provide the user a list of remote XCM site controllers found on the network that do not currently exist in the supervisor. Then the user may select the desired XCM site controllers to be imported. Each of the multiple sites selected by the user may be imported to the Opus Supervisor as described for the XCM station import herein.

Figure 25:
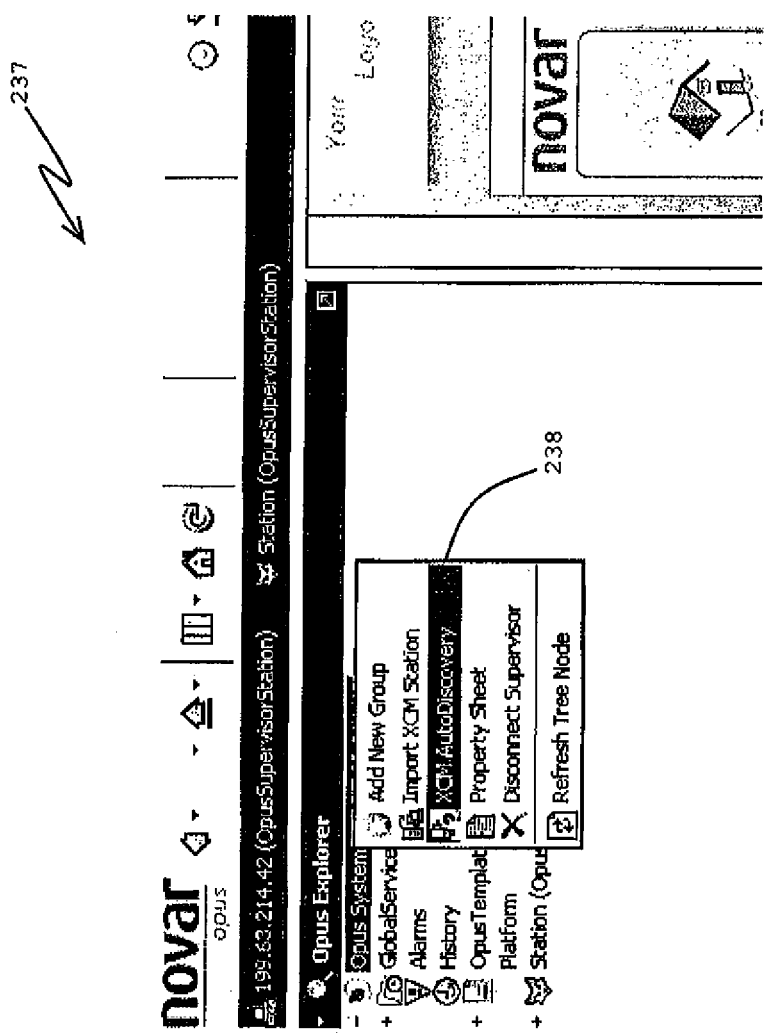
FIGS. 25, 26 and 27 are diagrams illustrating an approach for site controller auto discovery service.
Figure 26:
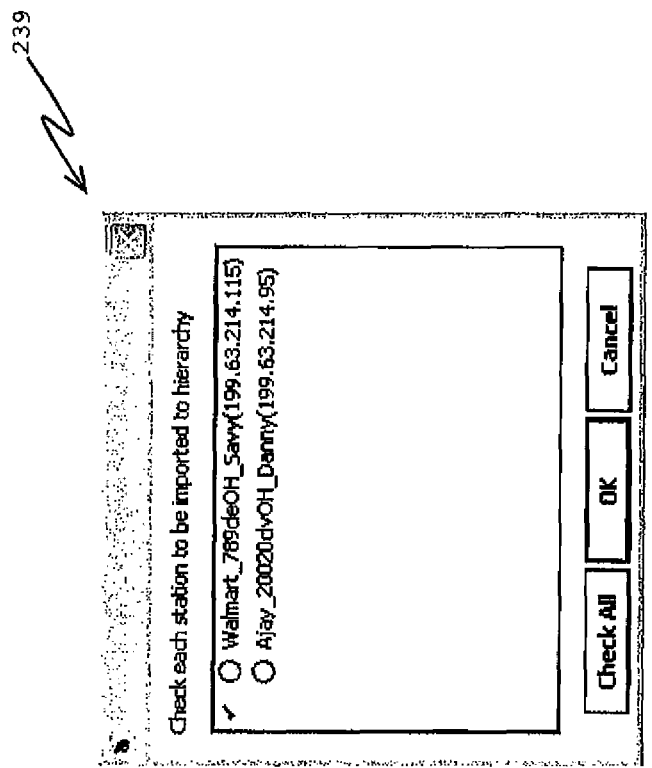
Figure 27:
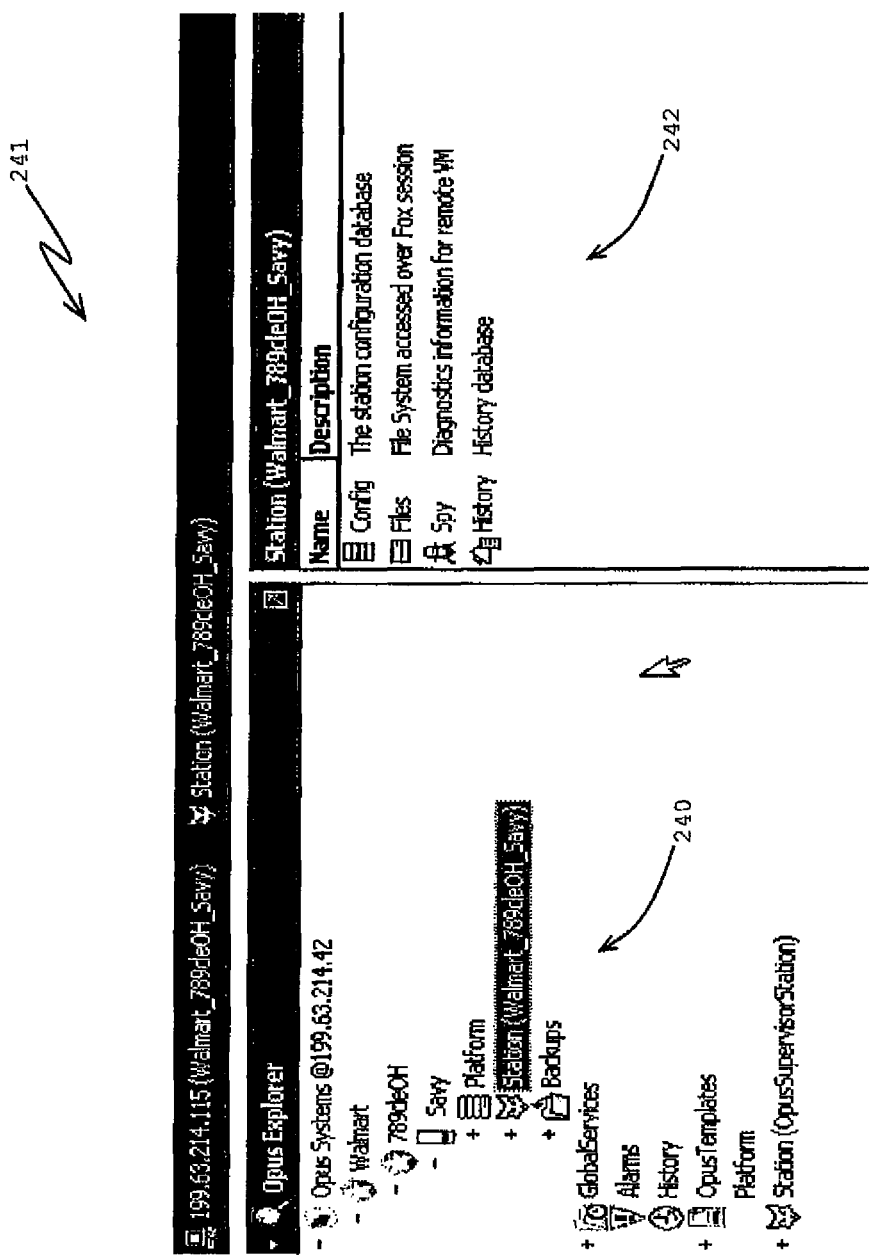

FIGS. 25, 26 and 27 illustrate the approach for XCM auto discovery service. FIG. 25 shows the Novar screen 237 of the selected Opus Supervisor station at "199.63.214.42". The screen shows a menu 238 with an XCM AutoDiscovery selection being available. The selection may lead to an import Niagara network menu 239 shown in FIG. 26 with a list of stations. One or more stations to be imported to a hierarchy may be checked with a mark to the left. A customer XCM station may be selected resulting in a screen 241 shown in FIG. 27. A right portion 242 of the screen may show selectable information related to the selected station. Such information may be the station configuration database, the file system accessed, diagnostics information and a history database. The appearance of the XCM station in the Opus Explorer tree hierarchy 240 in the left pane may be the end result of XCM imports just performed. This structure had not necessarily existed prior to the import.

An XCM auto discovery background service may be sought. The XCM auto discovery service may monitor the Niagara network and the navigation tree of Opus Supervisor to determine if a new Niagara station entry appears in the supervisors local area network. If a new site is detected, the XCM auto discovery service may automatically import those sites into the Opus Supervisor without user intervention. The import of each of the XCM site configuration may be as described for the XCM station import herein.

Figure 28:
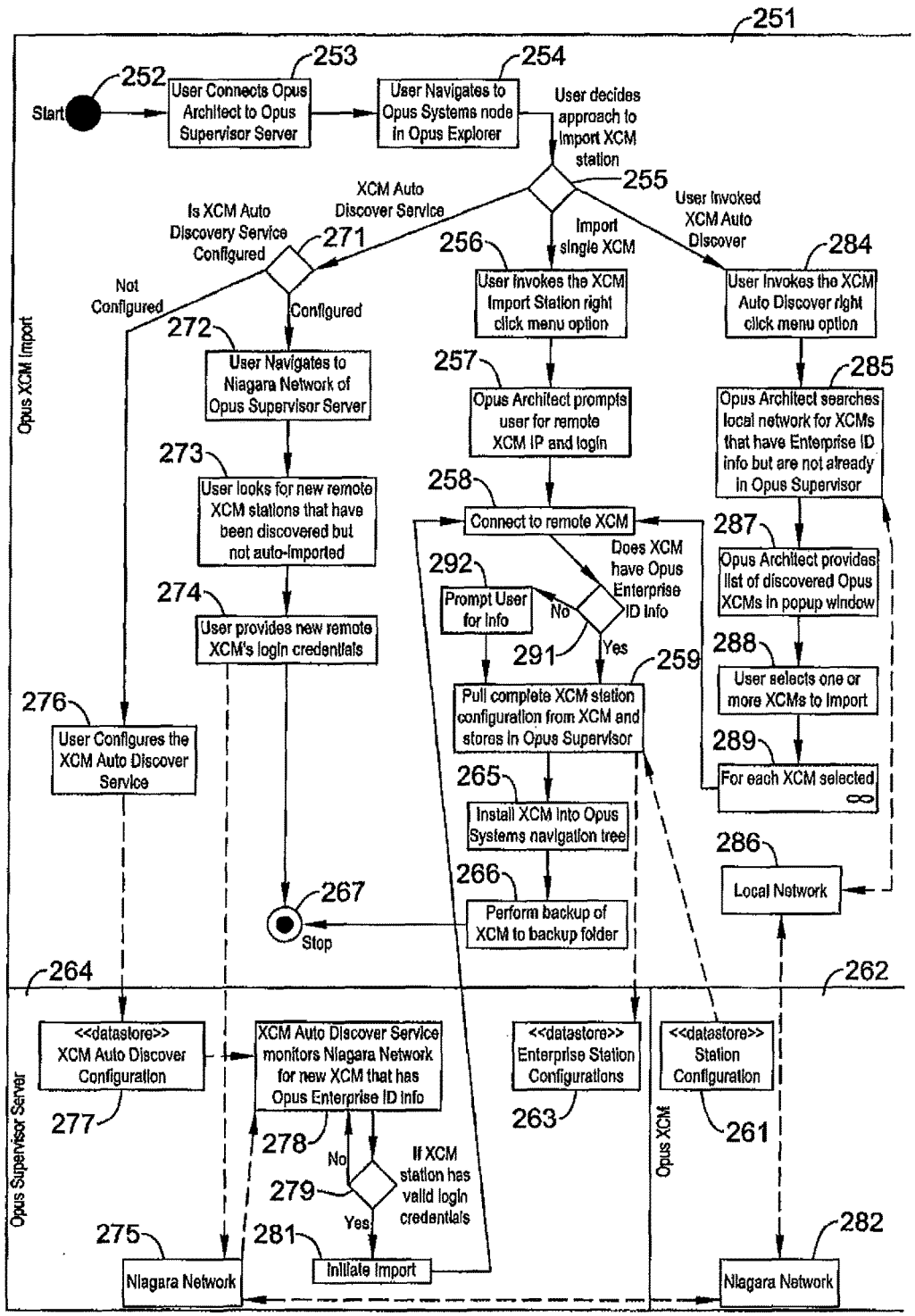
FIG. 28 is a flow diagram of XCM site controller discovery and import approaches.

FIG. 28 is a flow diagram 251 of generally all available Opus XCM discovery and import approaches. From a start at symbol 252, a user may connect an Opus Architect to an Opus Supervisor server at symbol 253. At symbol 254, the user may navigate to an Opus Systems node in Opus Explorer. A question of which approach a user decides to import an XCM station may be asked at symbol 255. The approaches may incorporate an XCM auto discovery service, a user invoked import of a single XCM, and a user invoked XCM auto discovery.

The import of a single XCM approach may lead to a user invoking an XCM import station right click menu option at symbol 256. The Opus Architect may prompt the user for a remote XCM IP and login at symbol 257. At symbol 258, a connection to a remote XCM may occur. Prior to pulling in the complete XCM station configuration, a question at symbol 291, whether the XCM has Opus Enterprise model (ID) information may be asked. If the answer is yes, the import may proceed by going on to symbol 259. If the answer is no, then the user may be prompted with a popup to get the information at symbol 292, and then proceed on to symbol 259. At symbol 259, a complete XCM station configuration may be pulled from a data store at symbol 261 of the Opus XCM represented by a block 262. The Opus XCM may be stored in a data store at symbol 263 of the Opus Supervisor represented by a block 264. Then the XCM may be installed into an Opus systems navigation tree at symbol 265. At symbol 266, a backup of the XCM to a backup folder may be performed before stopping at symbol 267.

The approach of the XCM auto discovery service may lead to a question of whether the XCM auto discovery service is configured or not at symbol 271. If the answer is configured, then the user may navigate to a Niagara network of the Opus Supervisor server at symbol 272. At symbol 273, the user may look for new remote XCM stations that have been discovered but not auto-imported. The user may provide new remote XCM's login credentials at symbol 274. The credentials may be provided to a Niagara network at symbol 275. Niagara network at symbol 275 of the Opus Supervisor server at block 264 may be interconnected with a Niagara network 282 of Opus XCM at block 262. From symbol 274, the approach for the XCM Auto discovery service configured may stop at symbol 267. "XCMs" may mean more than one XCM. "XCM's" may be a possessive form of XCM or mean more than one XCM.

If the answer is not configured, then the user may configure the XCM auto discovery service at symbol 276. The XCM auto discovery configuration may be stored in a data store at symbol 277 in block 264 representing the Opus Supervisor server. Data from the configuration at symbol 277 may go to a symbol 278 where the XCM auto discovery service may monitor a Niagara network at symbol 275 for a new XCM that has Opus Enterprise ID information. At symbol 279, a question asked is whether the XCM station has valid login credentials. If not, then a return to symbol 278 may occur. If yes, then an XCM import may be initiated at symbol 281. Then a connection to a remote XCM may be at symbol 258 in block 251. Since this approach may have the Opus Enterprise model information upon reaching symbol 291 asking if the XCM has the Opus Enterprise ID information, the prompt at symbol 292 will not necessarily be needed, and the import may proceed on at symbol 259. At symbol 259, a complete XCM station configuration may be pulled from the data store at symbol 261 of the Opus XCM in block 262, and stored in the data store at symbol 263 of the Opus Supervisor in block 264. Then the XCM may be installed into an Opus Systems navigation tree at symbol 265. At symbol 266, a backup of the XCM to a backup folder may be performed before stopping at symbol 267.

The user invoked XCM auto discovery approach may lead to a user invoking the XCM auto discovery right click menu option at symbol 284. At symbol 285, the Opus Architect may search the local area network for XCMs have Opus Enterprise model (ID) information but are not already in the Opus Supervisor. The Opus Architect may provide a list of discovered XCMs in a popup window at symbol 287. At symbol 288, the user may select one or more XCMs to import. For each XCM selected at symbol 289, a connection may be made to a (remote) XCM at symbol 258. Since this approach may have the Opus Enterprise model information upon reaching symbol 291 asking if the XCM has the Opus Enterprise ID information, the prompt at symbol 292 will not necessarily be needed, and the import may proceed on at symbol 259. At symbol 259, a complete XCM station configuration may be pulled from the data store at symbol 261 of the Opus XCM in block 262, and stored in the data store at symbol 263 of the Opus Supervisor in block 264. Then the XCM may be installed into an Opus Systems navigation tree at symbol 265. At symbol 266, a backup of the XCM to a backup folder may be performed before stopping at symbol 267.

Some of the terms utilized herein may have corresponding designations as noted in the following: XCM station—site controller configuration; XCM auto discover service—site controller auto discovery service; XCM—site controller; Opus XCM—site controller; Opus workbench—user interface (console); Opus systems—enterprise site controllers (multi-site); Opus supervisor station—supervisor data server; Opus supervisor server—supervisor data server; Opus supervisor—supervisor; Opus group—site groups; Opus explorer—site navigation tree; Opus architect client—user interface (console); Opus architect—user interface (console); Opus—building management system (BMS); Niagara workbench—user interface (console); Niagara network—communication network; enterprise components—enterprise hierarchal elements; enterprise—enterprise (business or customer) building site locations (all multi-site); Opus Site Category—site grouping; Opus Site Categories—site groupings; Opus Enterprise Model Element—enterprise element; Opus Enterprise Model Tree Element—enterprise element tree node; Opus Enterprise Model Site Element—enterprise site element; Opus Site Category Name Property—site grouping name property; Opus XCM Enterprise Model Element—site controller element; and Enterprise Model—enterprise information. The above-mentioned terms may have other designations even though they may not be indicated.

There may a way for providing a user an approach to create, deploy and manage separate control system entities within a hierarchical context of a multi-business and/or multi-site environment. This approach may be incorporated into an architecture having one or more workstations, controllers, servers, and so forth.

The Tridium Niagara™ AX framework is the base application framework to develop the multi-business/multi-site application that is described herein. The related art implementation of Niagara™ AX is to provide configuration, control and monitoring of embedded DDC (direct digital control) controllers within the context of a single executive level JACE™. JACE may refer to "Java application and control engine". Each JACE contains references to subordinate embedded field controllers within its respective network to perform the specified control functions. JACE and its subordinates may be referred to as the "control system" entity. This described control system may typically be deployed within a single geographical site. However, a site may have multiple control systems.

A Niagara™ AX supervisor application may be deployed providing the user interface and a runtime environment providing some supervisory control level capabilities for multiple control systems accessible within a supervisor's network. A supervisor may collect alarms and historical logs from multiple deployed control systems to be viewed by a user of the supervisor application. Each JACE executive controller may be configured to communicate with this supervisor application as needed.

An issue may be noted in the following. Within the related art, the Niagara™ AX user application experience, each control system entity may be managed as an independent entity with the JACE being the highest level contextual entity. The supervisor application is limited to manage the multiple control systems within a single, flat hierarchal list of control system entities. By default, the user application provides limited means to manage these control system entities within a context that matches the user's logical, multi-site deployment environment. If a user's business has hundreds or thousands of sites, they would need to manage these sites in a single linear list with business and site identification embedded in the naming of the individual control system entity. A user may also have multiple business groups that have hundreds or thousands of sites. Managing a large list of un-related business control system entities may be difficult for the user to do. The supervisor application may also collect alarms and data trend logs from these thousands of sites. The historical logs may be persisted into storage and be accessible for viewing by the supervisor. Without the customer and site context attached to these historical data points, the analysis of where an alarm or data log originated may be difficult for the user.

A solution of the present system is to provide the user the ability to create, deploy and manage these separate control system entities within the logical context of the user's multi-business and/or multi-site enterprise environment. A typical business may have hundreds or even thousands of sites with each site generally having from one to five control system entities. The present application may provide the user the means to create and manage each of the deployed control system entities in a user definable hierarchal structure in order to maintain and access the control system entities within their proper business and geographical context.

The enterprise model components of business, site and executive may be created as entity objects to represent each logical hierarchal level required for the user's environment. These new components may be created and managed within a supervisor application. The user may be provided properties associated with each of these components to personalize the specific business, site and control system entities. The new user application may provide a navigation and menu system to add, change or delete these components. At the end leaf of the enterprise model, the user may create an executive controller which may be a baseline Niagara™ AX JACE station configuration. This station may be the control system configuration file to be deployed to the control system at the site. When the control system configuration file is deployed to the site control system, the enterprise model components specific to that control system may also be downloaded into the controller. This may enable the controller to associate the enterprise context to historical alarms and trend logs that are pushed or polled to a runtime supervisor application.

The user application may provide an explorer type tree menu allowing the user to create and manage a personalized list of business groups, site lists and control system (i.e., executive) lists. Also, a navigation table view may be provided to allow the customer to browse its business, site and control systems. The application may provide the user other management features.

The present solution may allow the user to build an enterprise structure in accordance with the hierarchal entity relationships of the actual businesses the user manages. The user may have a business group that contains one or more sites. The site entity may contain one or more executive controllers (i.e., site controllers).

The present description may utilize screen diagrams to convey a concern with the existing user interface application management of multiple businesses, sites and executives and how the present software application enhances the user's ability to manage these entities. The "existing user" application refers to the related art application that needs the solution that the present approach is based on. A "new user" or "present" application refers to the solution stated herein.

Figure 29:
FIG. 29 is a screen diagram of a related art user application navigation view.

FIG. 29 is a screen diagram of an "existing user" application navigation view. Both the left side navigation tree view 111 and the main window table view 112 provide flat lists of businesses, sites and executives.

Figure 30:
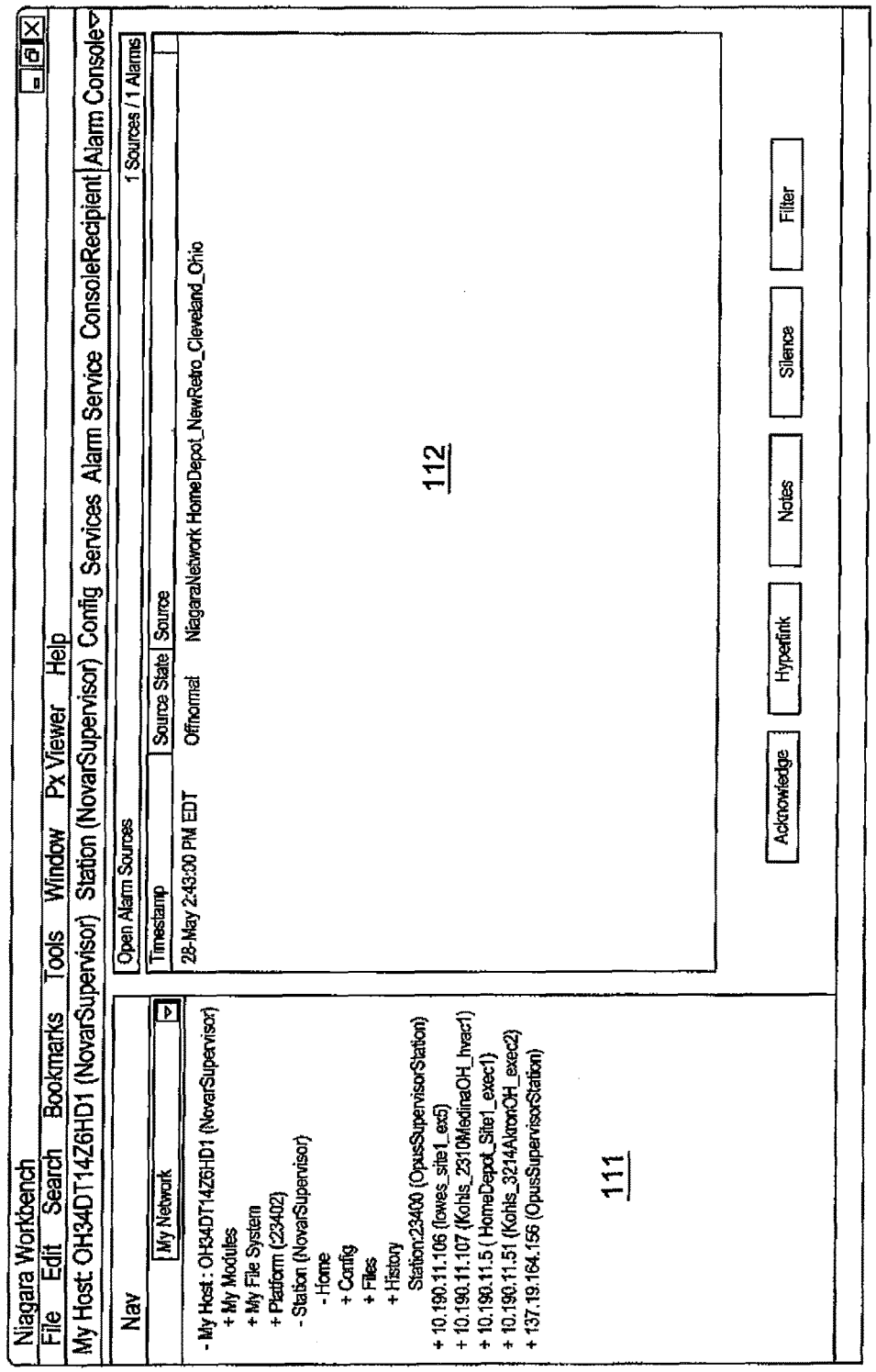
FIG. 30 is a screen diagram of a related art user application alarm view.

FIG. 30 is a screen diagram of an existing user application alarm in view 112. The existing application allows the user to view virtually all alarms collected in the supervisor (Niagara AX) from the deployed executives from the business sites. The business, site and executive information in view 112 is only embedded into the source JACE station name by the best practices of user.

Figure 31:
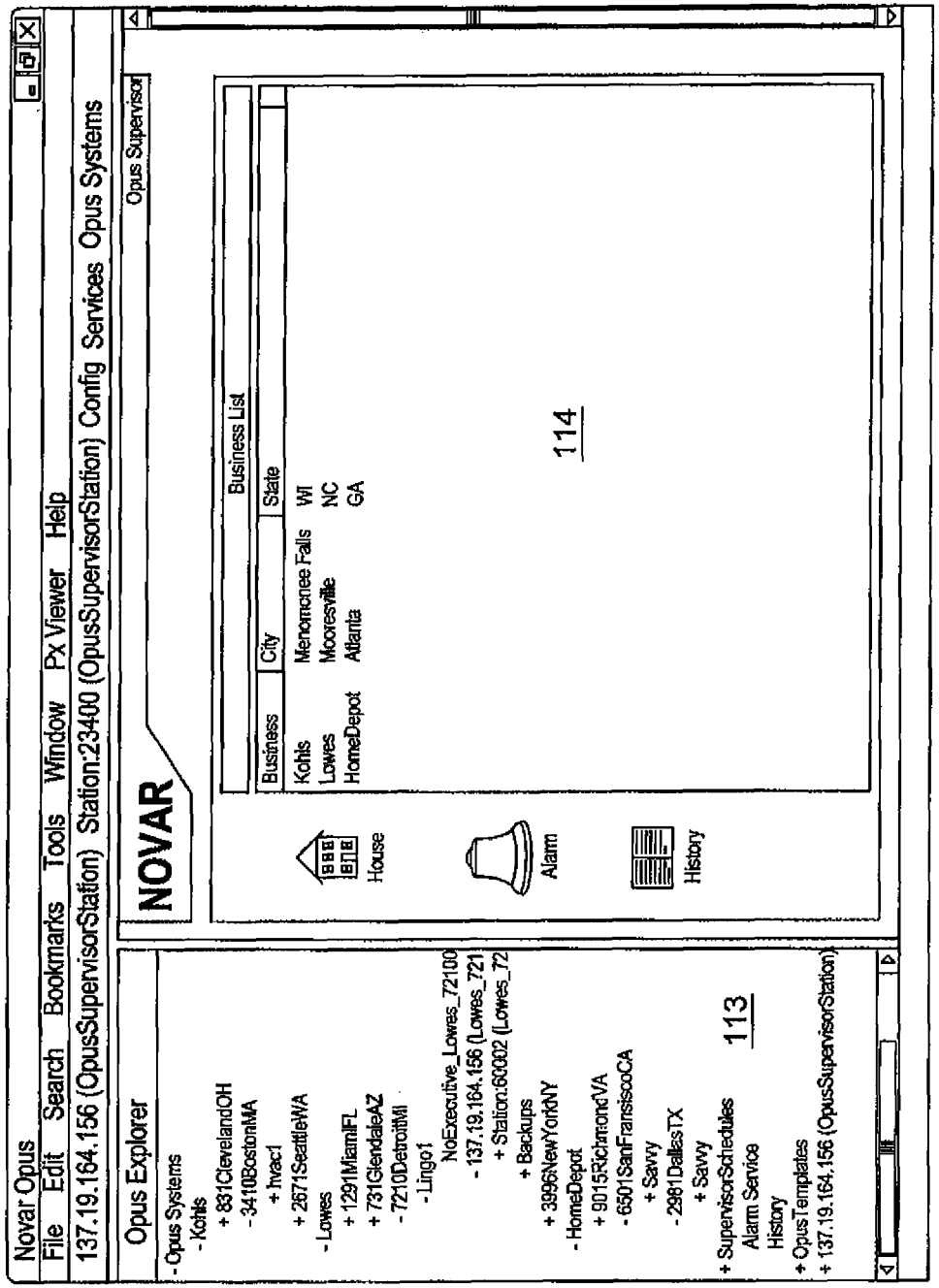
FIG. 31 is a screen diagram of a present user application showing multiple businesses.

FIG. 31 is a screen diagram of a "new user" application showing multiple businesses. By creating a business, site and executive entity component model, the new user application may provide extended features that could not be easily managed without these components. Hierarchal views of the user's enterprise may now easily be developed allowing quicker access to information about a site executive of interest. Such a view provides the top level list of businesses the user manages. The left navigation tree in view 113 and the main window table in view 114 may allow for navigation in a hierarchal manner. The business entities or groups are at the top level. This provides a logical starting point for user access. View 113 shows the explorer and view 114 shows the supervisor's navigation table.

Figure 32:
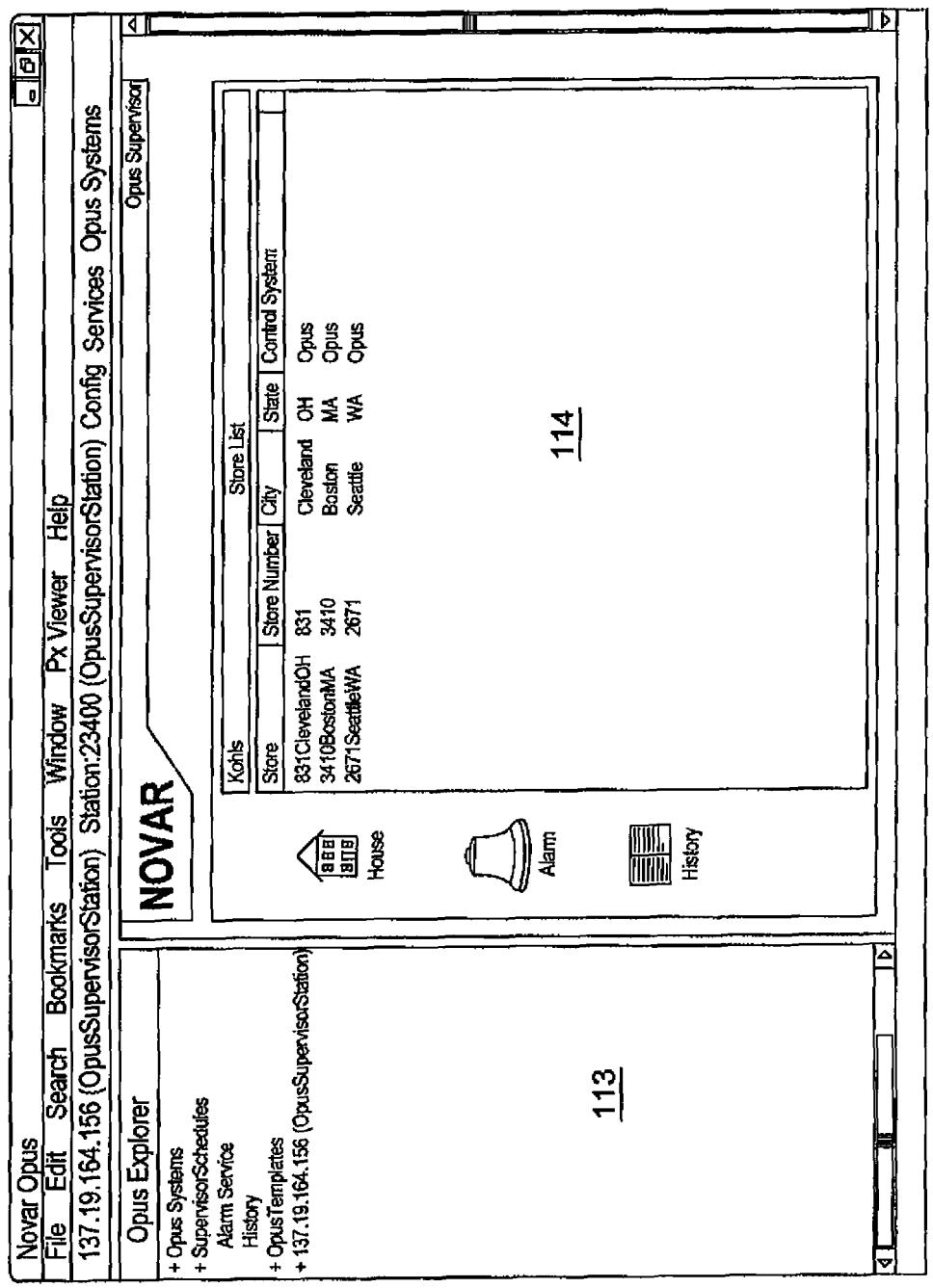
FIG. 32 is a screen diagram of a present user application showing multiple sites.

FIG. 32 is a screen diagram of the new user application showing multiple sites. This is the second screen in the enterprise model hierarchy and is rendered when the user selected a business in the previous screen. This just shows those sites that have been created and/or deployed for that business. This is the specified business site list in view 114. Advanced filtering and/or sorting algorithms may be developed relative to these enterprise model components based on a combination of properties.

Figure 33:
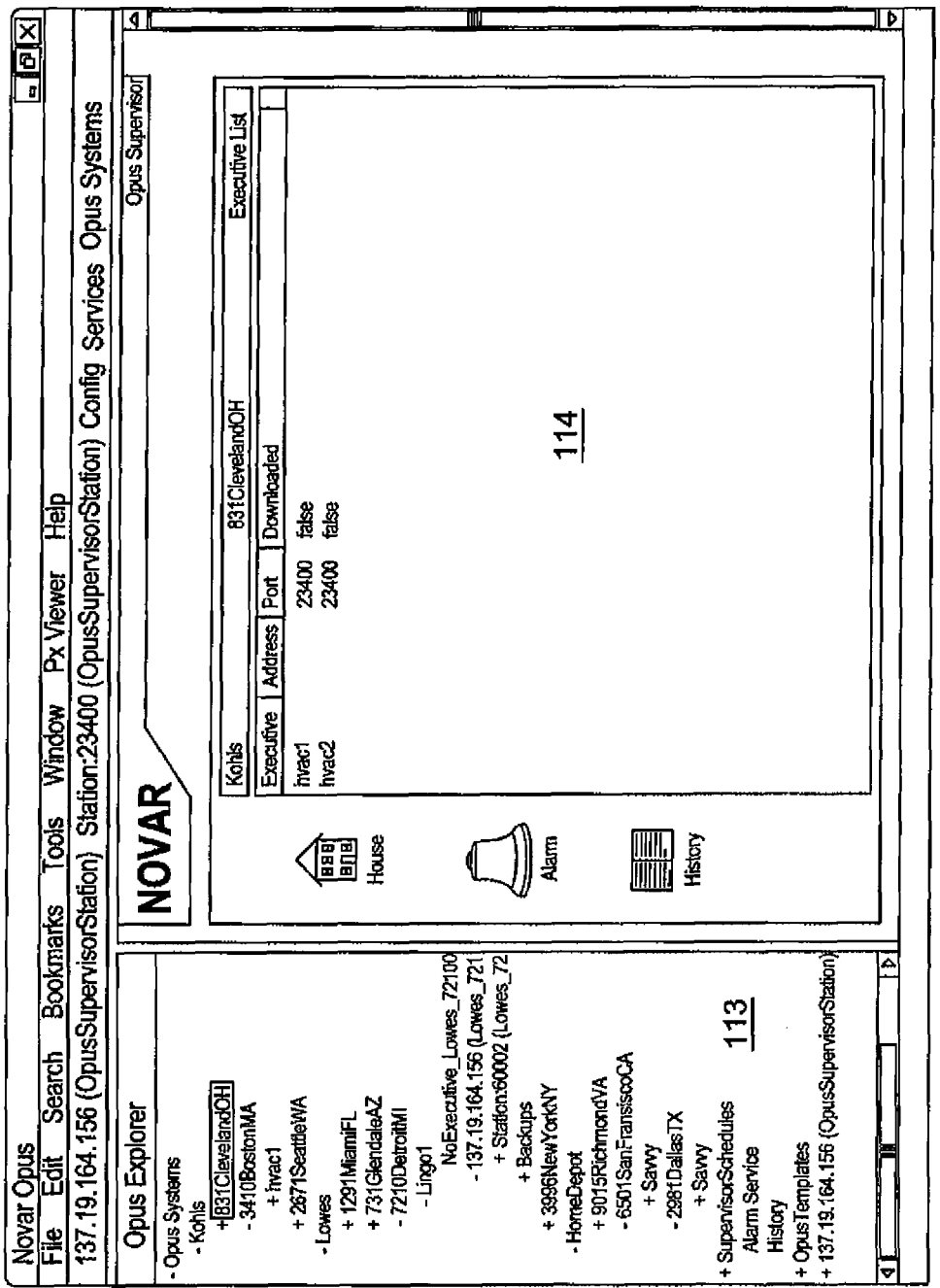
FIG. 33 is a screen diagram of a present user application showing multiple executives.

FIG. 33 is a screen diagram of a new user application showing multiple executives in view 114. This is the third screen in the enterprise model hierarchy and is rendered when the user has selected a site in the previous screen. This just shows those executives that have been created and/or deployed for that site. This may be the specified site controller list. Both the left navigation view 113 and the main table view 14 are navigation paths for connecting to the deployed executive controllers.

Figure 34:
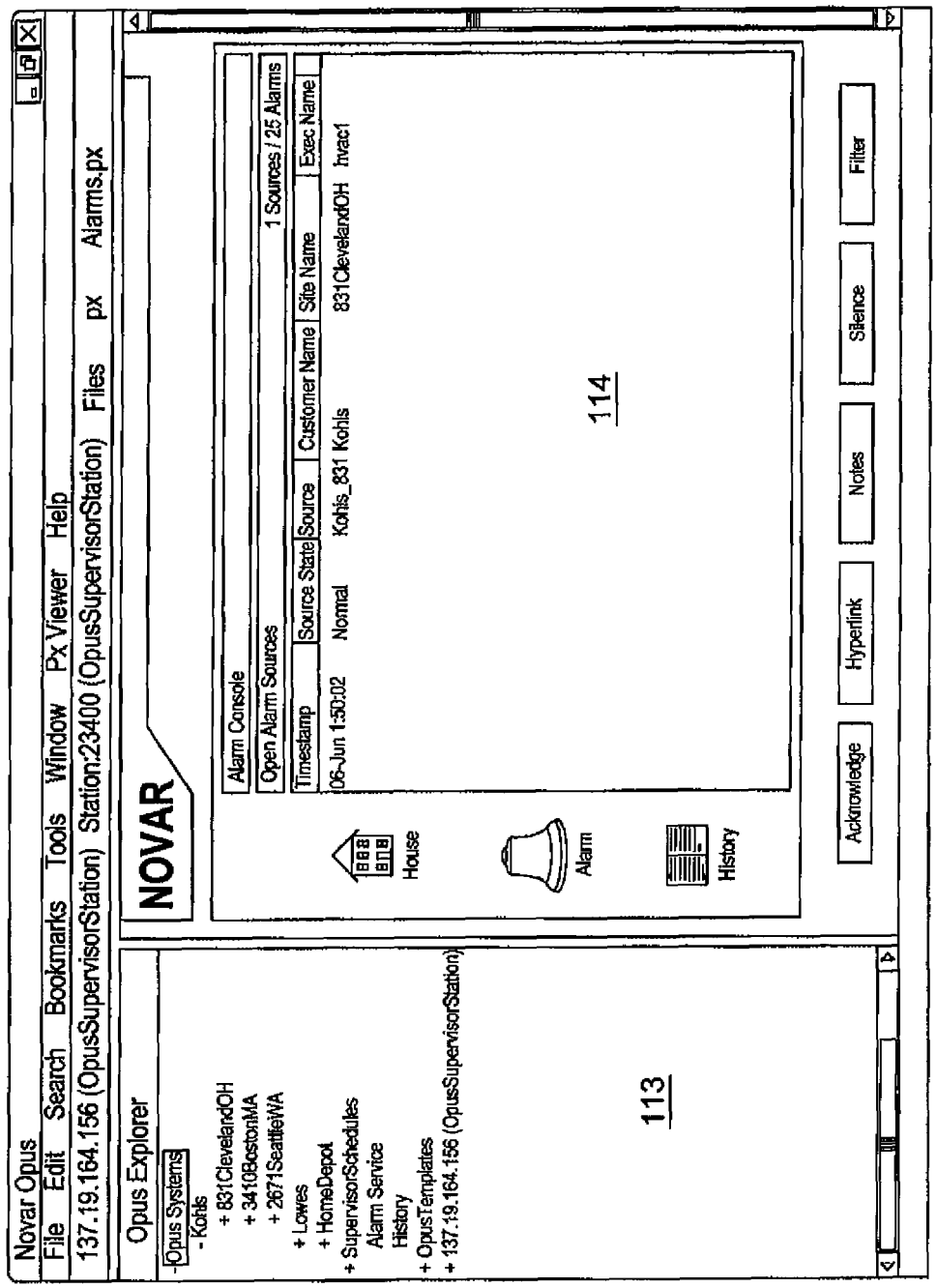
FIG. 34 is a screen diagram of a present user application alarm view.

FIG. 34 is a screen diagram of a new user application alarm list view. The new application provides this alarm list in view 114 with the enterprise model entity names separated out as independent properties of the alarms. Using the common enterprise model entity names enforces consistency as opposed to user best practice to name the source stations appropriately for each deployed executive. Sorting and filtering may now be achieved against these independent properties.

Figure 35:
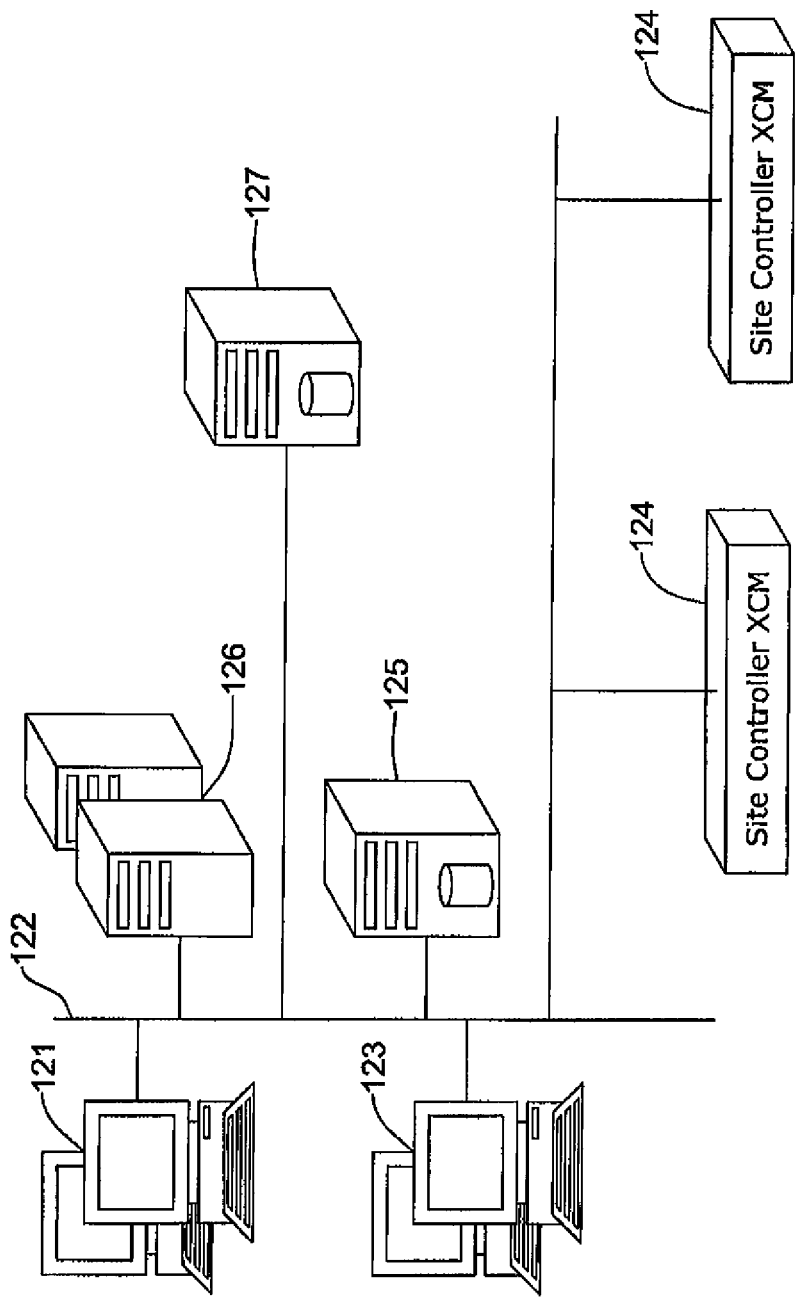
FIG. 35 is diagram of a deployment architecture overview of the present system.

FIG. 35 is diagram of a deployment architecture overview of the present system. A user workstation 121 may be connected to a bus 122. A supervisor client application may be on workstation 121. The application may be used for site creation, configuration, deployment and monitoring. There may be one or more site controllers (XCMs—executive control modules) 124 connected to bus 122. There may be thin client browser 123 access for runtime monitoring of deployed site controllers.

A supervisor server 125 may be connected to bus 122. Server 125 may provide multi user access for both thick and thin client users. It may maintain a database of enterprise hierarchy components. Server 125 may provide an environment for deployment, backup and restore for site controllers. It may provide navigational access to deployed site controllers and provide supervisory functions such as global schedules. Provisioning services may also be provided for enterprise wide updates. Further, the server 125 may provide alarm and log collection. Optionally, a separate supervisor server 126 may be connected to bus 122 to provide for the alarm and log collection. An optional, MS-SQL database server 127 may be connected to bus 122 used for persisting alarms, logs and other configuration items.

Figure 36:
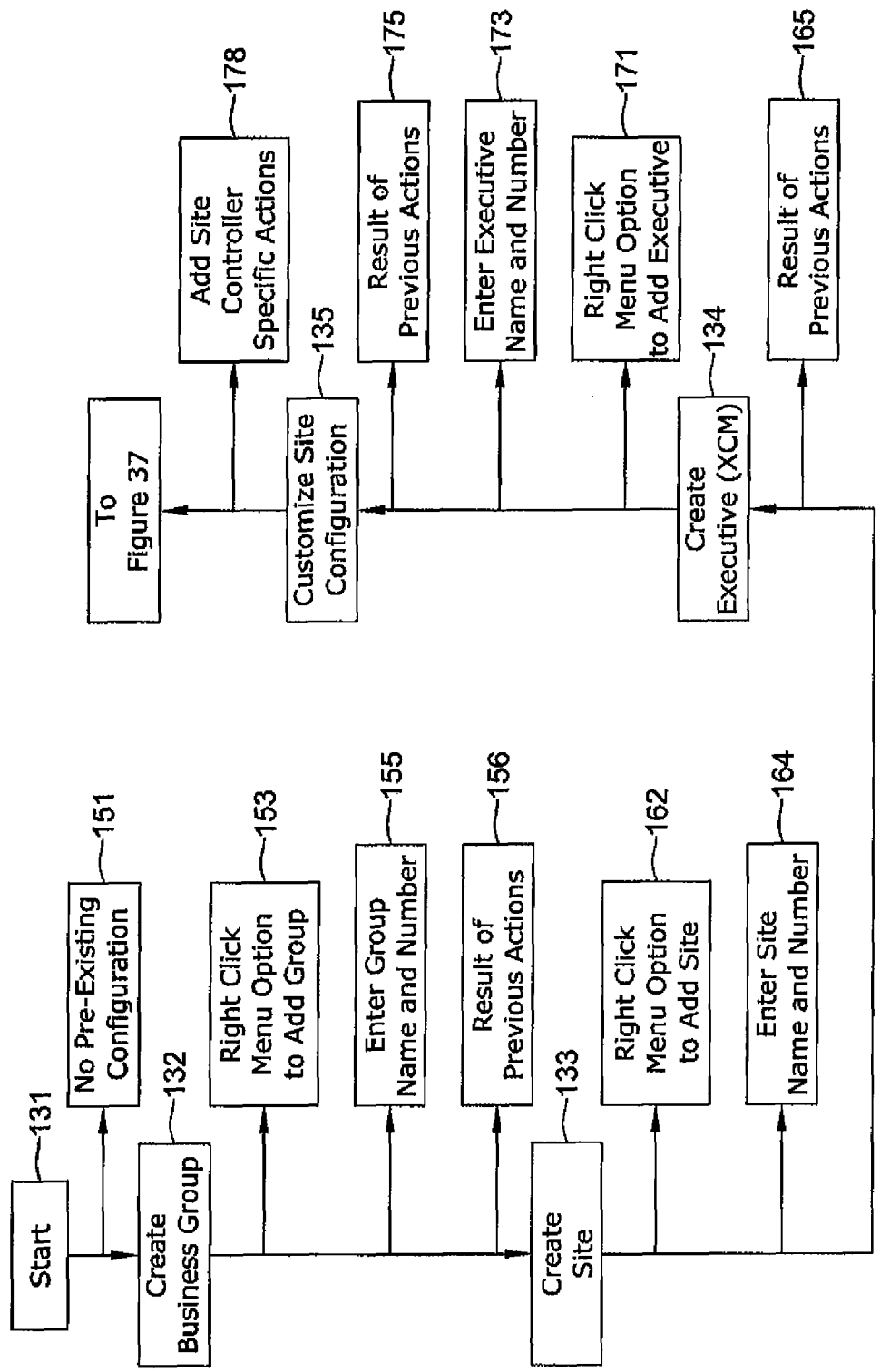
FIGS. 36 and 37 are diagrams of system configuration, site controller deployment, and runtime activities.
Figure 37:
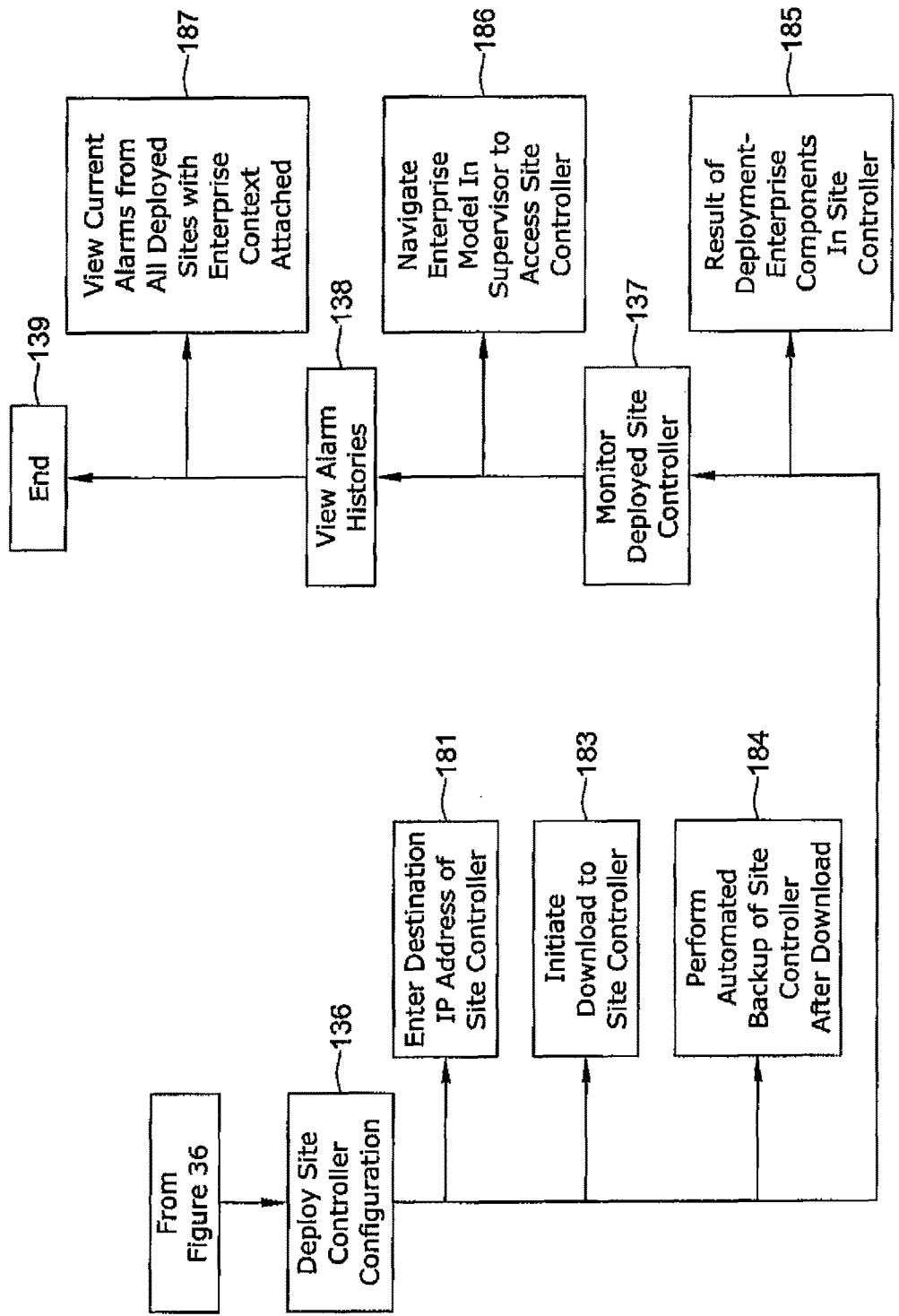
Figure 38:
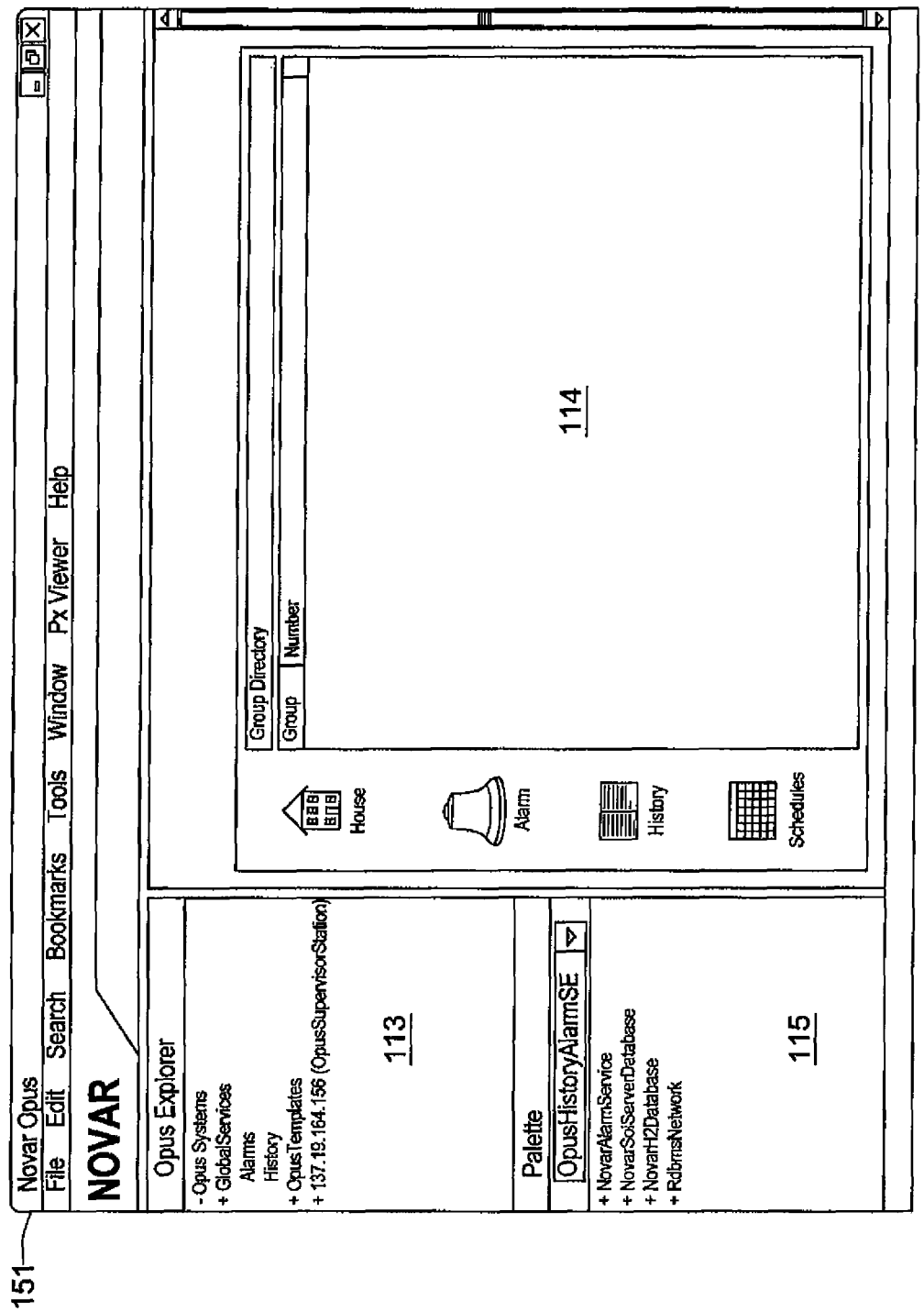
FIG. 38 is a diagram of a screen showing no pre-existing configuration.

FIGS. 36 and 37 are diagrams of system configuration, site controller deployment, and runtime activities. The present management system may be used to create the enterprise component hierarchy, create the site controller "offline" to be configured for site specific needs and then finally to download that site controller configuration from the supervisor to the remote site controller. At a start 131, there is no pre-existing configuration as may be shown in screen 151 of FIG. 38. Incidentally, FIG. 38 shows a palette in a view 115 to be used for later configuration activities.

Figure 39:
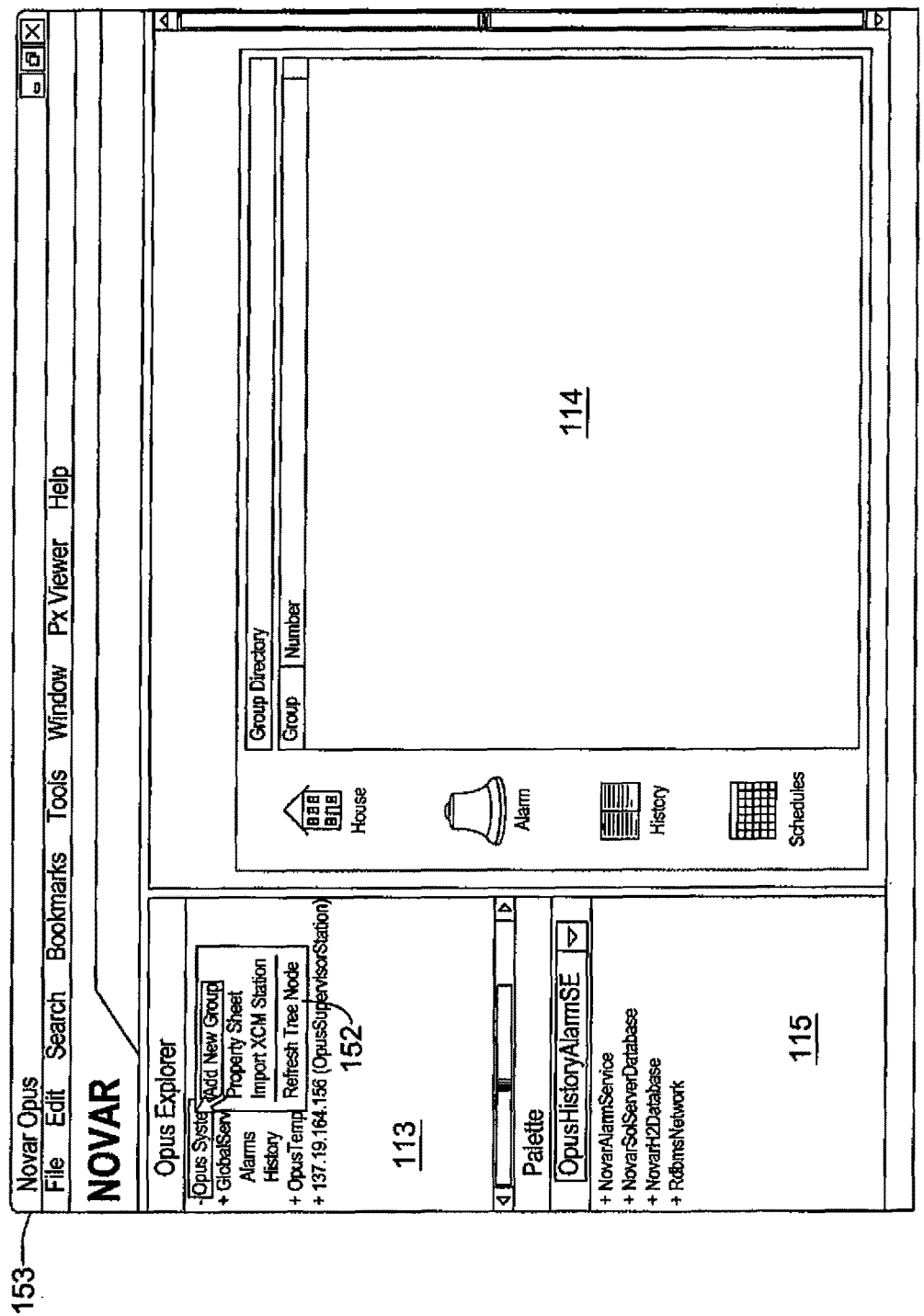
FIG. 39 is a diagram of a screen showing a menu option for creating a business group.
Figure 40:
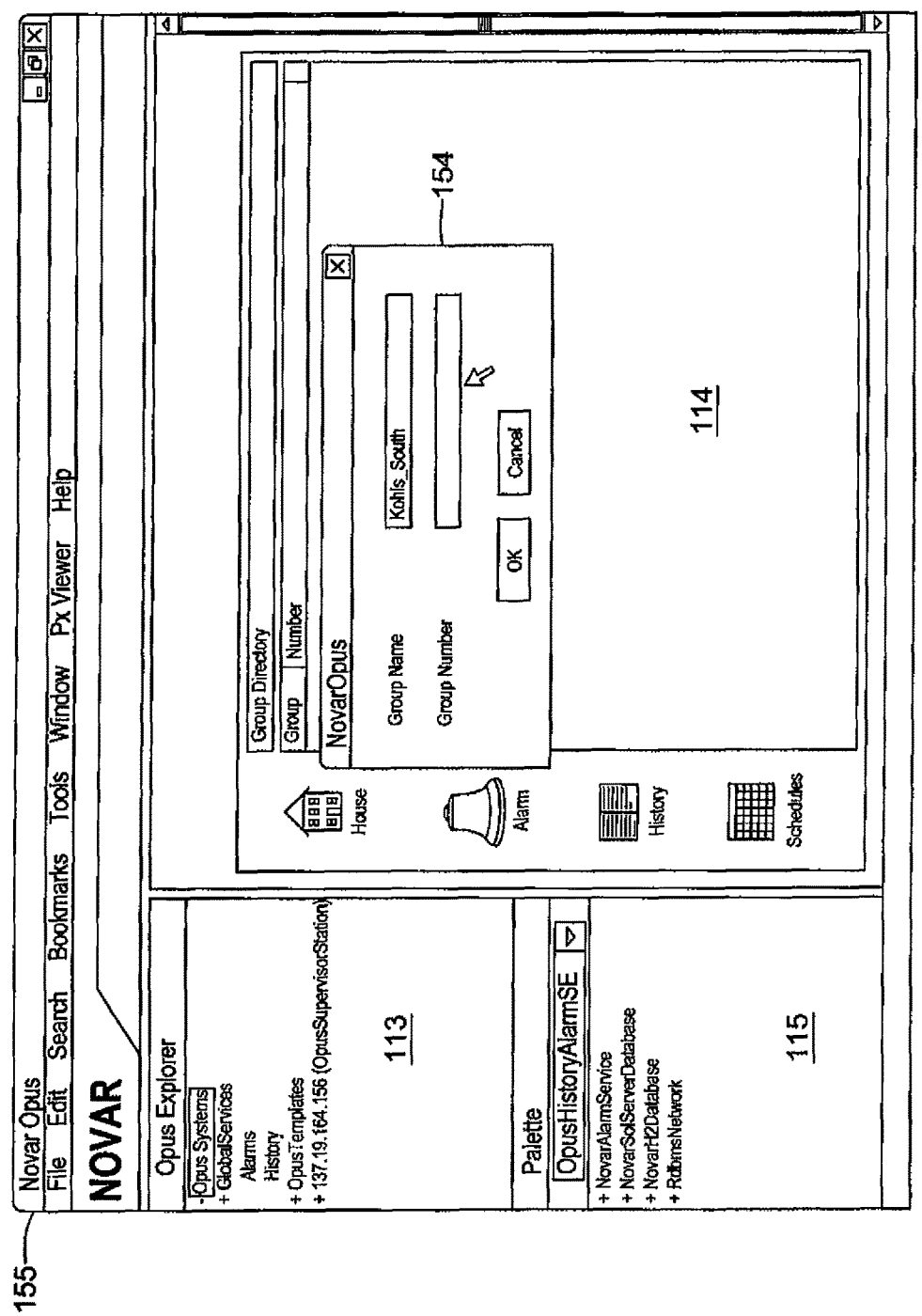
FIG. 40 is a diagram of a screen showing a box for entering the group name and number.

To create a business group at step 132, one may right click for the menu option to add the group as indicated by menu item 152 in screen 153 of FIG. 39. One may click "add new group" to get a box 154 in screen 155 of FIG. 40. The group name such as "Kohls-South" may be typed in box 154. Also, the group number may be entered.

Figure 41:
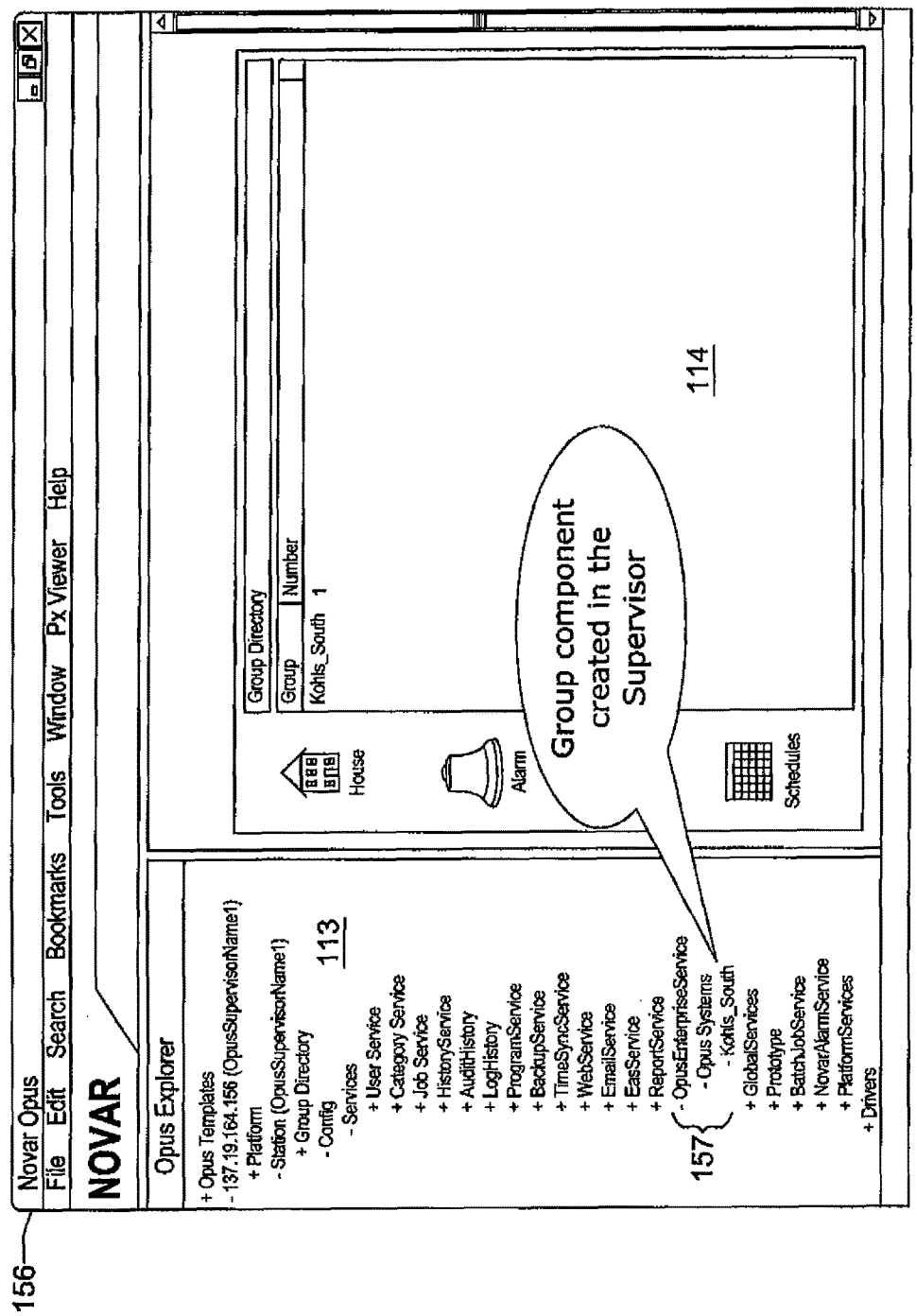
FIG. 41 is a diagram of a screen showing the results from creating a group component.

Screen 156 of FIG. 41 reveals the result of the previous actions which is a group component created in the supervisor. Lines 157 in view 113 show the hierarchy of enterprise service, the systems and Kohls_South group indicating the creation of the group component.

Figure 42:
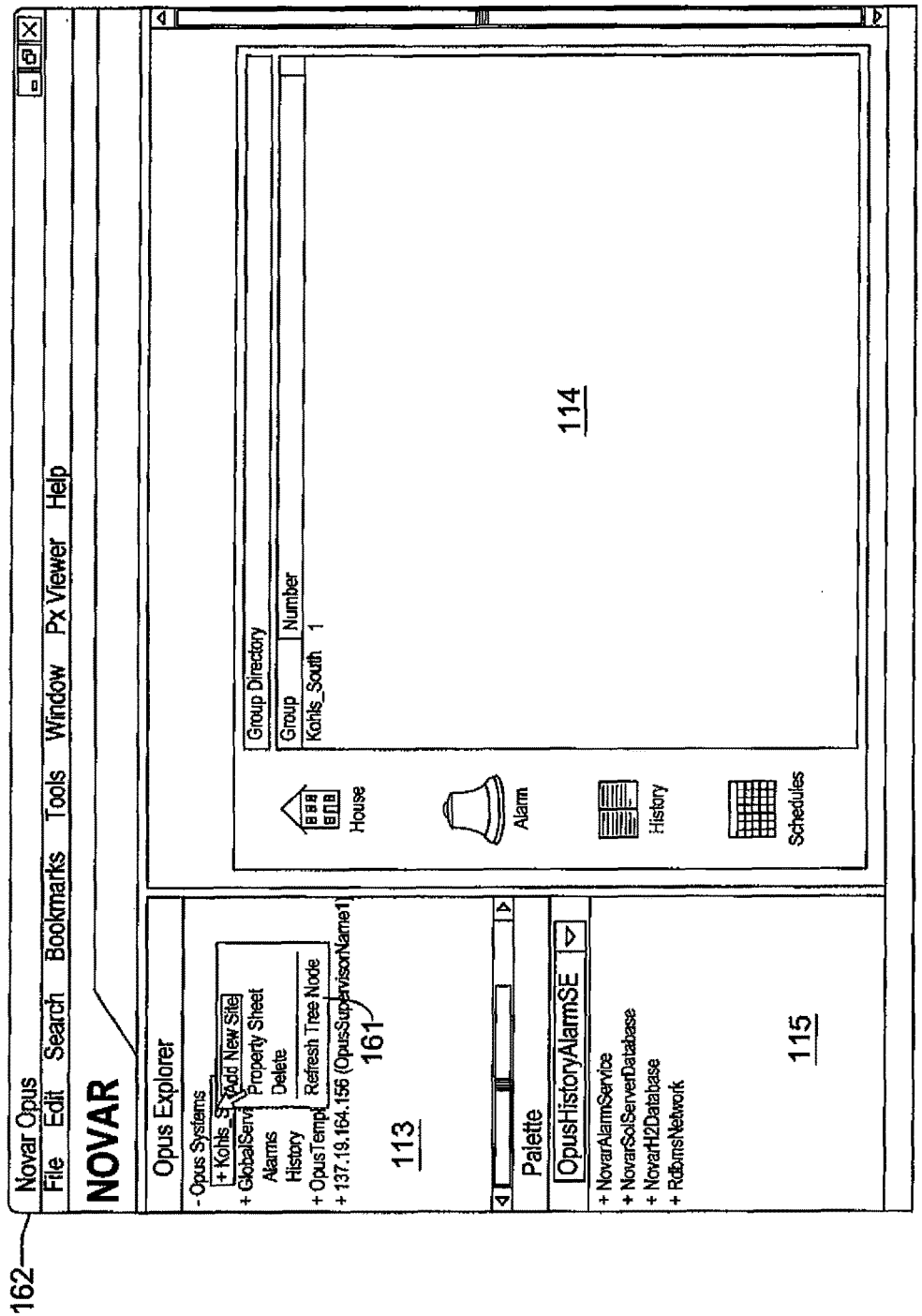
FIG. 42 is a diagram of a screen showing a menu for adding a new site.
Figure 43:
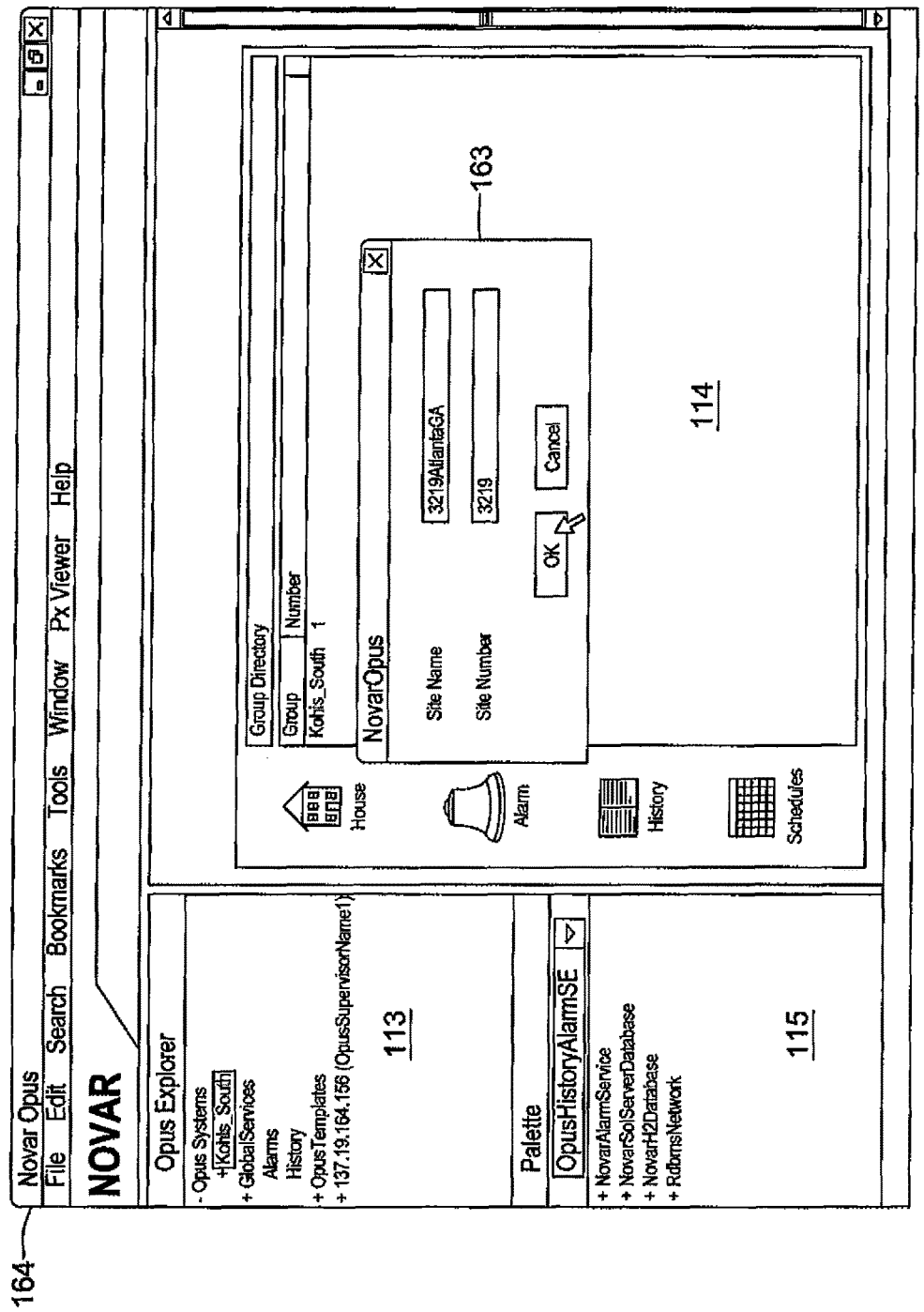
FIG. 43 is a diagram of a screen showing a box for entering the site name and number.
Figure 44:
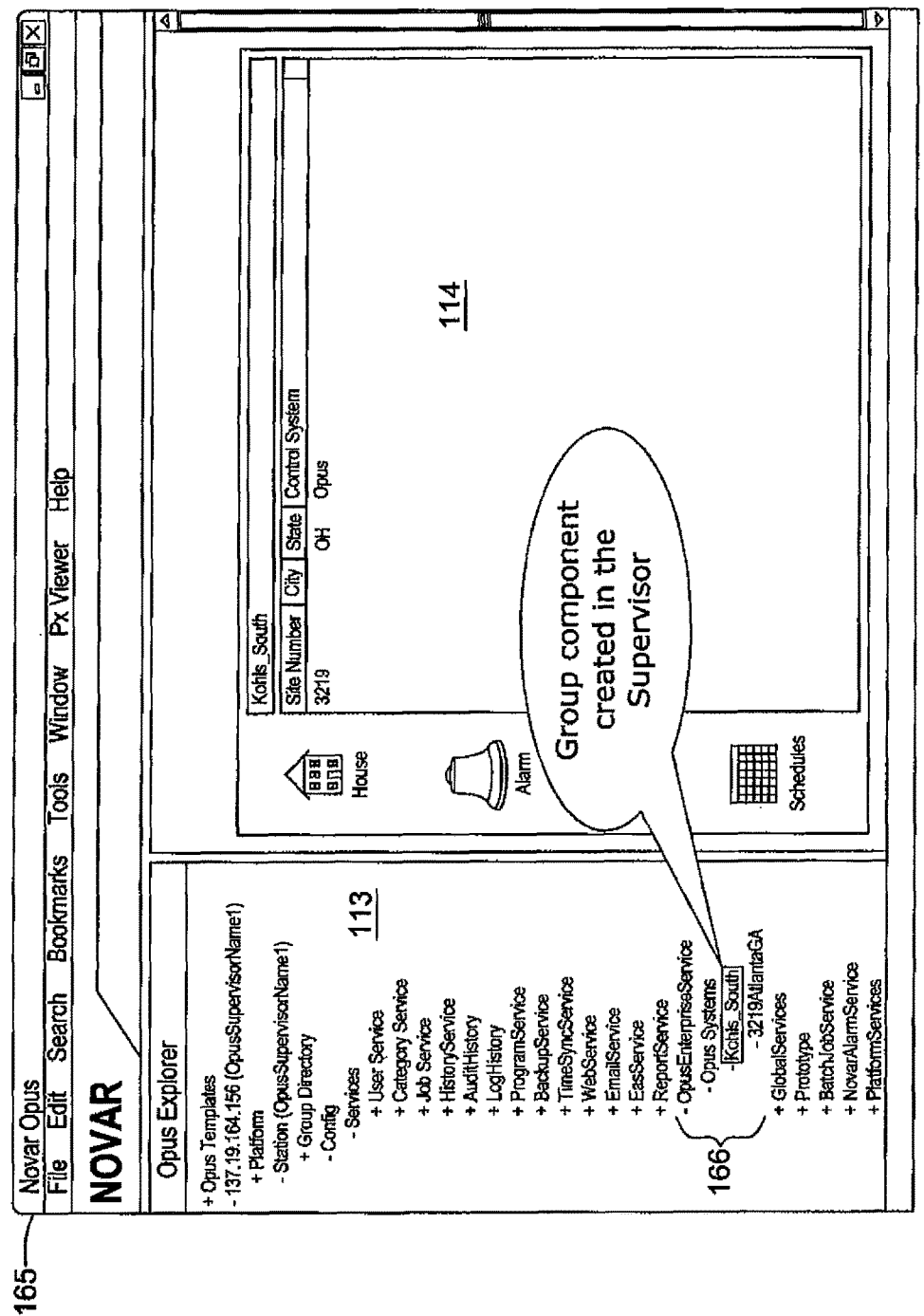
FIG. 44 is a diagram of a screen showing a creation of a site component.

To create a site at step 133, one may right click on a group to invoke the menu option and add the new site by clicking at the first line of menu 161 in screen 162 of FIG. 42. A box 163 may show up as indicated in screen 164 of FIG. 43. The site name and number may be entered in box 163. "OK" in box 163 may be clicked to result in a screen 165 of FIG. 44. One may see that the site component is created in the supervisor. Lines 166 indicate an enterprise service, the systems, Kohls_South group and 3219AtlantaGA site, in the explorer portion 113.

Figure 45:
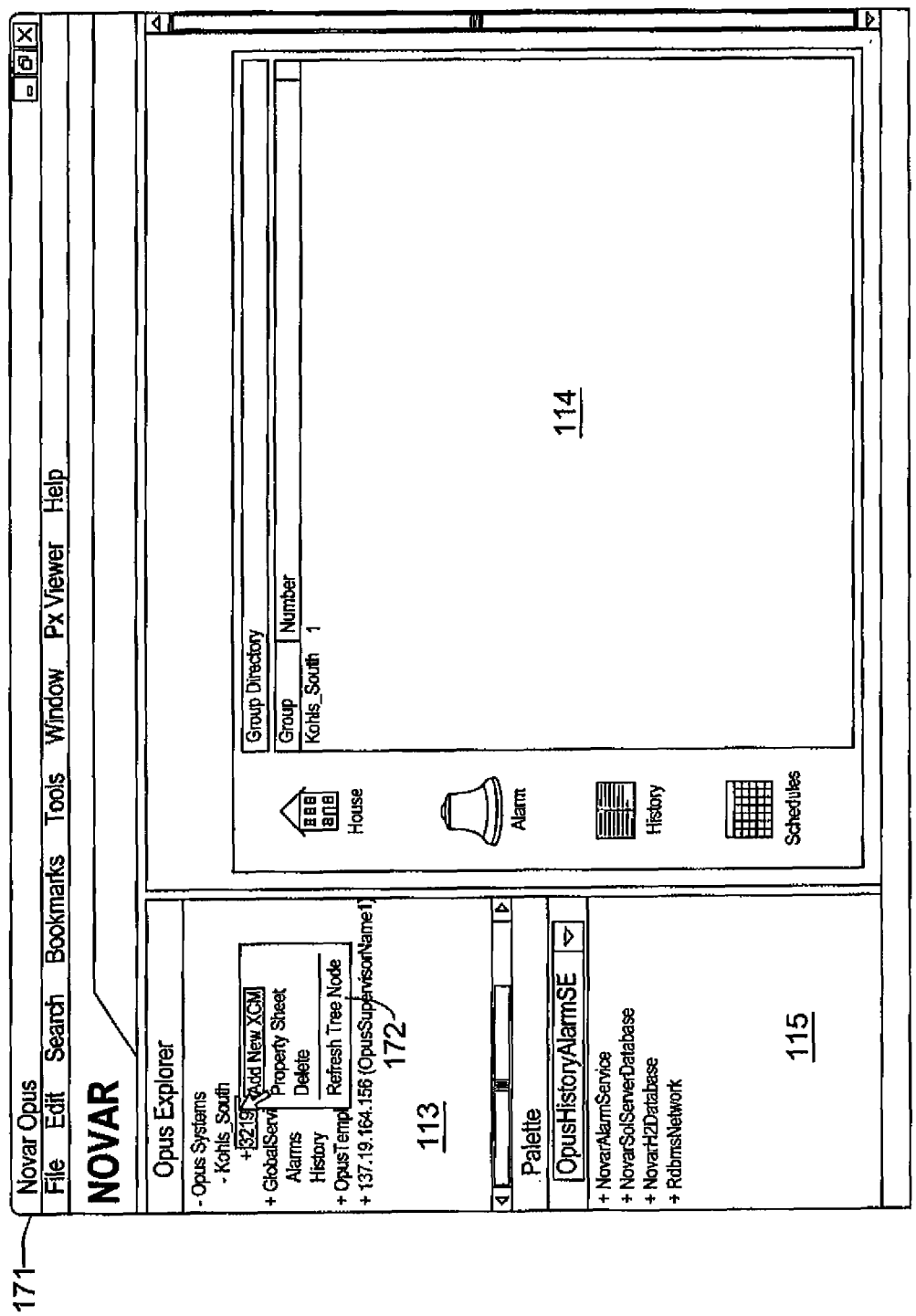
FIG. 45 is a diagram of a screen showing a menu for adding a creating an executive.
Figure 46:
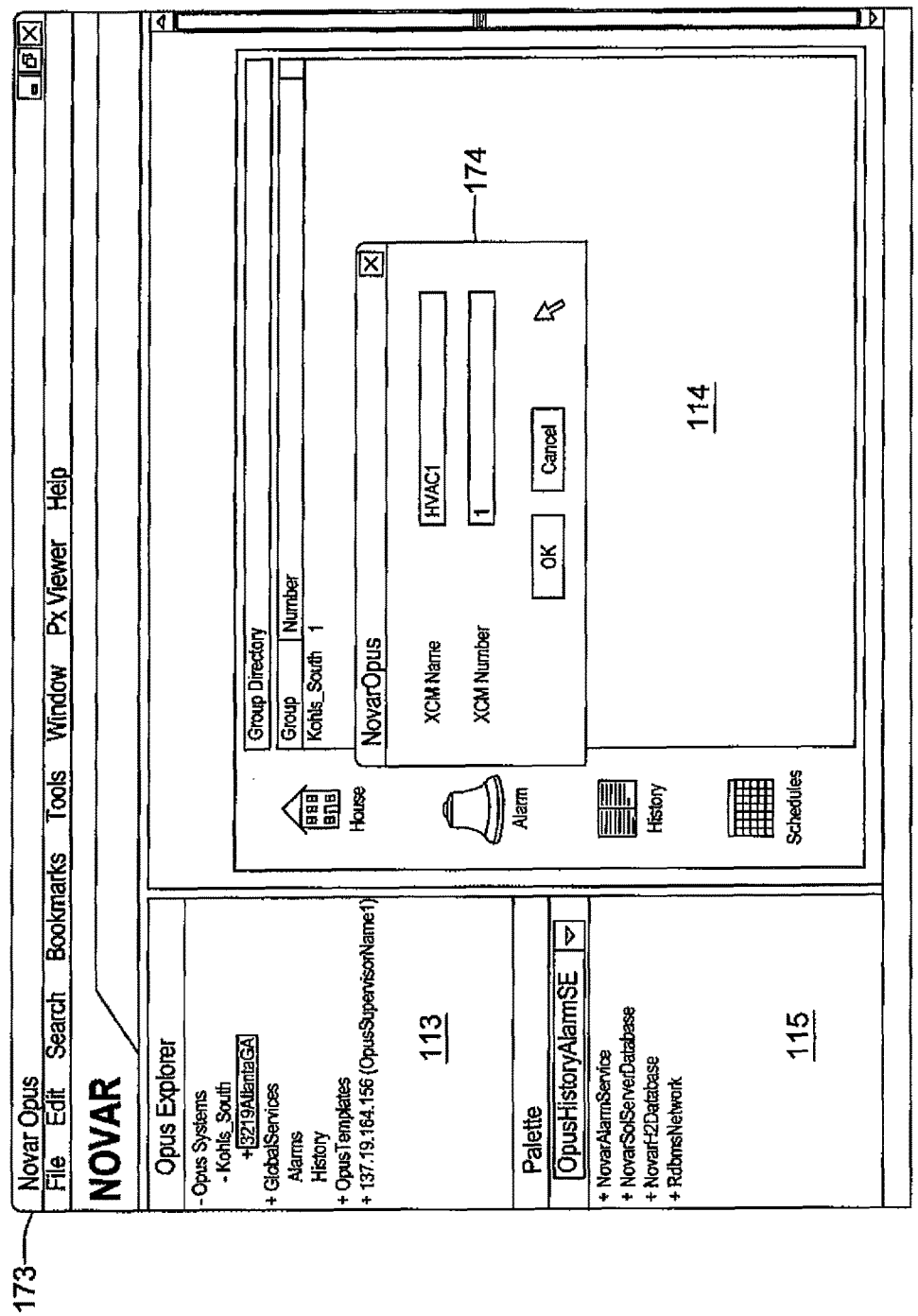
FIG. 46 is a diagram of a screen showing a box for entering the executive name and number.
Figure 47:
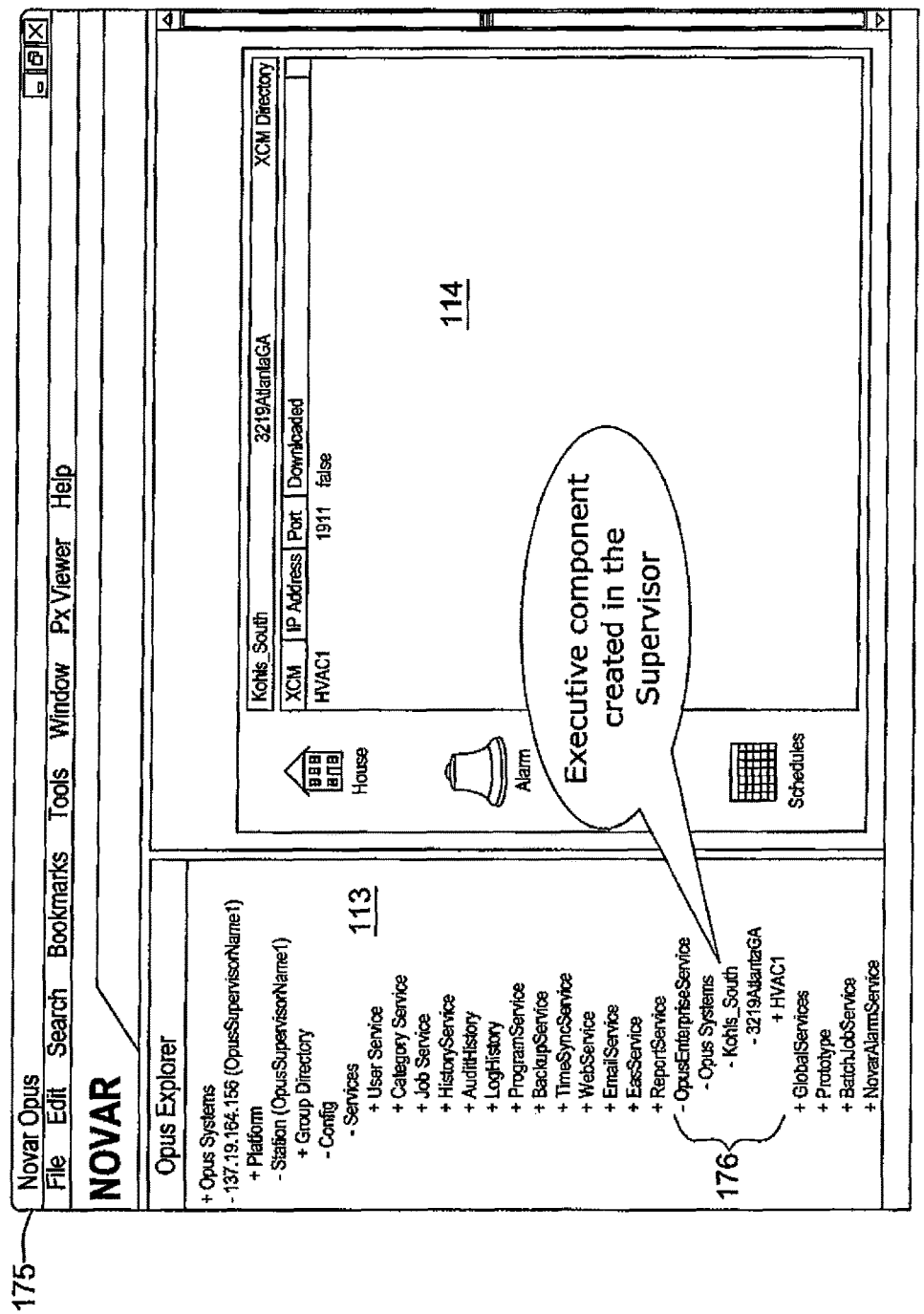
FIG. 47 is a diagram of a screen showing the resultant executive added.

A next step 134 is for creating an executive (XCM). One may right click on a site to invoke a menu option on the site component line in portion 113 of screen 171 of FIG. 45 to get a box 172. The first line of box 172 showing "add new XCM" may be clicked on to add the executive. A box 174 in screen 173 of FIG. 46 may open request the executive (XCM) name and the XCM number. Those items may be filled in and the OK in box 174 be clicked on. A resulting screen 175 of FIG. 47 may show lines 176 in portion 113 which indicate the creating of an executive component in the supervisor. The executive may be an HVAC, site controller, building environment controller, or the like. Lines 76 show the enterprise service, the systems, Kohls_South group, 3219AtalantaGA site and the HVAC1 executive (XCM) site controller. All of the last line of lines 176 might not always be shown.

Figure 48:
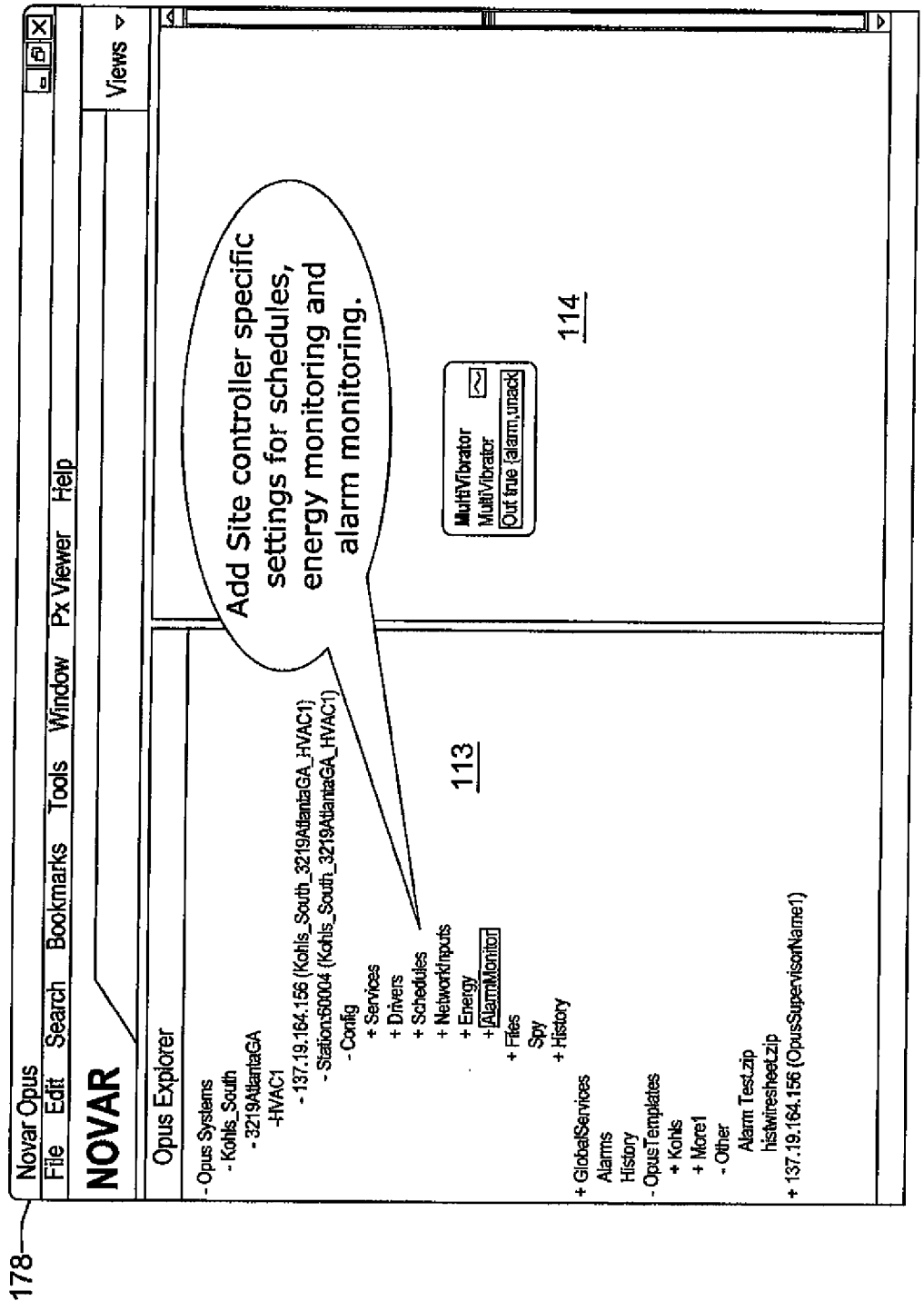
FIG. 48 is a diagram of a screen showing the adding the site controller specific configurations prior to download.

A step 135 may involve a customizing of the site configuration as indicated in screen 178 of FIG. 48. These customizations are the control configuration requirements specifically required by the target site controller.

Figure 49:
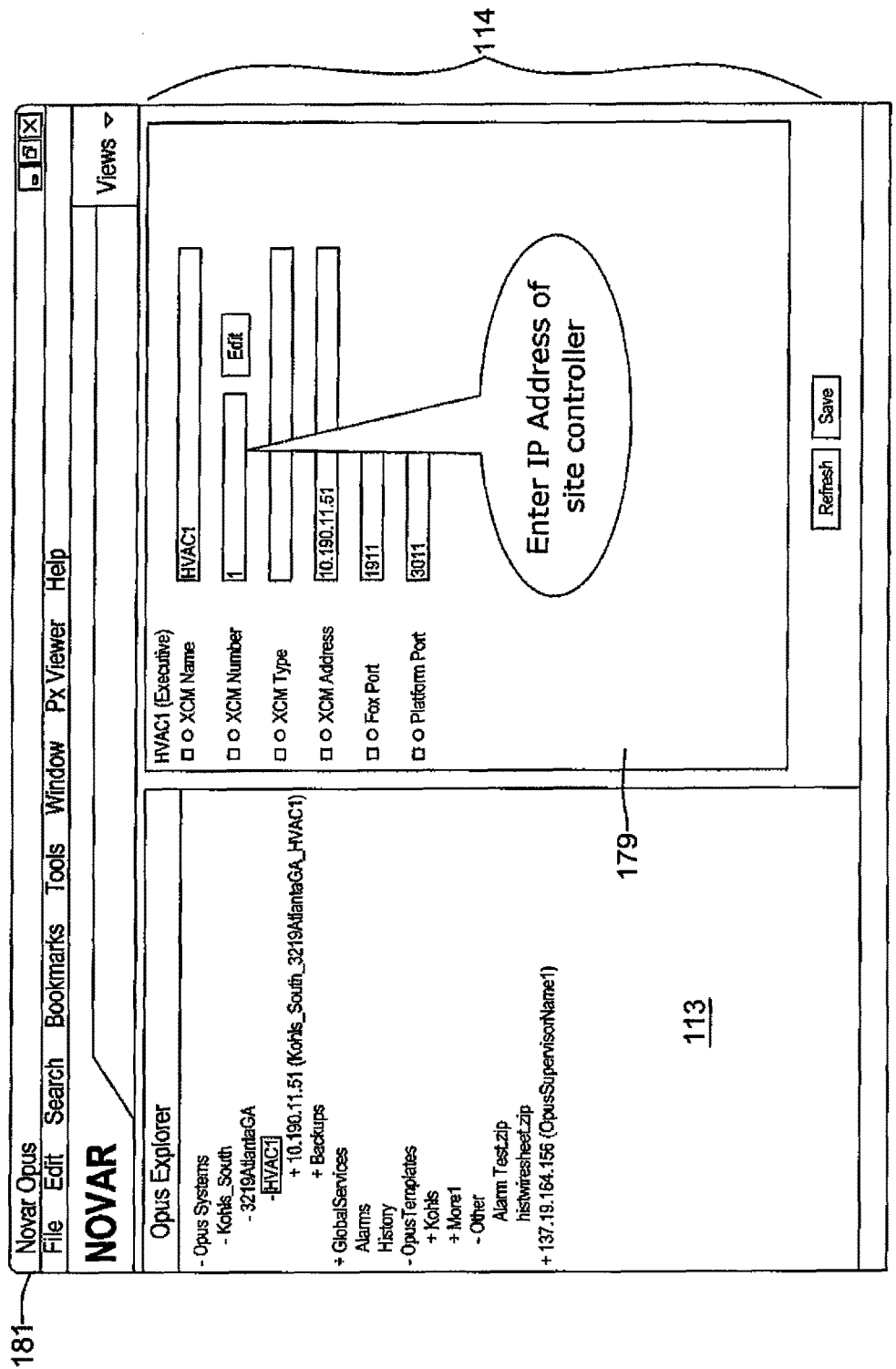
FIG. 49 is a diagram of a screen showing lines for the entering the address of the site controller to prepare for download.
Figure 50:
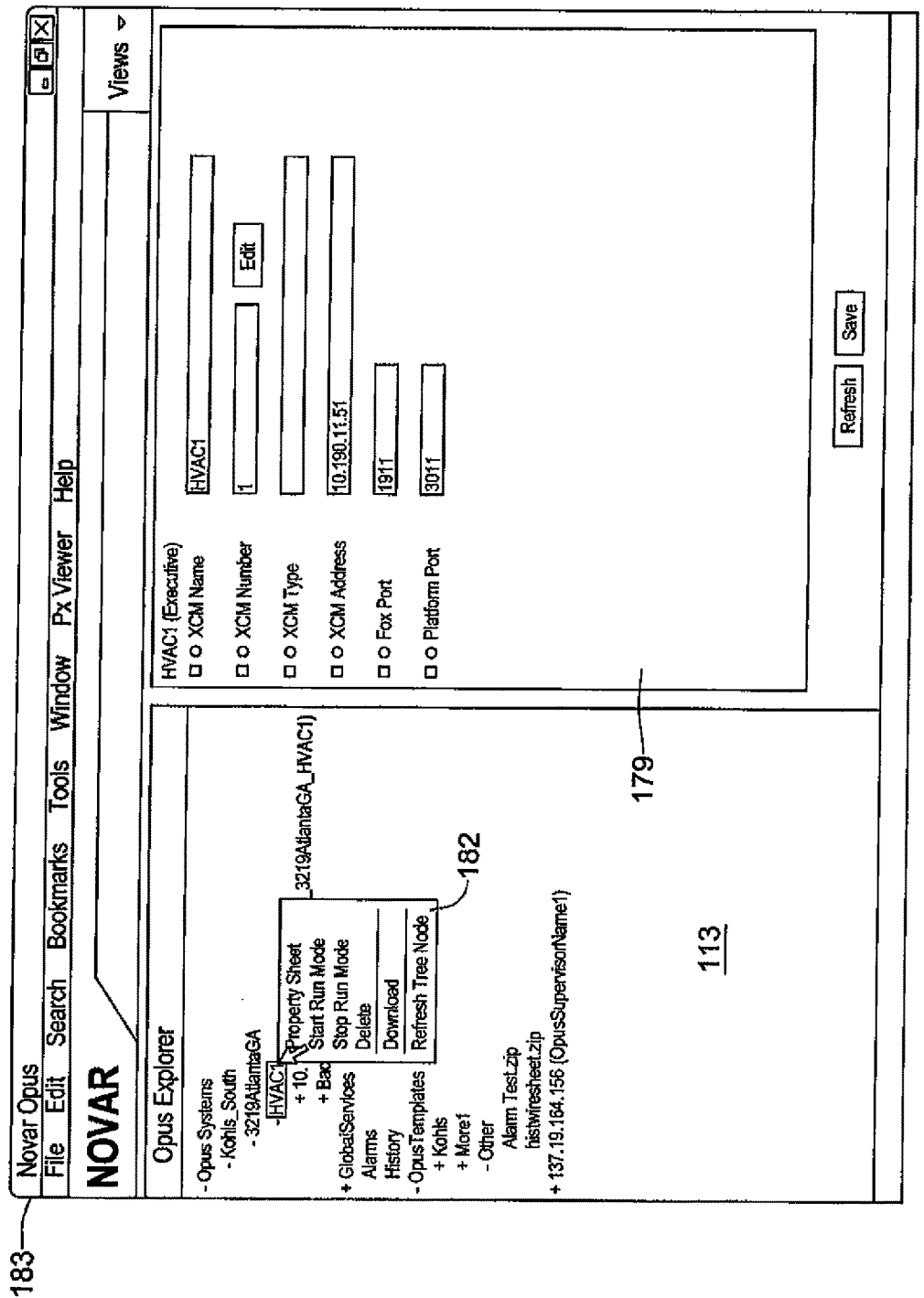
FIG. 50 is a diagram of a screen showing a menu for downloading to the site controller.
Figure 51:
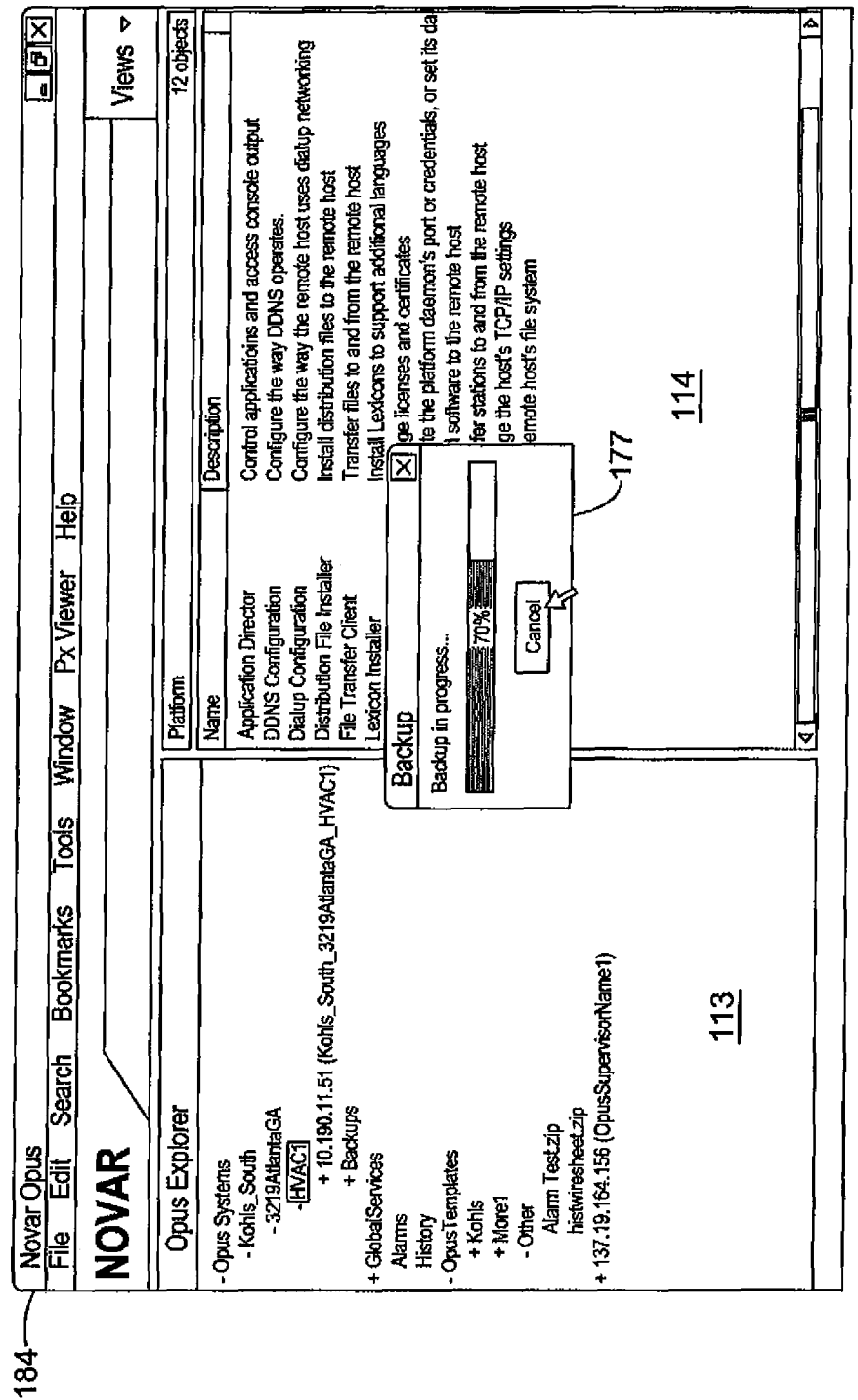
FIG. 51 is a diagram of a screen showing the download and automatic backup of the site controller after a download to it.
Figure 52:
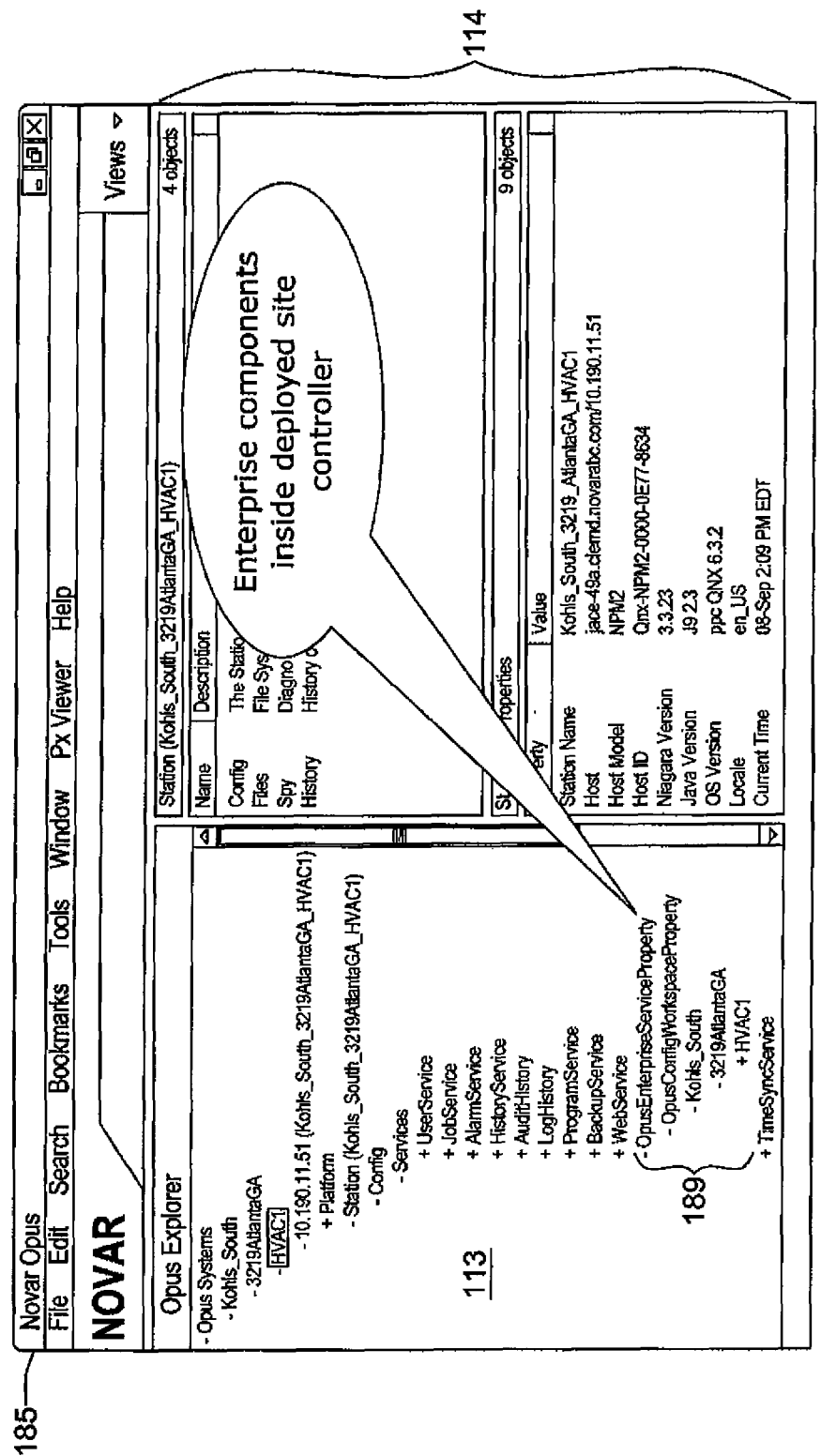
FIG. 52 is a diagram of a screen showing the components in the downloaded site controller.

At step 136, a site controller configuration may be downloaded. A destination IP address of the site controller may be entered in portion 179 of view 114 in screen 181 of FIG. 49. A download to the site controller may be initiated by right clicking to get a menu 182 in view 113 of screen 183 of FIG. 50. The download may be initiated by clicking on the download line of menu 182. The download process will transfer the site controller configuration files from the supervisor to the remote executive (XCM) and then perform an automated backup of the site controller configuration may be performed after the download as indicated by box 177 in screen 184 of FIG. 51. As a result of the deployment, the enterprise components specific to that site controller (i.e., executive) are inside the deployed site controller as indicated by lines 189 in view 113 of screen 185 of FIG. 52.

Figure 53:
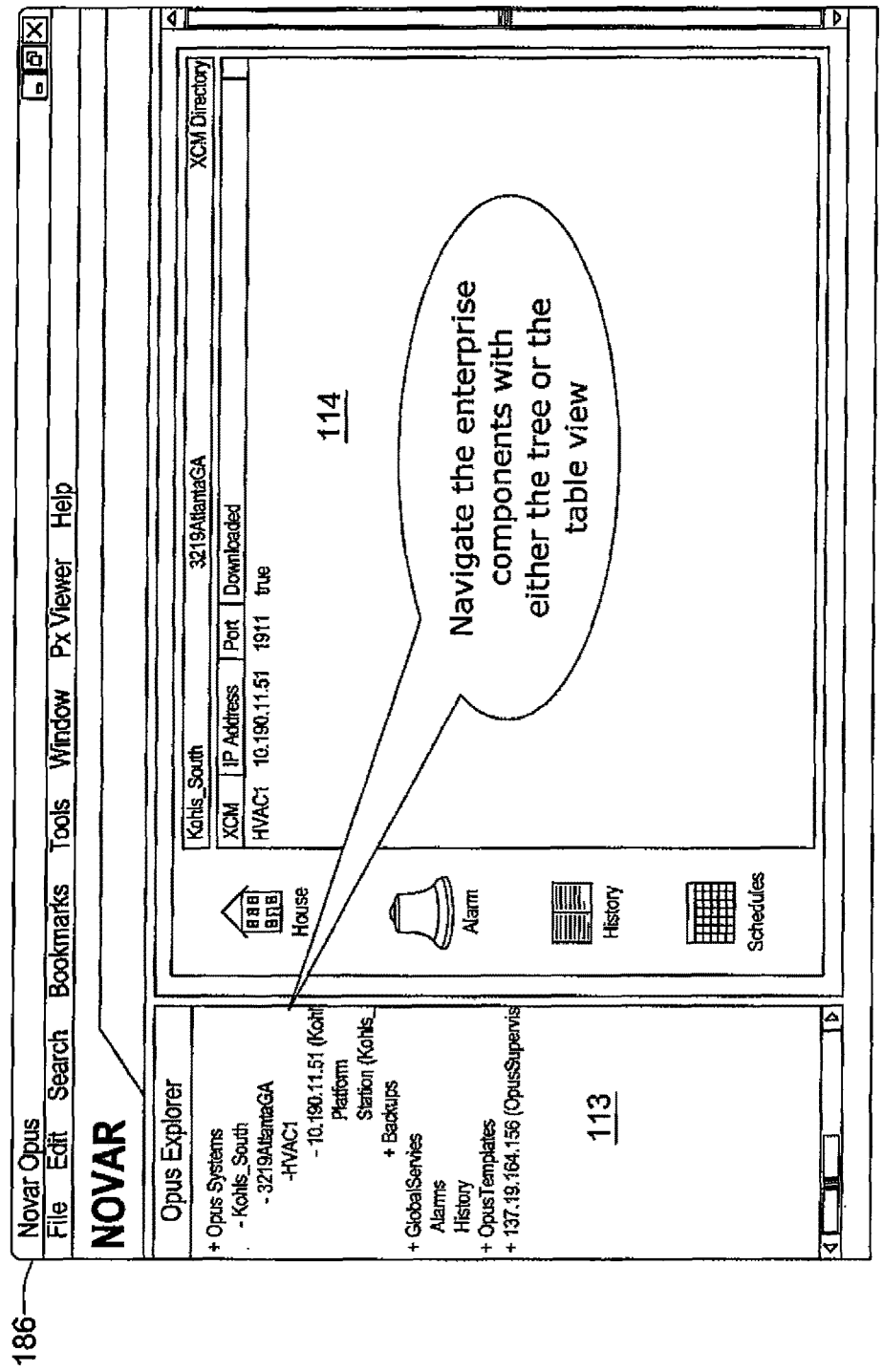
FIG. 53 is a diagram of a screen showing a basis of navigation for accessing the site controller.

Runtime activities may be noted in steps 137 and 138. Step 137 may be to monitor the deployed site controller. One may navigate the enterprise model in the supervisor to access the site controller in screen 186 of FIG. 53. One may navigate the enterprise components with either the tree in view 113 or the table in view 114.

Figure 54:
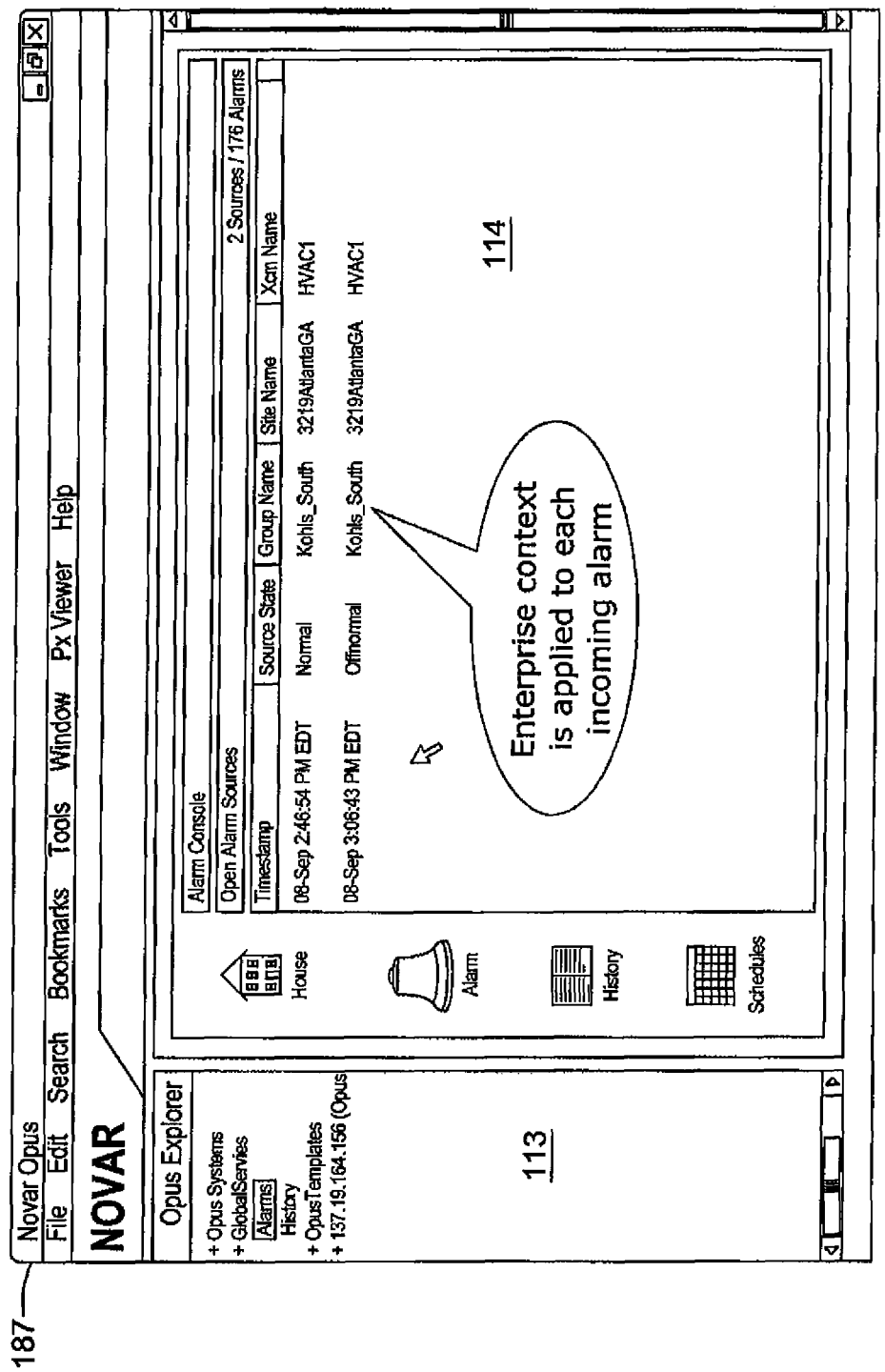

At step 138, the alarm histories may be viewed. In screen 187 of FIG. 54, the enterprise context may be applied to each incoming alarm in view 114. This view may reveal an alarm list which shows the current alarm sources. Shown may be a time stamp, a source state (i.e., normal or off normal), the group name, the site name, and the executive (XCM) name. At item 139, one may end the deployment.

A multi entity management configuration system may have a hierarchical structure having one or more business groups. Each business group may have one or more sites. Each site has one or more executives. Each site may be a business entity having a geographical location. Each executive may be a building environment controller. There may be a navigation and menu system to add, change or delete components. A component may be a business group, site or executive.

An executive may be created is a baseline Niagara™ AX JACE station. There may be an explorer type tree menu for creating and managing a personalized list of business groups, sites and executives. There may be a navigation table for browsing lists of sites and executives of a business group in a hierarchical manner.

A building management configuration system may have an enterprise structure. The structure may have business groups, sites and executive controllers. The business groups, sites and executive controllers may have a hierarchical relationship. Each site may be a business entity having a geographical location. Each executive controller may be a building environment controller. A business group may have one or more sites. A site may have one or more executive controllers.

There may be a screen on a display. A navigational tree may be situated in the screen. Business groups may be at a top level of the tree. Sites may be at a level lower than the top level. Executive controllers may be at a level lower than the level lower than the top level. There may be a navigation path for connection to deployed executive controllers. The screen may have first and second views. The navigational tree may be situated in the first view of the screen. The navigator path for connection to executive controllers may be situated in the second view of the screen.

There may be one or more alarms. The screen may here again have first and second views. The navigational tree may be situated in the first view of the screen. The one or more alarms are shown in the second view of the screen.

There may be an architecture. The architecture may have one or more workstations, connected to a bus, having a supervisor client application for providing a user interface, and a supervisor server connected to the bus. The supervisor server may maintain a database of hierarchical components which include business groups, sites and executive controller, provide for deployment, backup and restores for executive controllers, provide navigational access to deployed controllers, provide supervisory functions, and/or provide provisioning services for updates.

The one or more workstations may have a display for exhibiting a screen. A menu option in the screen may be clicked to add a business group, a site and an executive, controller in that order. The one or more site specific configurations may be added. A configuration of the site may be deployed to result in components in the site.

A model in a supervisor may be navigated to access the site. Alarms may be received from deployed sites.

The may be a approach that has providing a multiple entity configuration, incorporating creating one or more business groups, clicking a menu option to add the one or more business groups, entering an identification of the one or more business groups, creating one or more sites, clicking a menu option to add the one or more sites within a business group, entering an identification of the one or more sites, creating one or more executives, clicking a menu option to add the one or more executives within a site, and entering an identification of the one or more executives. Each site may be a business entity having a geographical location. Here the one or more group businesses, sites and executives may be displayed in a tree on a screen of a display. There may also be an adding a configuration specific to one or more sites, entering a destination address of the one or more sites, deploying the configuration specific to the one or more sites, deploying the one or more sites, backing up the one or more sites, and monitoring one or more deployed sites.

There may also be a navigating an enterprise model in a supervisor to access the one or more deployed sites, and viewing alarms from the one or more deployed sites. Each executive, for example, may be an HVAC system.

An Opus™ supervisor user application may provide a user the functions to easily create, deploy, modify and monitor a multi-site enterprise of remote Opus building management systems (BMS). These multiple site BMS controllers may be configured to control or monitor similar entities across all the sites. As the site controller configurations are created, the user must identify each configuration item with a recognizable name and/or type tag that clearly identifies the function, the definition, or the location of the entity. The types of entities that need the name or type tags may be control subsystems, schedules, alarm types or site categories. A desired outcome is that all sites are configured in a consistent manner and that the names and type tags used are the same across all of the enterprise sites. For example, if the BMS controls the lights in the parking lot, the control entity should be consistently identified as "PARKING LIGHTS". With related technology, the user application would provide multiple approaches to allow the user to name these entities. These approaches would in virtually all cases provide a user interface text box that is free form allowing the user to type in the desired name or type specification. An issue with related technology may pertain to the user interface options of applying the name and type tags. The user must rely on best practice to always apply the tags in a consistent manner and must always remember to reuse the names or types used in the other site configurations. An issue may be that over time, users applying name and type tags will begin to divert from using consistent naming and the sites will have similar naming but not exact naming. An issue with this scenario is that the Novar™ enterprise tools Alarm Pro™ and Toolset™ can only perform their functions across the multiple sites when the tagging is exactly the same from all sites. Also, the enterprise tools specifically require that the alarm types and the history point group names be set from a predefined (factory) list of known string tags.

The present disclosure may reveal a user interface tagging component that may allow user to apply names and type string tags in a consistent manner across all the multiple site configurations. This new component will operate within the context of a single Opus supervisor allowing multiple users to utilize the common lists of name and type tags. The new component will provide an approach for the user to add an application specific name and/or type tag to a configuration item using a drop down list component where the user can either add the new string to a tag list or select a previously entered string tag from the list. By using this new component, the user may establish the desired names and types within the drop down lists when configuring the initial enterprise sites. As subsequent sites are configured, the names and types will already be available in the drop down lists for the user to select and reuse. Using this new component may solve two issues. The first is that the approach for attaching the identifying tag to a configuration item is consistent and secondly the actual identifying string tags will be consistent across all sites if the users utilize the string tags from the drop down list.

The new UI component may have two parts, a hidden list component and a list selector component. The list component part may be a hidden string array that will be the data storage location of the string tags. The list selector component part may be a UI combination text entry and drop down list selection component. The UI list selector component may be programmatically connected to use an application specific hidden string array component as a data source.

This new component may be a general purpose base component implementation that is not necessarily applied to the configuration directly by the user. The new base component may be extended as application specific components used to configure specific application entities. The extended components may be selectable by the user as identifiers to tag configuration items. For example, the new base component may be used as a basis by Opus application configuration components. The components may incorporate 1) Opus control entity (name and type select), 2) Opus schedule entity (name select), 3) Opus alarm extensions (alarm type select), 4) Opus history extensions (point group select), 5) site categories (type and name select), and 6) customer custom UI food service selector These components are available in an Opus supervisor palette for use in configuring site configurations. Each component type has a hidden string list array embedded in the Opus supervisor station. As each component is added to the appropriate configuration item, when the component is used the drop down list is populated in the user interface. The user may add a new string entry or select an existing string. The selection may be attached to the configuration item. Some of the lists, such as the alarm types, may be pre-populated (hard coded) with read-only names or types. User entered name or type strings may be deleted from the lists as needed. The predefined items cannot necessarily be deleted.

Figure 55:
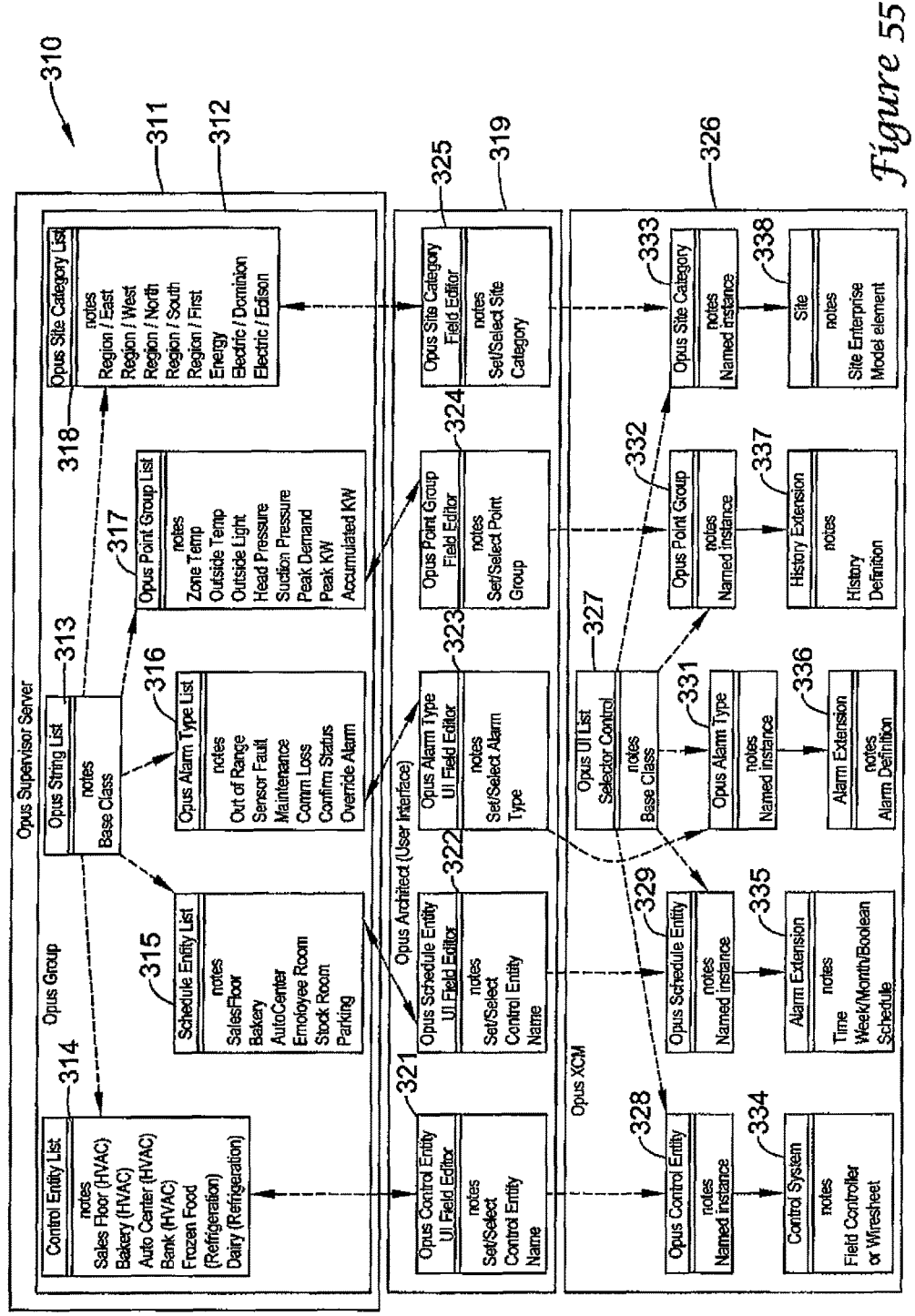
FIG. 55 is a diagram of significant components and architecture of the a user interface list control system.

FIG. 55 is a diagram of significant components and architecture of the Opus user interface list control system 310. The diagram may be divided into three domains, the Opus supervisor server 311, Opus architect user interface client 319, and the Opus XCM controller 326.

The Opus supervisor server 311 may provide the data store for the list set for each Opus group 312. Each group 312 within the Opus supervisor server 311 may have its own private list set. A list set may consist of a control entity list 314, schedule entity list 315, Opus alarm type list 316, Opus point group list 317 and the Opus site category list 318. The lists may contain string entries either pre-populated by the supervisor or entered by the user. The string lists may be persisted with the Opus supervisor server 311 allowing the entries to be re-used for each new XCM configuration.

The Opus architect 319 is the user interface client that the user operates to configure the XCM controller 326. The application may provide the Opus user list control field editors 321-325 tailored specific to each of the lists maintained in the Opus supervisor server 311. These field editors 321-325 may have the form of a UI combo box providing a text entry field and a drop down list. The field editor may provide the user capability to apply the correct name and type properties to select configuration items within the Opus XCM controller 326. The field editor may populate the drop down box with the available items in the list. The user may have the option of selecting any item in the list or entering a new string to the list and applying it to the XCM 326 configuration.

The Opus XCM controller 326 may be the host of the target configuration that the user is creating. The user may attach named instances of the control entity 328, schedule entity 329, Opus alarm extension 336, Opus history extension 337 and the Opus site category 333 to a target configuration item. Each of these components may be related directly to the Opus user list control field editors 321-325 in the Opus architect 319. When the user applies the desired name, it may be applied as an attached property within the Opus XCM 326 configuration.

To reiterate, the diagram of FIG. 55 relates to a composite structure naming list framework 310, or in other terms, the Opus user interface list control 310. Three major components may be the Opus supervisor server 311, having one or more Opus groups 312, an Opus architect (user interface) 319 for the respective group 312, and an Opus XCM controller 326.

An Opus group 312 may incorporate an Opus string list 313. List 313 may involve a base class. From list 313, there may be a control entity list 314, a schedule entity list 315, an Opus alarm type list 316, an Opus point group list 317 and an Opus site category list 318.

Examples of items in the control entity list 314 may incorporate a sales floor HVAC, baking HVAC, auto center HVAC, bank HVAC, frozen food refrigeration, dairy refrigeration, and so forth. Examples of items in the schedule entity list 315 may incorporate a sales floor, bakery, auto center, employee room, stock room, parking, and so forth. Examples of items in the Opus alarm type list 316 may incorporate out of range, sensor fault, maintenance, communication loss, confirm status, override alarm, and so forth. Examples of items in the Opus point group list 317 may incorporate zone temperature, outside temperature, outside light, head pressure, suction pressure, peak demand, peak KW, accumulated KW, and so forth. Examples of items in the Opus site category list 318 may incorporate region/east, region/west, region/north, region/south, electric/First Energy, electric/Dominion, electric/Edison, and so forth.

An Opus architect (user interface) 319 may incorporate an Opus control entity UI field editor 321, an Opus schedule entity UI field editor 322, an Opus alarm type UI field editor 323, an Opus point group field editor 324, and an Opus site category field editor 325. Opus control entity UI field editor 321 may have a two-way interaction with control entity list 314, and may pertain to a set/select control entity name.

Opus schedule entity UI field editor 322 may have a two-way interaction with schedule entity list 315, and may pertain to a set/select schedule entity name. Opus alarm type UI field editor 323 may have a two-way interaction with Opus alarm type list 316, and may pertain to a set/select alarm type. Opus point group field editor 324 may have a two-way interaction with Opus point group list 317, and may pertain to a set/select point group. Opus site category field editor 325 may have a two-way interaction with Opus site category list 318, and may pertain to a set/select site category.

Opus XCM controller 326 may have an Opus UI selector control 327 which may involve a base class. From control 327, there may be an Opus control entity 328, Opus schedule entity 329, Opus alarm type 331, Opus point group 332, and Opus site category 333. Opus control entity 328 may have an input from Opus control entity UI field editor 321, and may pertain to a name instance. Opus schedule entity 329 may have an input from Opus schedule entity UI field editor 322, and may pertain to a named instance. Opus alarm type 331 may have an input from Opus alarm type UI field editor 323, and may pertain to a named instance. Opus point group 332 may have an input from Opus point group field editor 324, and may pertain to a named instance. Opus site category 333 may have an input from Opus site category field editor 325, and may pertain to a named instance.

A control system 334 may receive an input from Opus control entity 328, and relate to a field controller or wire sheet. A schedule 335 may receive an input from Opus schedule entity 329, and relate to a time and a week/month/Boolean schedule. An alarm extension 336 may receive an input from Opus alarm type 331, and relate to an alarm definition. A history extension 337 may receive an input from Opus point group 332, and relate to a history definition. Site 338 may receive an input from Opus site category 333, and relate to a site Enterprise model element.

The component at symbol 313 and symbol 327 may be extended to support naming a new configuration component. An existing field editor component, such as, for example, Opus control entity UI field editor at symbol 321, may be copied and modified to relate to the new configuration component.

The Opus user interface list control is a general purpose design consisting of base components that may be extended and modified to support this same naming functionality for new component types created in future implementations. The current implementation may apply the Opus user list control feature to control entities, schedule entities, alarm types, point groups and site categories.

Figure 56:
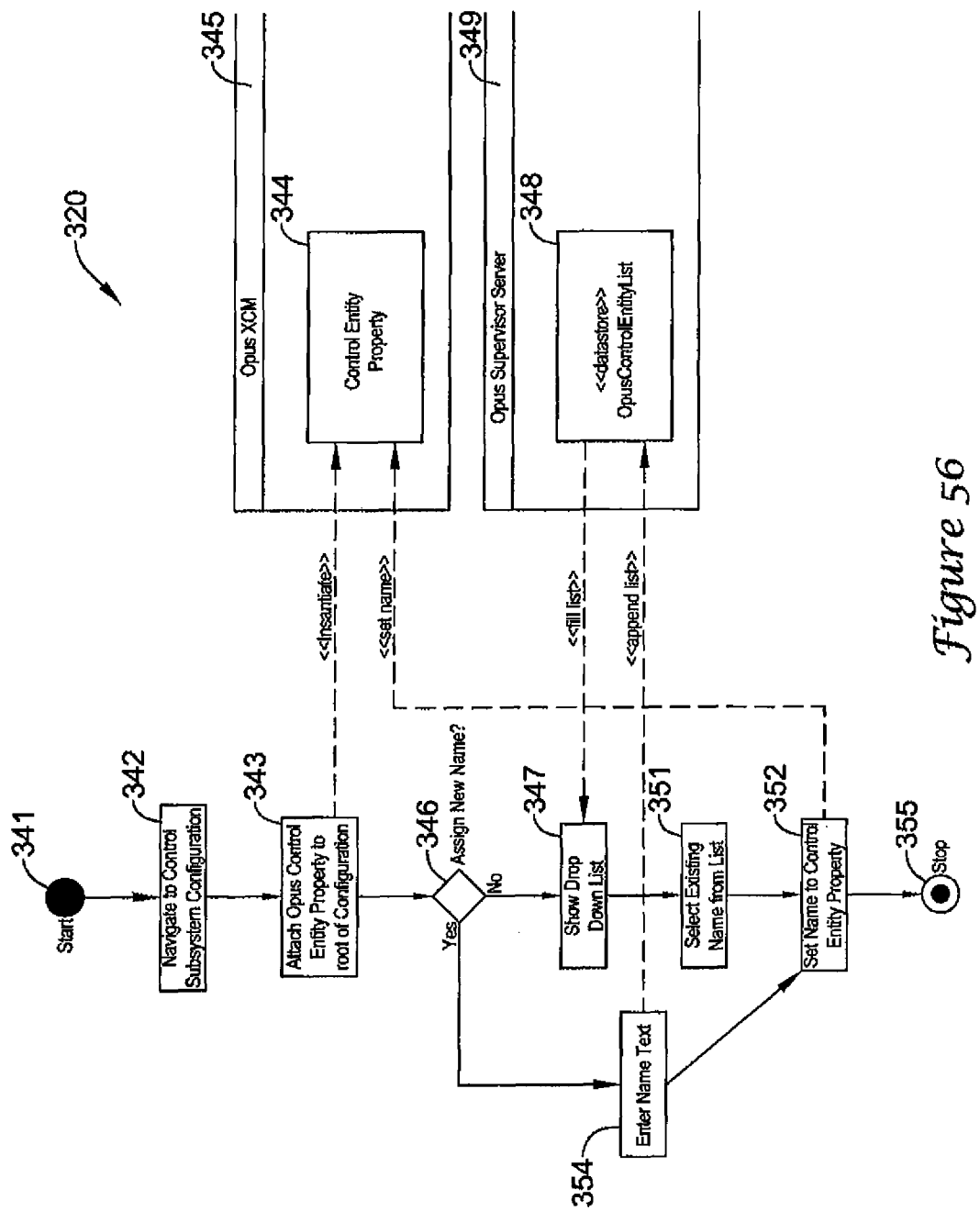
FIGS. 56, 57, 58, 59 and 60 are diagrams of a user interface and data flow for a user interface list control to set control entity, schedule entity, alarm type, history point group and site category names, respectively.

FIG. 56 is a diagram 320 which provides a user interface flow and data flow for using the Opus user interface list control to set the Opus control entity 314 name. This flow may be similar for the Opus schedule entity 315, alarm type 316, history point group 317 and Opus site category 318 names, as shown in diagrams 330, 340, 350 and 360 of FIGS. 57, 58, 59 and 60, respectively. Theses diagrams may relate to act naming and the Opus architect client.

There may be a start 341 with navigation to a control subsystem configuration at symbol 342. An Opus control entity property may be attached to a root of the subsystem configuration at symbol 343. The control entity may be instantiated at control entity property 344 in Opus XCM 345. A question of assigning a new name may be asked at symbol 346. If the answer is no, then a drop down list is shown at symbol 347. The list may be filled from a data store Opus control entity list 348 in the Opus supervisor server 349. An existing name may be selected from the list at symbol 351. The name may be set to the control entity property at symbol 352. The set name may be provided to control entity property 344 at Opus XCM 345. After symbol 352, then the approach may come to a stop 355.

However, if the answer to the question at symbol 346 of assigning a new name is yes, then the name text may be entered at symbol 354. The Opus control entity list 348 at Opus supervisor server 349 may be appended with the new name from symbol 354. The name from symbol 354 may be set to the control entity property at symbol 352. The set name may be provided to control entity property 344 at Opus XCM 345. After symbol 352, then the approach may come to a stop 355.

Figure 57:
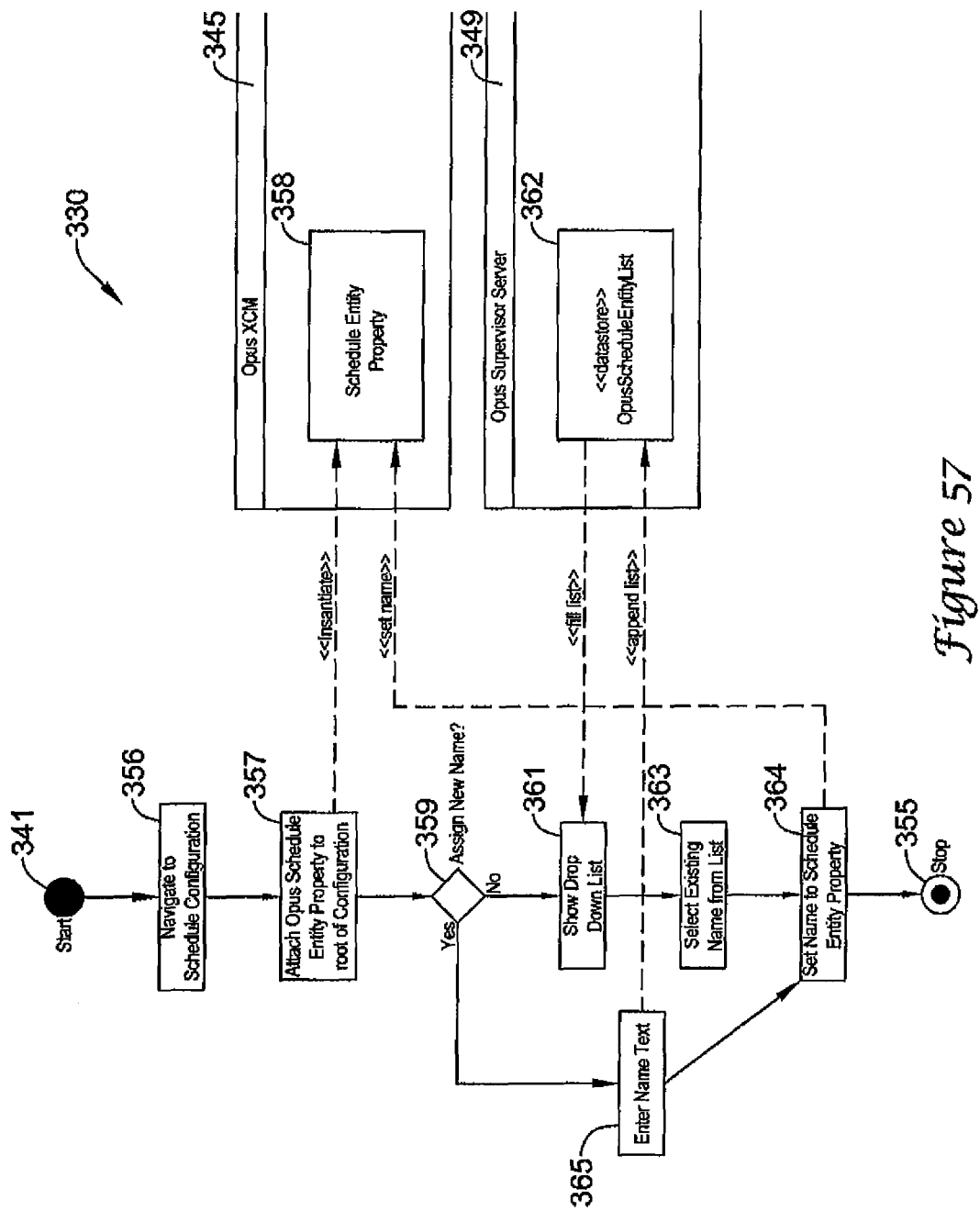

FIG. 57 is a diagram 330 which provides a user interface flow and data flow for using the Opus user interface list control to set the Opus schedule entity 315 name. There may be a start 341 with navigation to a schedule subsystem configuration at symbol 356. An Opus schedule entity property may be attached to a root of the subsystem configuration at symbol 357. The schedule entity may be instantiated at schedule entity property 358 in Opus XCM 345. A question of assigning a new name may be asked at symbol 359. If the answer is no, then a drop down list is shown at symbol 361. The list may be filled from a data store Opus schedule entity list 362 in the Opus supervisor server 349. An existing name may be selected from the list at symbol 363. The name may be set to the schedule entity property at symbol 364. The set name may be provided to schedule entity property 358 at Opus XCM 345. After symbol 364, then the approach may come to a stop 355.

However, if the answer to the question at symbol 359 of assigning a new name is yes, then the name text may be entered at symbol 365. The Opus schedule entity list 362 at Opus supervisor server 349 may be appended with the new name from symbol 365. The name from symbol 365 may be set to the schedule entity property at symbol 364. The set name may be provided to schedule entity property 358 at Opus XCM 345. After symbol 364, then the approach may come to a stop 355.

Figure 58:
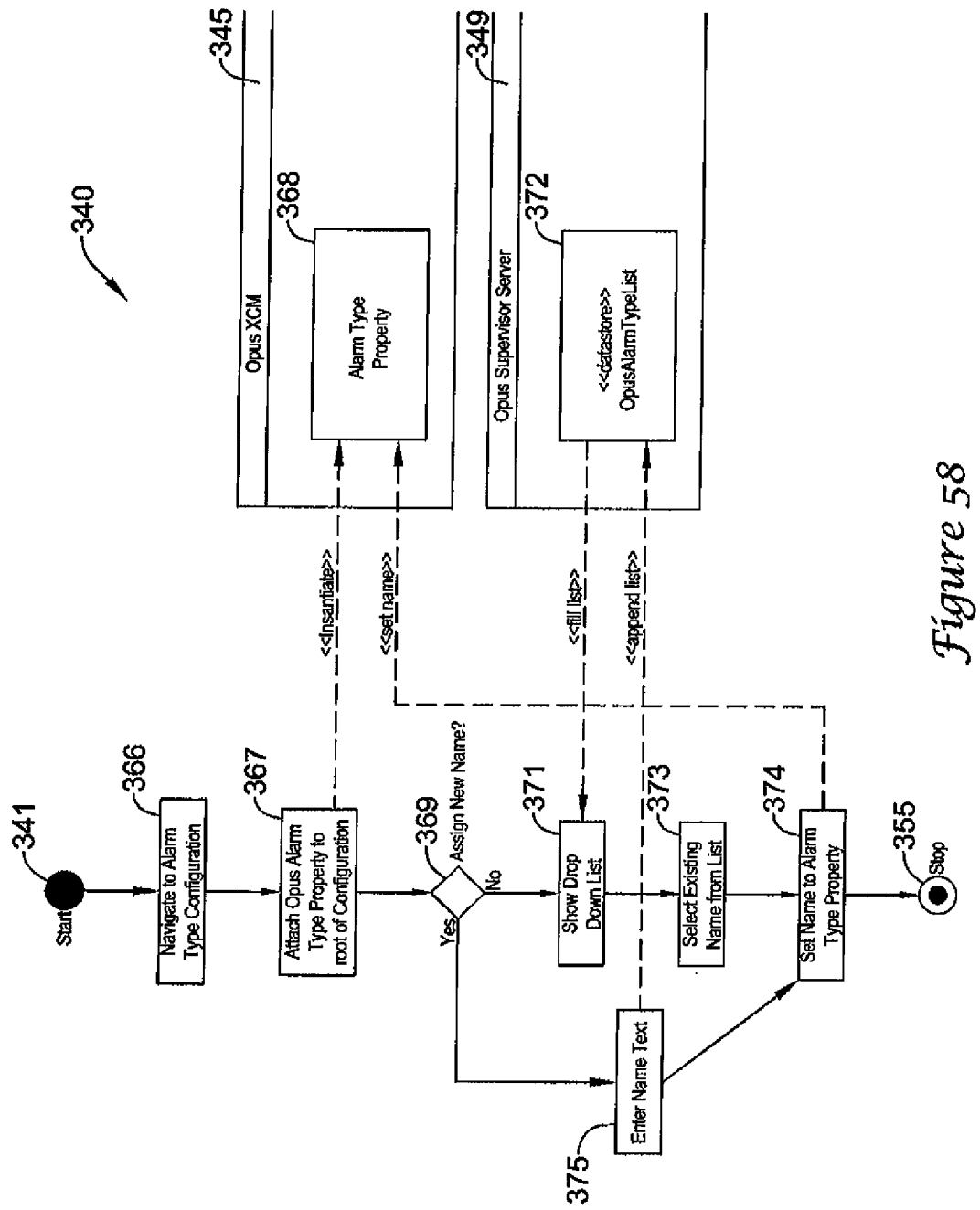

FIG. 58 is a diagram 40 which provides a user interface flow and data flow for using the Opus user interface list control to set the Opus alarm type 16 name. There may be a start 41 with navigation to an alarm subsystem configuration at symbol 66. An Opus alarm type property may be attached to a root of the subsystem configuration at symbol 67. The alarm type may be instantiated at alarm type property 68 in Opus XCM 45. A question of assigning a new name may be asked at symbol 69. If the answer is no, then a drop down list is shown at symbol 71. The list may be filled from a data store Opus alarm type list 72 in the Opus supervisor server 49. An existing name may be selected from the list at symbol 73. The name may be set to the alarm type property at symbol 74. The set name may be provided to alarm type property 68 at Opus XCM 45. After symbol 74, then the approach may come to a stop 55.

However, if the answer to the question at symbol 69 of assigning a new name is yes, then the name text may be entered at symbol 75. The Opus alarm type list 72 at Opus supervisor server 49 may be appended with the new name from symbol 75. The name from symbol 75 may be set to the alarm type property at symbol 74. The set name may be provided to alarm type property 68 at Opus XCM 45. After symbol 74, then the approach may come to a stop 55.

Figure 59:
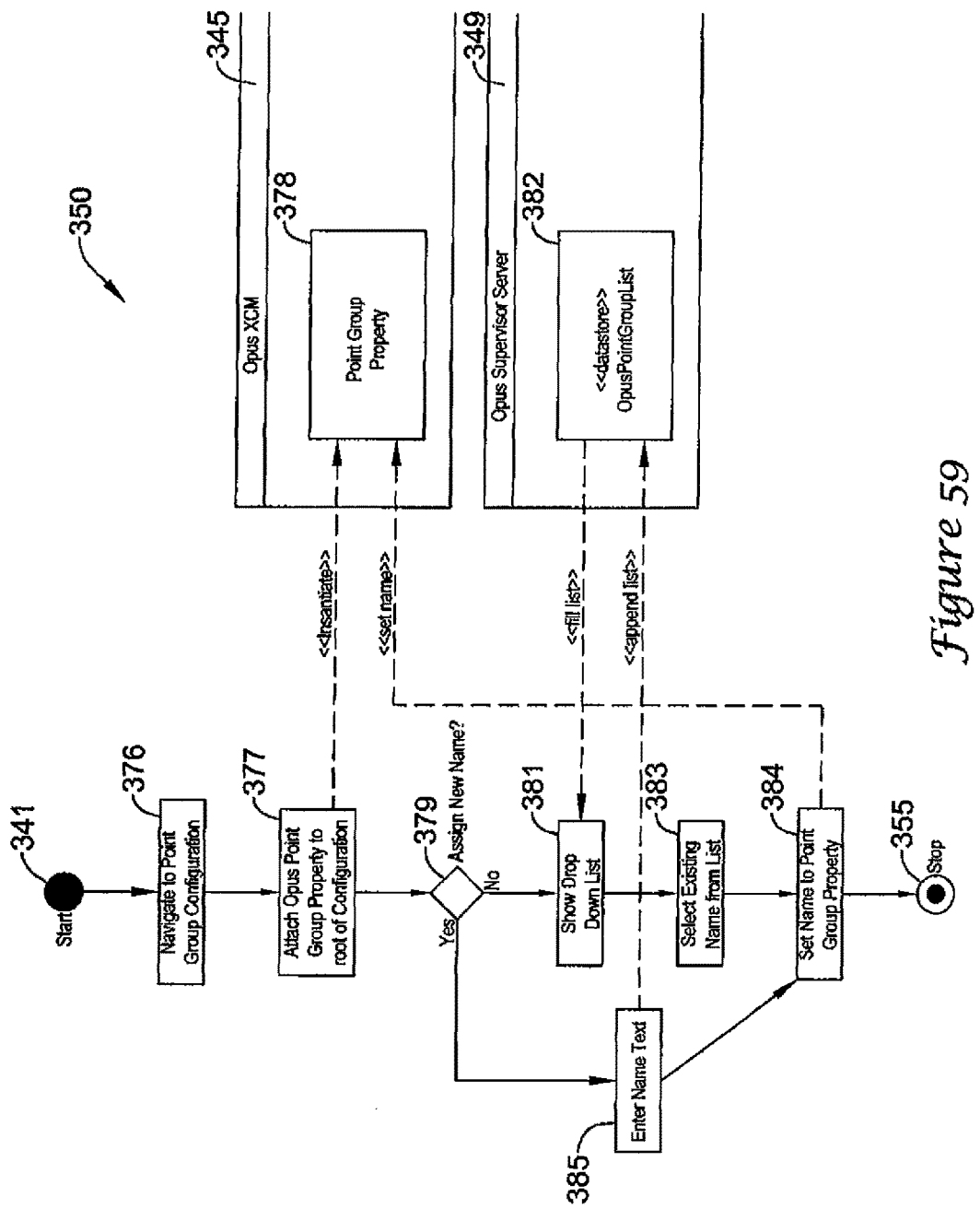

FIG. 59 is a diagram 350 which provides a user interface flow and data flow for using the Opus user interface list control to set the Opus point group 317 name. There may be a start 341 with navigation to a point subsystem configuration at symbol 376. An Opus point group property may be attached to a root of the subsystem configuration at symbol 377. The point group may be instantiated at point group property 378 in Opus XCM 345. A question of assigning a new name may be asked at symbol 379. If the answer is no, then a drop down list is shown at symbol 381. The list may be filled from a data store Opus point group list 382 in the Opus supervisor server 349. An existing name may be selected from the list at symbol 383. The name may be set to the point group property at symbol 384. The set name may be provided to point group property 378 at Opus XCM 345. After symbol 384, then the approach may come to a stop 355.

However, if the answer to the question at symbol 379 of assigning a new name is yes, then the name text may be entered at symbol 385. The Opus point group list 382 at Opus supervisor server 349 may be appended with the new name from symbol 385. The name from symbol 385 may be set to the point group property at symbol 384. The set name may be provided to point group property 378 at Opus XCM 345. After symbol 384, then the approach may come to a stop 355.

Figure 60:
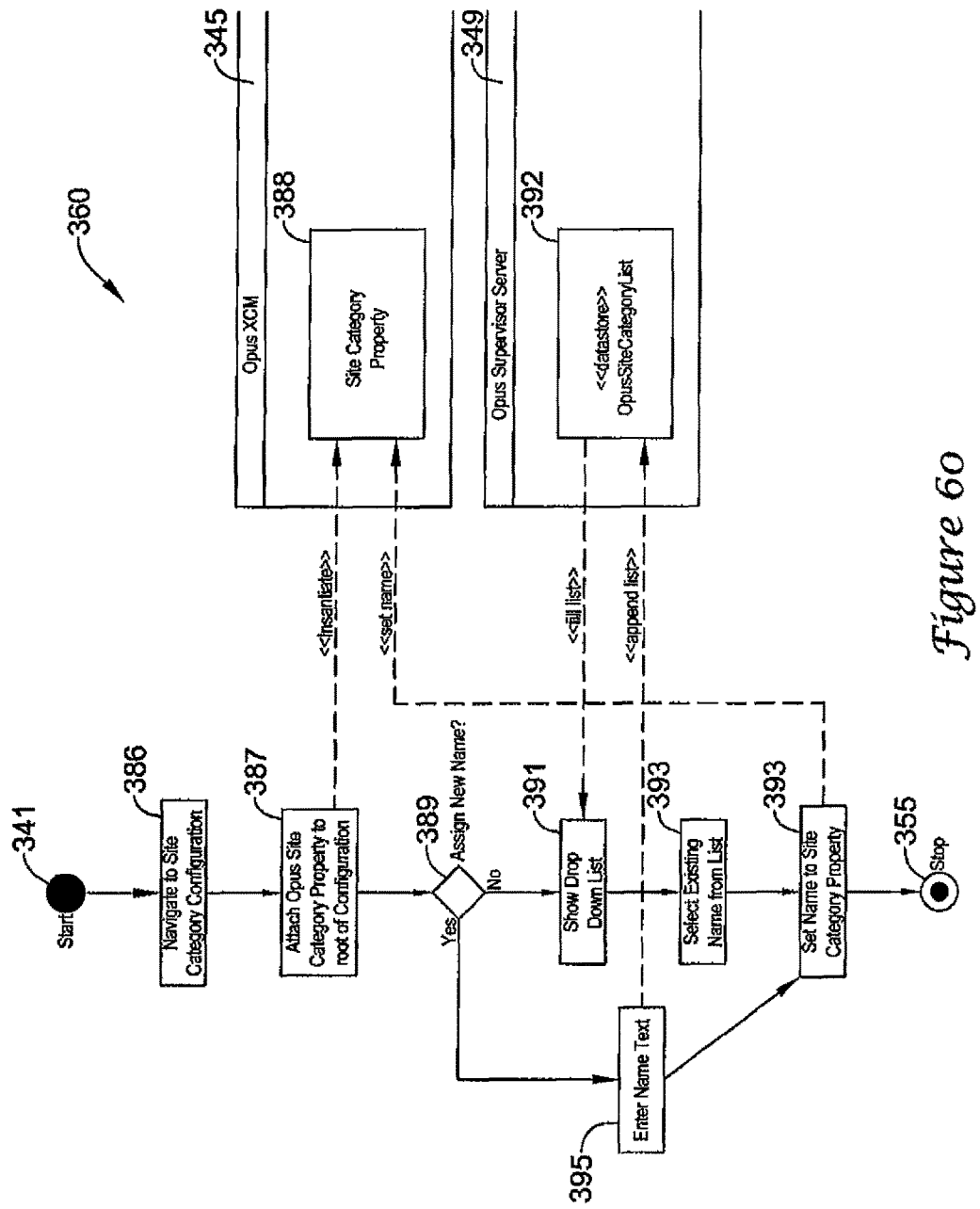

FIG. 60 is a diagram 360 which provides a user interface flow and data flow for using the Opus user interface list control to set the Opus site category 318 name. There may be a start 341 with navigation to a site category configuration at symbol 386. An Opus site category property may be attached to a root of the subsystem configuration at symbol 387. The site category may be instantiated at site category property 388 in Opus XCM 345. A question of assigning a new name may be asked at symbol 389. If the answer is no, then a drop down list is shown at symbol 391. The list may be filled from a data store Opus site category list 392 in the Opus supervisor server 349. An existing name may be selected from the list at symbol 393. The name may be set to the site category property at symbol 394. The set name may be provided to site category property 388 at Opus XCM 345. After symbol 394, then the approach may come to a stop 355.

However, if the answer to the question at symbol 389 of assigning a new name is yes, then the name text may be entered at symbol 395. The Opus site category list 392 at Opus supervisor server 349 may be appended with the new name from symbol 395. The name from symbol 395 may be set to the site category property at symbol 394. The set name may be provided to site category property 388 at Opus XCM 345. After symbol 394, then the approach may come to a stop 355.

Figure 61:
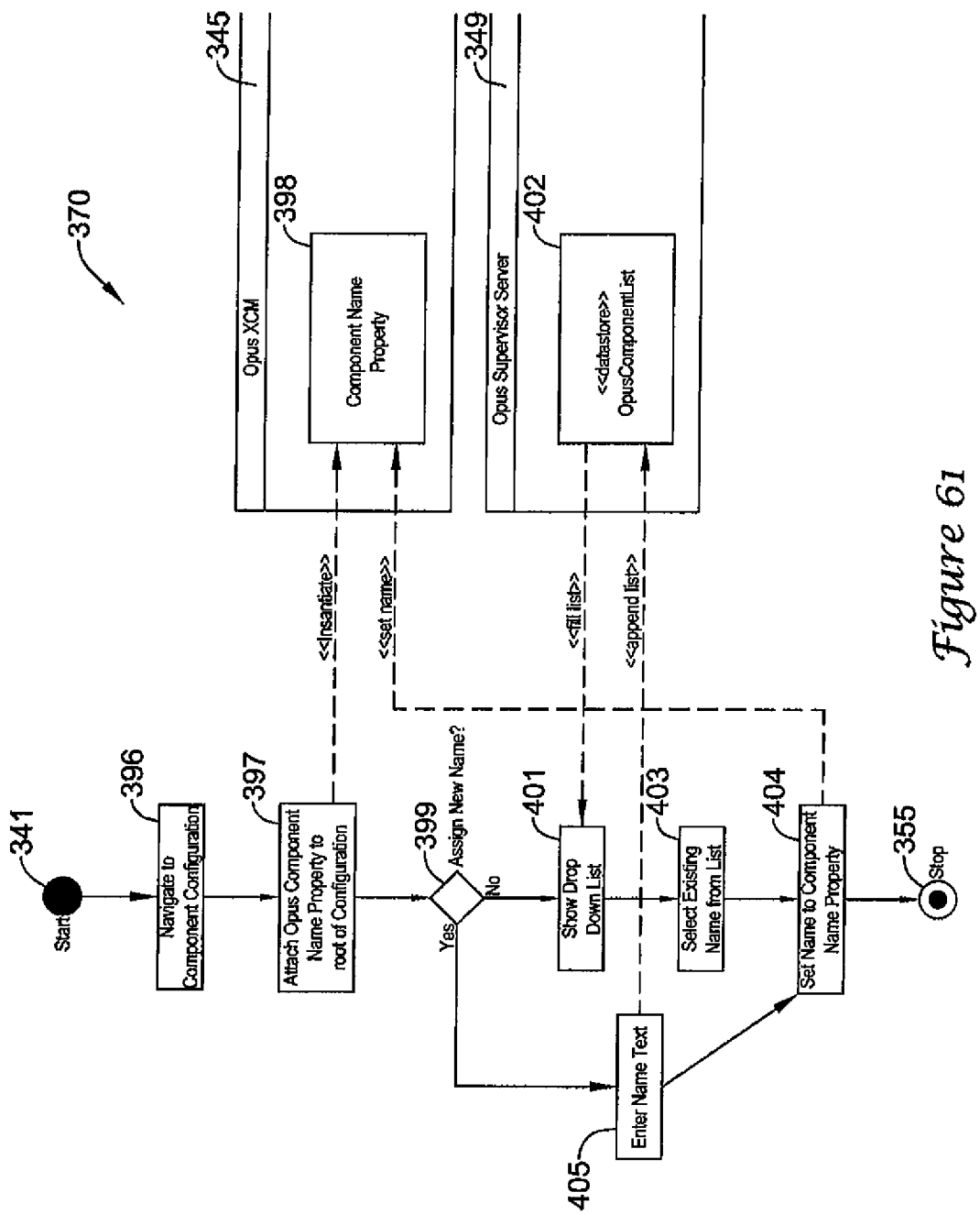
FIG. 61 is a diagram of a user interface and data flow for a user interface list control to set a component name.

FIG. 61 is a general diagram 370 which provides a user interface flow and data flow for using the Opus user interface list control to set a component name. There may be a start 341 with navigation to a component configuration at symbol 396. A component name property may be attached to a root of the component configuration at symbol 397. The component name property may be instantiated at component name property 398 in Opus XCM 345. A question of assigning a new name may be asked at symbol 399. If the answer is no, then a drop down list is shown at symbol 401. The list may be filled from a data store component list 402 in the Opus supervisor server 349. An existing name may be selected from the list at symbol 403. The name may be set to the component name property at symbol 404. The set name may be provided to component name property 398 at Opus XCM 345. After symbol 404, then the approach may come to a stop 355.

However, if the answer to the question at symbol 399 of assigning a new name is yes, then the name text may be entered at symbol 405. The component list 402 at Opus supervisor server 349 may be appended with the new name from symbol 405. The name from symbol 405 may be set to the component name property at symbol 404. The set name may be provided to component name property 398 at Opus XCM 345. After symbol 404, then the approach may come to a stop 355.

In the present specification, some of the matter may be of a hypothetical or prophetic nature although stated in another manner or tense.

Although the present system has been described with respect to at least one illustrative example, many variations and modifications will become apparent to those skilled in the art upon reading the specification. It is therefore the intention that the appended claims be interpreted as broadly as possible in view of the prior art to include all such variations and modifications.

What is claimed is:

1. A supervisor data server configured to communicate with one or more site controllers and one or more work stations, comprising:
a server, the server having a server controller and a server database comprising records of one or more building management system site controllers connected to a same network as the server; and
wherein the server controller is configured to:
monitor the network for building management system site controllers on the same network with the server that are not already in the server database;
automatically detect building management system site controllers on the same network with the server that are not already in the server database;
in response to detecting a building management system site controller that is not already in the server database, the server controller is configured to:
connect to the detected building management site controller that is not already in the server database;
automatically import to the server database a configuration of the detected building management system site controller that is not already in the server database; and
perform a backup of the configuration of the detected building management system site controller that is not already in the server database;
filter the records of the one or more building management system site controllers having records in the server database according to a selected site category in response to a user request entered at a workstation in communication with the server.

2. The supervisor data server of claim 1, wherein the server controller is configured to provide a list of the detected building management system site controllers to a user at the workstation.

3. The supervisor data server of claim 1, wherein the records comprise alarm records of the one or more building management system site controllers connected to the same network as the server.

4. The supervisor data server of claim 1, wherein the server controller is configured to assign one or more site categories to the building management system site controllers having a record in the server database.

5. The supervisor data server of claim 1, wherein at least one of the records stored in the server database is an alarm record.

6. A server configured to provide access to histories of a multi-site enterprise having multiple sites with multiple site controllers, the server comprising:
a server controller;
a server database in communication with the server controller and configured to store a site controller history collection;
a history viewer in communication with the server controller and the server database; and
wherein:
the server controller is configured to automatically detect site controllers connected to a network with the server that lack a site controller history in the server database;
in response to detecting a site controller that is not already in the server database, the server controller is configured to:
create a connection with the detected site controller;
automatically import a configuration of the detected site controller to the server database; and
perform a backup of the configuration of the detected site controller;

the server controller is configured to upload a history log from a site controller connected to the network with the server and store the history log in the server database; and the server controller is configured to display a history via the history viewer for one or more sites selected by a user at a workstation from the server database.

7. The server of claim 6, wherein the server controller is configured to automatically import to the server database a configuration of a detected building site controller.

8. The server of claim 6, wherein the server controller is configured to retrieve a history log for a selected site from the site controller history collection.

9. The server of claim 6, wherein the server controller is configured to assign one or more site categories to the imported configurations of detected site controllers in response to a request from a user entered at a workstation in communication with the server.

10. The server of claim 9, wherein the imported configurations of detected site controllers is assigned a history log site category.

11. A server for viewing one or more sites of a multi-site enterprise from a remote location, the server comprising:
a server controller;
a server memory storing an enterprise element tree node; and
a server database in communication with the server controller and the server memory;
wherein the server controller is configured to:
automatically detect site controllers connected to a network with the server that are not already in the server memory and in response to detecting a site controller that is not already in the server memory:
connected to the detected site controller;
create a file structure for the detected site controller;
automatically import to the server database a site controller configuration of the detected site controller;
perform a backup of the configuration of the detected site controller to the created file structure;
retrieve one or more enterprise model elements from the enterprise element tree node in response to a user request and provide a list of site categories for one or more enterprise model elements; and
display a list of sites in a site category in response to a user selection of the site category.

12. The server of claim 11, wherein the server controller is configured to provide a list of the detected site controllers to a user.

13. The server of claim 11, wherein the imported site controller configuration of the detected site controllers are backup copies of the configurations and site controller configurations on the detected site controllers are master configurations.

14. The server of claim 11, wherein the site controller is configured to display a list of site controllers in response to a user selection of a site from the displayed list of sites.

15. The server of claim 14, wherein the server connects to a site controller selected by a user from the displayed list of site controllers, the connection between the server and the site controller is a two-way connection.

16. The server of claim 11, wherein the site category comprises a site category property.

17. The server of claim 11, wherein the server controller is configured to update a site controller to include a site property.

* * * * *